(12) United States Patent
Netanel et al.

(10) Patent No.: US 7,274,928 B2
(45) Date of Patent: Sep. 25, 2007

(54) PORTABLE CELLULAR PHONE SYSTEM HAVING AUTOMATIC INITIALIZATION

(75) Inventors: Eran Netanel, San Mateo, CA (US); Alon Segal, Herzlia (IL)

(73) Assignee: Telespree Communications, San Francisco, CA (US)

( * ) Notice: Subject to any disclaimer, the term of this patent is extended or adjusted under 35 U.S.C. 154(b) by 69 days.

(21) Appl. No.: 11/021,062

(22) Filed: Dec. 22, 2004

(65) Prior Publication Data

US 2005/0170818 A1    Aug. 4, 2005

Related U.S. Application Data

(63) Continuation-in-part of application No. 09/728,735, filed on Nov. 30, 2000, now Pat. No. 6,836,651.

(51) Int. Cl.
*H04M 3/66* (2006.01)
*H04M 11/00* (2006.01)
*H04M 3/42* (2006.01)
*H04M 3/00* (2006.01)
*H04M 1/00* (2006.01)

(52) U.S. Cl. .............. 455/415; 455/406; 455/408; 455/411; 455/550.1; 455/407; 455/418; 455/410

(58) Field of Classification Search .. 455/414.1–414.4, 455/405–411, 418–420, 422.1, 432.3, 433–434, 455/403, 466, 435.1, 435.2, 435.3, 517, 551, 455/68, 70, 550.1, 560–561, 556.2, 415, 455/563–567; 709/203, 205, 211, 216, 217–219, 709/221–222, 228–229; 380/28, 247, 249–250; 379/433.09, 357.01–357.02, 433.11, 433.12

See application file for complete search history.

(56) References Cited

U.S. PATENT DOCUMENTS

| | | | | |
|---|---|---|---|---|
| 5,848,360 | A | * | 12/1998 | O'Connell et al. ......... 455/551 |
| 5,875,394 | A | * | 2/1999 | Daly et al. ................. 455/411 |
| 5,966,654 | A | * | 10/1999 | Croughwell et al. ..... 455/414.1 |
| 6,065,120 | A | * | 5/2000 | Laursen et al. ................ 726/5 |
| 6,167,251 | A | * | 12/2000 | Segal et al. ................. 455/406 |
| 6,226,364 | B1 | * | 5/2001 | O'Neil .................... 379/114.2 |
| 6,381,454 | B1 | * | 4/2002 | Tiedemann et al. ........ 455/419 |
| 6,418,310 | B1 | * | 7/2002 | Dent .......................... 455/418 |
| 6,463,276 | B1 | * | 10/2002 | Jonsson ..................... 455/410 |
| 6,591,364 | B1 | * | 7/2003 | Patel .......................... 713/170 |
| 6,836,651 | B2 | * | 12/2004 | Segal et al. ................ 455/405 |

* cited by examiner

*Primary Examiner*—Meless Zewdu
(74) *Attorney, Agent, or Firm*—Michael A. Glenn; Glenn Patent Group

(57) ABSTRACT

A portable cellular phone system is provided, wherein matched sets of algorithmically generated communication units are generated, each defining an increment of authorized communication. One set is stored on a system server, i.e. a service provider, and the pre-paid set is available for use within a portable cellular phone. The portable cellular phone, which is normally non-activated, automatically contacts the system server upon selective activation by the user, to initiate a call (outgoing or incoming). A voice recognition system allows the user to place calls and/or receive calls. During a call, the portable cellular phone and the system server allow authorized access to communication, while the communication units are decremented at the system server and at the portable cellular phone. The portable cellular phone typically has either an internal energy supply and storage for the pre-paid communication units, or a removable airtime cartridge, typically containing an energy supply and either the ability to store or to generate a set of pre-paid single use airtime communication units.

24 Claims, 22 Drawing Sheets

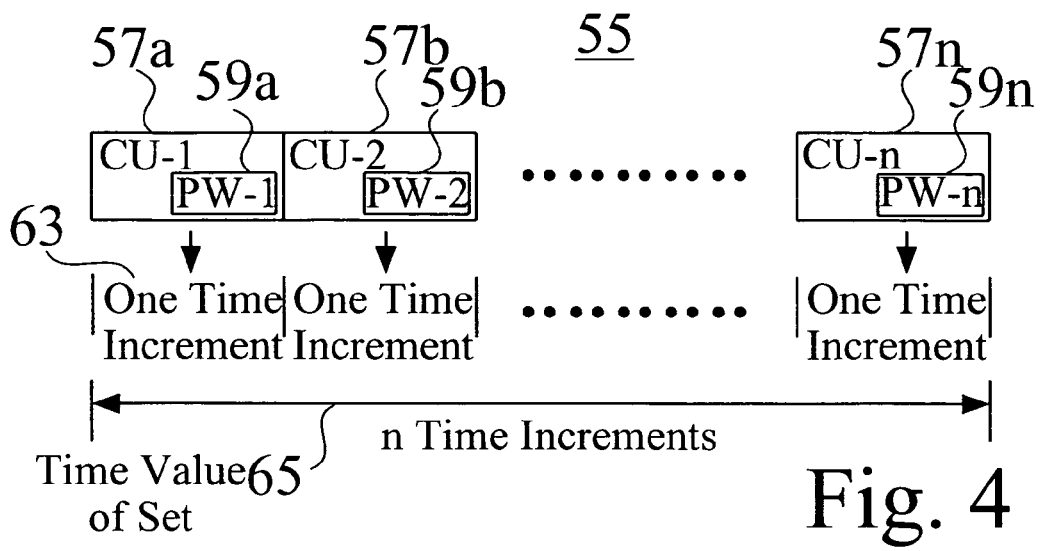
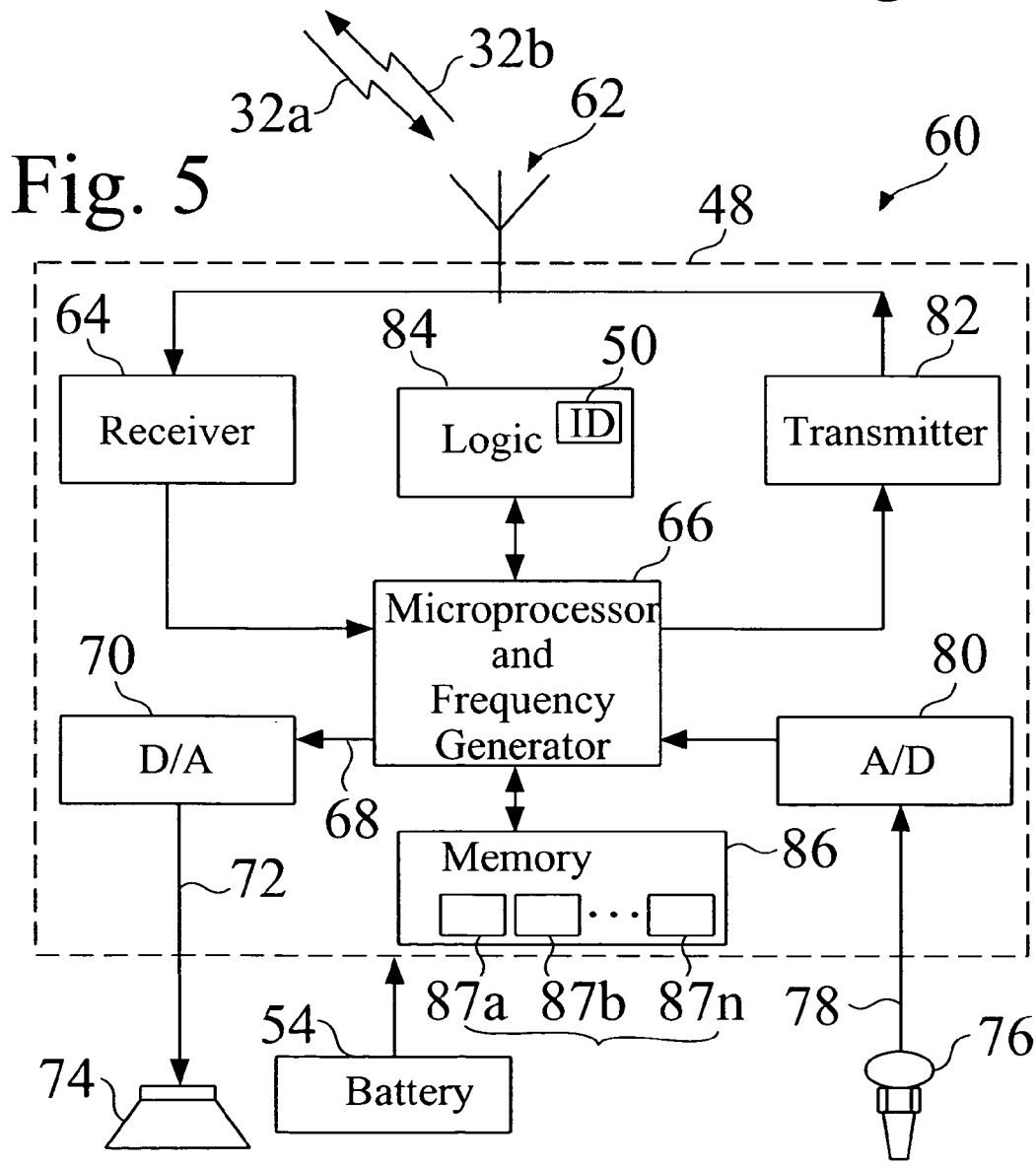

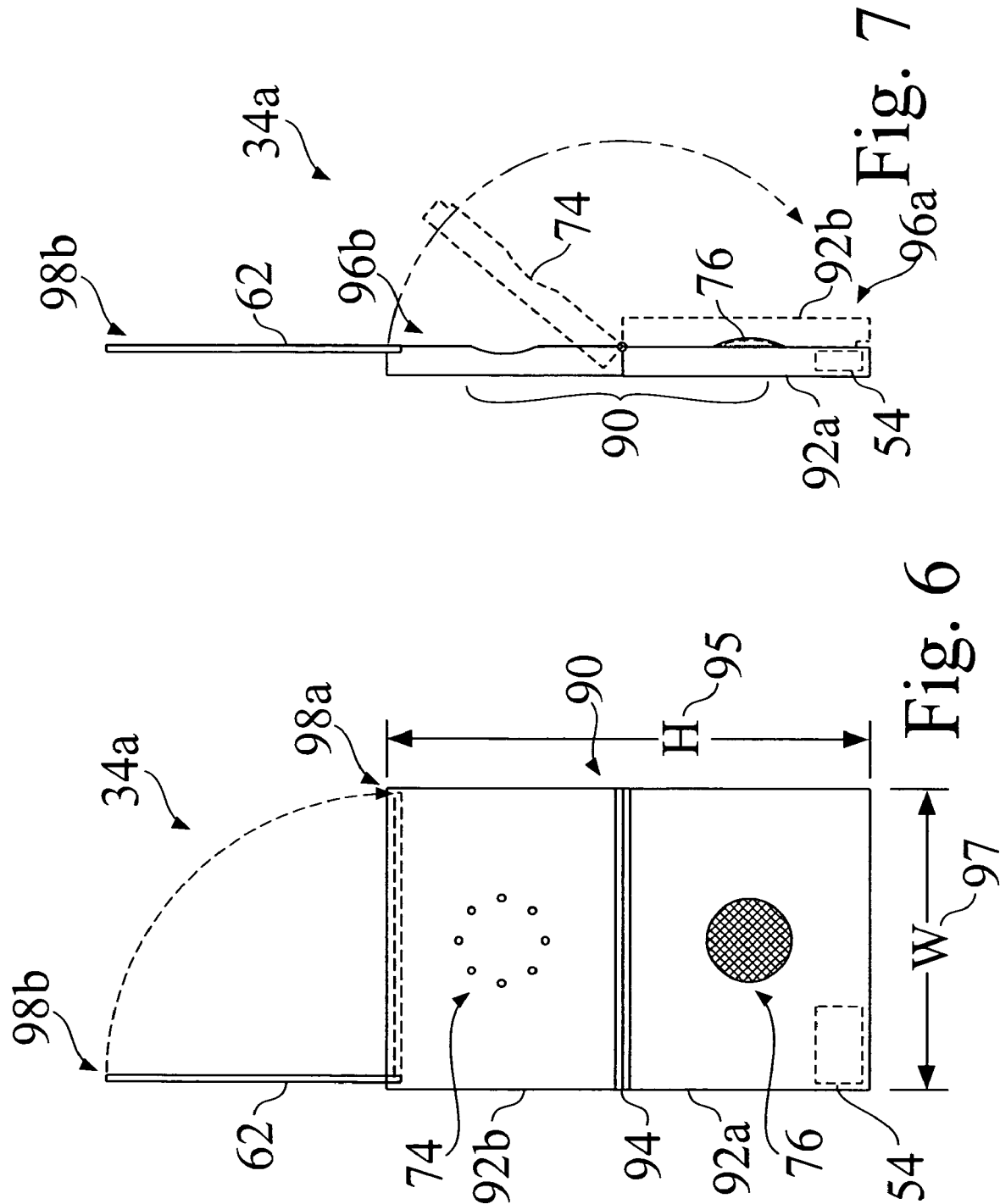

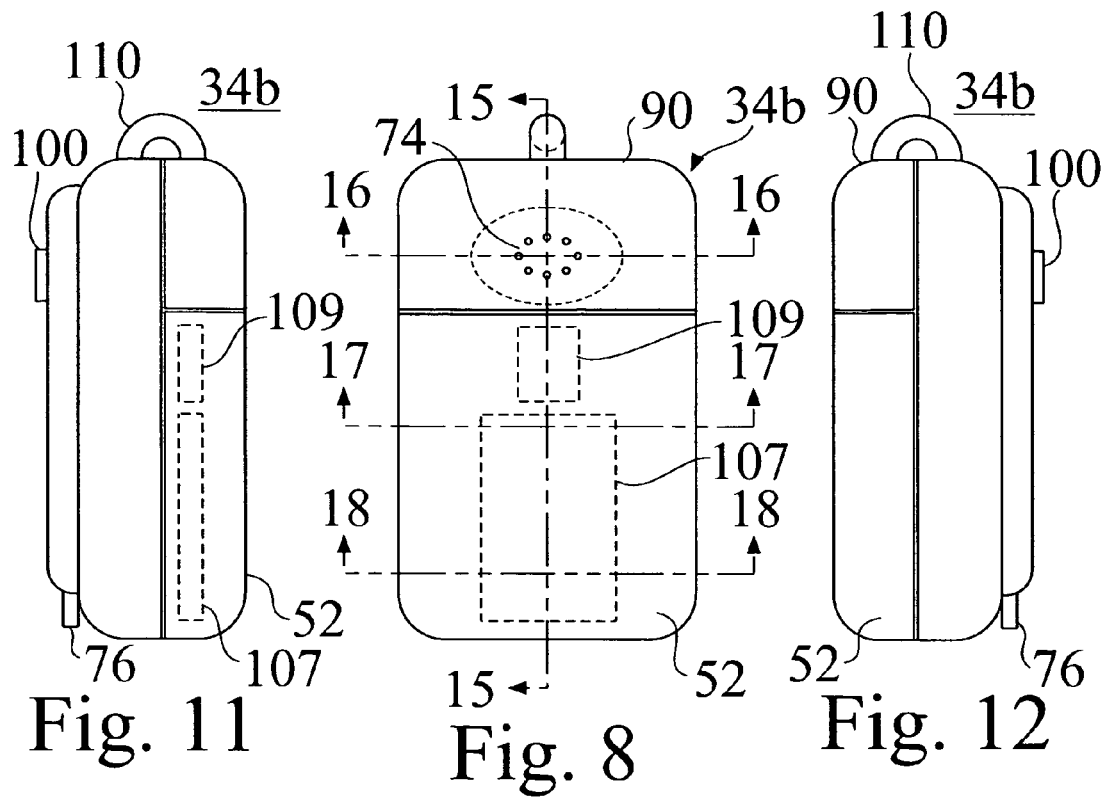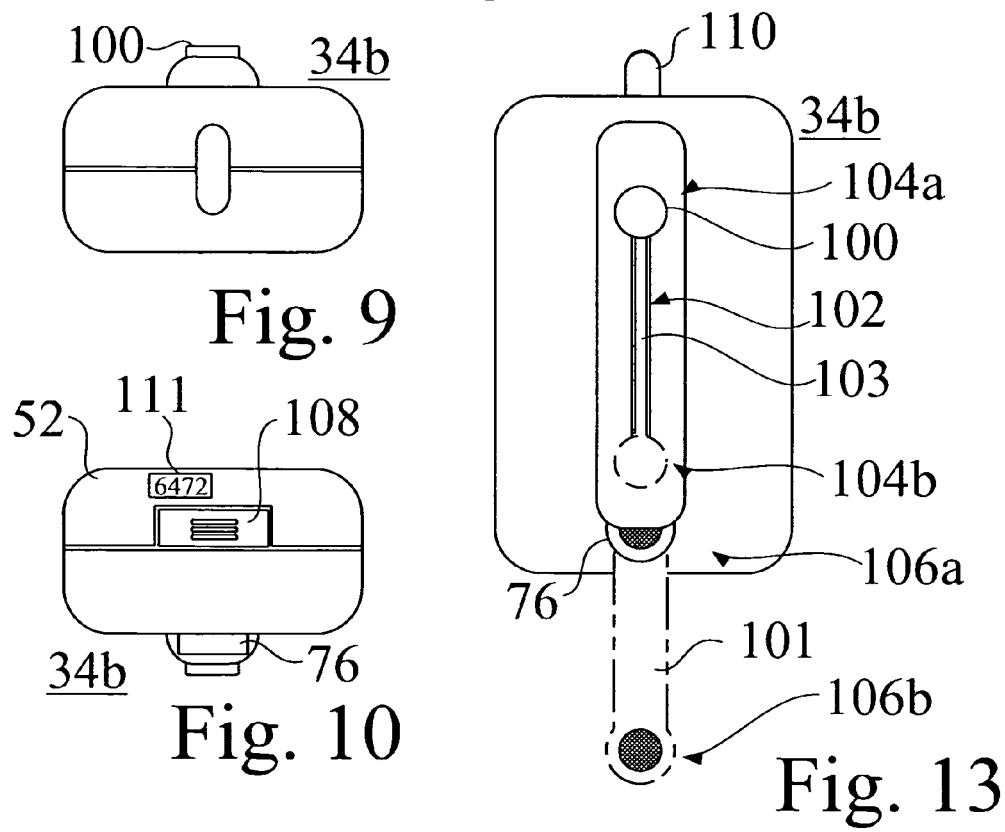

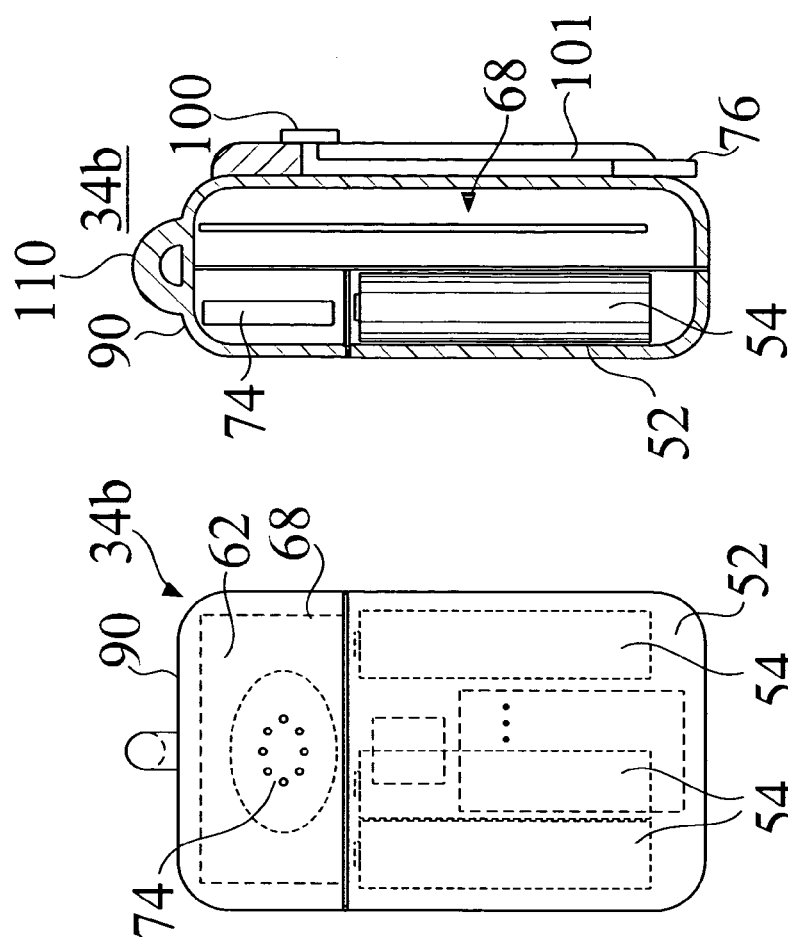
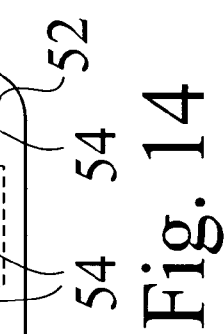
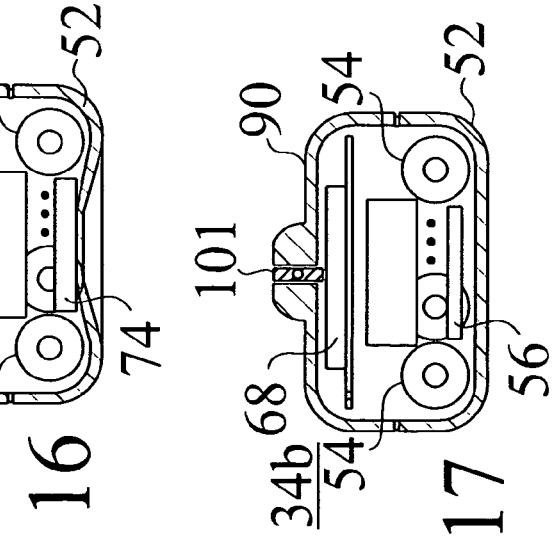
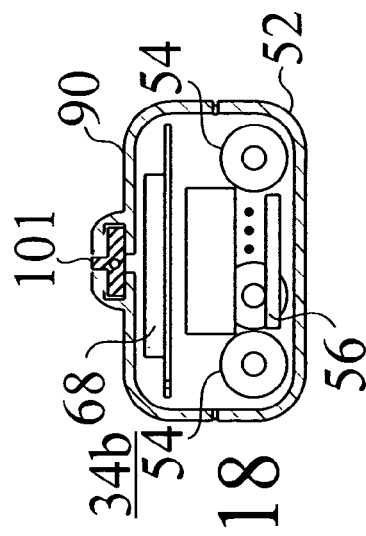

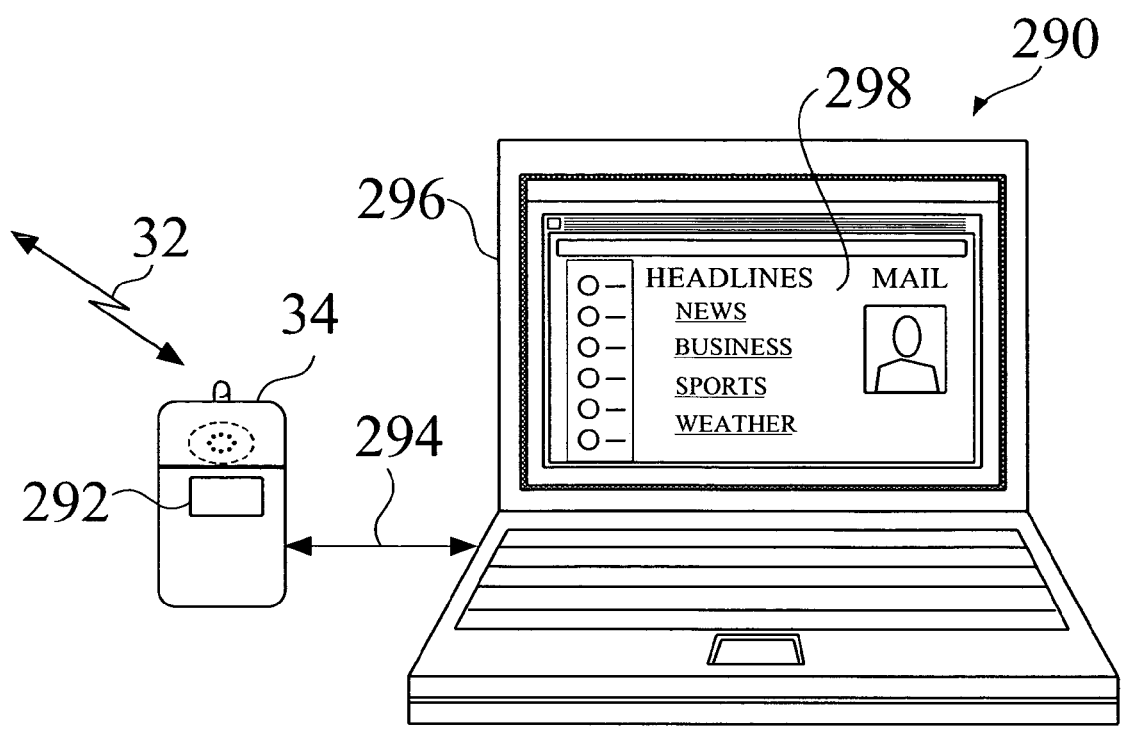
Fig. 32
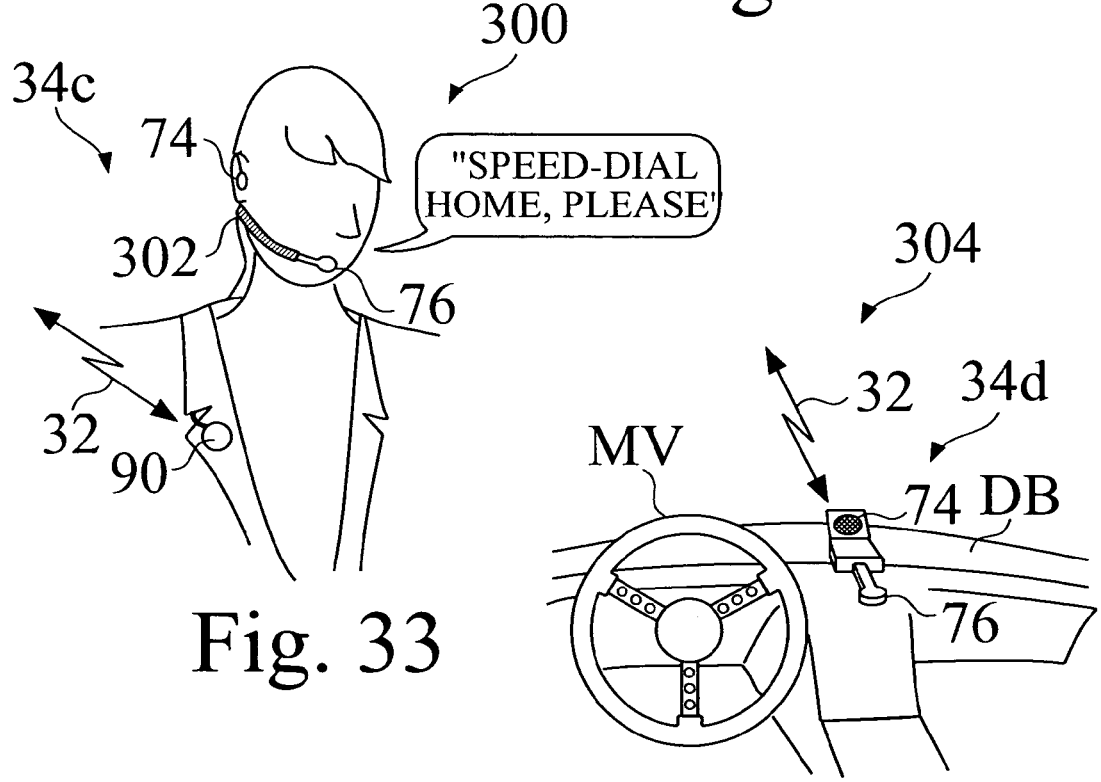
Fig. 33
Fig. 34

PORTABLE CELLULAR PHONE SYSTEM HAVING AUTOMATIC INITIALIZATION

CROSS-REFERENCE TO RELATED APPLICATIONS

This application is a Continuation-in-Part of U.S. patent application Ser. No. 09/728,735 filed 30 Nov. 2000, now U.S. Pat. No. 6,836,651, which claims priority to U.S. patent application Ser. No. 09/337,050 filed 21 Jun. 1999, now U.S. Pat. No. 6,167,251, which claims priority to U.S. Provisional Patent Application No. 60/102,833, filed 2 Oct. 1998.

FIELD OF THE INVENTION

The invention relates to the field of portable telephone systems. More particularly, the invention relates to a portable cellular phone system having remote voice recognition.

BACKGROUND OF THE INVENTION

Portable cellular phones have been used with increasing popularity worldwide for a variety of personal and business uses. These systems typically require a subscription contract with a telephone service or company, which allow the cellular phone to access a cellular phone exchange, for the assignment of a communication line. The establishment of a subscription contract typically requires a good credit standing for the assigned user, as well as a long-term commitment to a cellular carrier; e.g. one year service contracts are common.

Subscription contracts for conventional cellular networks are typically based on two types of customer billing. The first billing architecture is a per call system, which is based upon a service plan for the customer. The second common billing architecture is a pay in advance system, which is based upon a unique credit identifier, i.e. a drop number for the customer.

There are commonly different contracted services for different types of communication, based on the location of the cellular phone, and the location of other connected parties. For example, one service rate may apply to outgoing or incoming local calls, such as within a local area code, or within a cellular calling region. A different service rate may apply to outgoing or incoming calls for long distance telecommunication connections. This complicated arrangement of service contracts typically requires the use of personal identification numbers (PIN) to identify the caller or to access different services, and frequently burdens the user with roaming charges as the mobile user moves through different cellular regions.

Payment of a monthly charge based upon an average maximum use of prepaid minutes may often be more costly than the amount needed by a particular user. No single billing plan can be optimized for any specific user, since plans are based on average users. For example, minimal use users, who may only carry portable phones for emergency use, e.g. such as for roadside assistance or "911" services, commonly establish and pay for service charges which far exceed the actual communication services used.

Common cellular phones are typically purchased by the user, or are provided, frequently at a discount, by a service provider upon the establishment of a long-term service contract. Conventional cellular phones are commonly purchased with several required accessories which allow them to be reused, such as removable and rechargeable batteries, an AC/DC recharger module, a phone stand, and flexible DC power cords for mobile power and/or recharging. There is commonly a significant cost in accessories alone. As well, the accessories commonly become damaged through use, are lost or misplaced (particularly for business people who travel frequently), or become outdated through use, or through normal wear and tear and time. Such phones and accessories are commonly impractical during international travel, frequently requiring a large variety of chargers and power converters.

Some recent, specialized portable phones and communication networks, such as multi-mode phones, e.g. IRIDIUM™, manufactured by Motorola, Inc., while designed for use while traveling, are prohibitively expensive.

As well, existing portable phones typically include complex dial pads, memory, batteries, functions, and displays, all of which are commonly expensive, take up space, and are prone to failure.

Another drawback of conventional cellular phone services is the need for the user to dial, in order to call any destination. Even for destination numbers which the user may place into memory, the user is required to manually enter a series of keystrokes, such as to convert from keystroke signals to voice signals. The physical action of dialing is often inconvenient and difficult, and can even be dangerous in various circumstances, such as while driving, or even while walking down a street. The action requires precision, and is time consuming, and to some extent even complicated. The smaller the phone, the harder it becomes for the user to dial, sometimes even requiring a pen or pointer to hit the correct buttons. In low light conditions, such as at night, in an automobile, or in a restaurant or bar, it is often difficult for the user to see and correctly operate the dial pad.

Conventional cell phones are each unique to the world, having both a serial number (which is typically stamped on the housing), as well as an installed electronic serial number (ESN), i.e. a drop number, which is established upon initial activation by a service provider, e.g. such as by authorized personnel at a phone retail outlet. Ongoing use of the cell phone is associated with the electronic drop number, in which the registered user of the conventional cellular phone is billed for the ongoing use. The installed electronic drop number is transmitted whenever the phone is powered. Therefore, incoming and outgoing calls are routed to the location of the cell phone, and billing for the cell phone is correctly logged to the registered user of the conventional cellular phone, based upon the transmitted electronic drop number.

However, since the installed electronic drop number is transmitted whenever a conventional phone is powered, an unauthorized user, i.e. a pirate, can intercept and receive a phone signal, capture the electronic drop number, and use the captured electronic drop number to enable unauthorized communication from an unauthorized mobile phone, using a process called cloning. Unauthorized use of the electronic drop number enables unauthorized access to the phone system, wherein charges for unauthorized calls are billed to the original authorized user.

While some cellular phone system signals are encrypted, there is continuous encryption of the same electronic drop number. Unauthorized decryption of the encrypted signal, while it may require some processing power, yields valuable access to the electronic drop number, again enabling unauthorized access to a phone system, while the original, authorized user is billed for the unauthorized access.

When a conventional cell phone is powered off, the cell phone is not able to receive calls. Therefore, as a mobile user uses a cell phone throughout the day, the user moves between one or more cell sites, and powers the phone, typically in a standby mode, to be able to receive incoming calls. When the cell phone is moved, from cell to cell, the cell phone talks to the closest cell site, and can be used to send or receive calls. In a powered state, a conventional cell phone is in constant communication with a base station, and requires a substantial amount of stored battery power.

Some recent conventional cell phones can receive calls, without being fully powered, or by being powered in a standby mode. Such conventional cellular phones include an internal paging circuitry, and can receive paging signals through the cell phone antenna. Upon receiving a paging signal from a paging transmitter, the paging circuitry activates an internal trip switch, which automatically turns on the cell phone RF circuitry. Once the pager/cell phone is fully activated, the incoming call is routed through the Mobile Telephone Switching Office (MTSO) to the cell phone, and the phone rings. The mobile user then selectively chooses to accept the call. Such operation presently allows some conventional cell phones, having integrated paging assistance, to operate on limited pager power for up to eight days, with an energy storage capacity of about three hours of talk time.

D. Gaulke, T. Hanson, and R. Moleres, Pager-Controlled Wireless Telephone, U.S. Pat. No. 5,737,707 (7 Apr. 1998) disclose an integrated pager and cellular phone which includes "circuitry that responds to receipt by the pager of an incoming-call-indicative paging signal by connecting the cellular phone to a battery power source. This activates the cellular phone, whereupon it registers with a base station and thus becomes able to receive the incoming call. The circuitry further responds to receipt by the pager of a second paging signal by disconnecting the cellular phone from the battery power source. This allows the cellular phone to be kept in a deactivated condition and not draining battery power at times when the cellular phone is not in use, without missing incoming calls, and does so automatically, without intervention of the user of the cellular phone." While Gaulke et al. disclose combined cellular phone and pager circuitry, call completion occurs at the handset level, after registration and hand off from the mobile telephone switch operator (MTSO), as opposed to a connection at the server level. As well, call completion includes automatic activation of the cellular phone circuitry. Furthermore, the disclosed phones can have generic identities, such that querying the Network Control Point before transmitting a page is inefficient.

Breeden, P. Mupiddi, and R. Bessom, Method and Apparatus for Providing Telepoint Calling Between Pager Equipped Handsets, U.S. Pat. No. 5,202,912 (13 Apr. 1993) disclose communication between "first and second portable radiotelephone transceivers" . . . "in a radiotelephone communication system by generating a paging message in response to the first transceiver registering with a first telepoint base station. The paging message is directed to the second transceiver for which communication is requested, and identifies the first telepoint base station and the first transceiver. Upon receiving the paging message, the second transceiver registers with a second telepoint base station, downloading the information identifying the first telepoint base station and the first transceiver. The second telepoint base station establishes communication with the first telepoint base station, after which the first telepoint base station requests registration of the first transceiver to complete the communication between first and second transceivers." While Breeden et al. disclose telepoint communication between pager equipped handsets, call completion occurs at the handset. Two distinct signals are sent to the handset, a first pager activation signal, and a second phone signal. The first pager signal powers the phone circuitry, whether or not the user wishes to receive calls, and then the second phone signal is received by the self-powered phone circuitry, notifying the user of an incoming call, e.g. the phone rings.

J. Wohl, E. Naugler Jr., J. Hendershot, G. Lloyd, and E. Adams, Cellular Telephone with Pager, U.S. Pat. No. 5,247,700 (21 Sep. 1993) disclose a "compact and unitary cellular/pager. The cellular/pager includes a cellular antenna for receiving UHF cellular and paging signals. The cellular/pager also includes a VHF paging antenna. Every paging signal is sent to a paging receiver. The paging receiver uses the same circuitry to process either the UHF or VHF page. Cellular location information is utilized by the cellular/pager to form an internally updated roaming pager. That is, the cellular location information is automatically conveyed by the cellular block, under the control of the microprocessor, to a paging service. The paging service then knows the location of the paging receiver, consequently the paging service can direct the pager to await for a page at a single frequency, thereby eliminating frequency scanning by the pager or manual updates by the user."

D. Gaulke, T. Hanson, and R. Moleres, Automated Wireless-Call Completion Using a Paging Network, U.S. Pat. No. 5,802,470 (1 Sep. 1998) disclose a cellular telephone system, in which a "pager is associated with a cellular phone that is normally kept turned off and thus not drawing power from its battery. When an incoming call for the cellular phone arrives at a cellular exchange and the exchange determines that the cellular phone is not registered with a base station, a paging system is caused to transmit an incoming-call-indicative paging signal to the pager. Receipt of this paging signal at the pager either causes the user of the pager and the cellular phone to turn on the cellular phone, or causes the pager to turn on the cellular phone automatically via associated circuitry. Activation causes the cellular phone to register with a base station, whereupon the cellular exchange extends the incoming call to the cellular phone through that base station. If the incoming call is not answered, or when the incoming call is completed, the paging system is caused to transmit a second paging signal to the pager. Receipt of the second paging signal at the pager leads to the cellular phone being turned off again. The cellular phone can therefore normally be turned off without fear of missing incoming calls. Battery power of the cellular phone is thus conserved."

In addition, some cell phones having integrated paging assistance also include an alphanumeric display, such that a remote user may receive alphanumeric messages from their cell phone. Longer messages are typically scrollable through the display, using conventional next and back keypad controls.

The metering of phone usage, as well as the establishment of system security, has been an ongoing challenge for conventional cellular phone systems.

G. Hansen, D. Riley, D. Lee, F. Ryan Jr., Nathan Rosenberg, A. Violante and R. Sansone, Metered Payment Cellular Telephone Communication System, U.S. Pat. No. 5,812,945 (22 Sep. 1998) disclose "a cellular telephone metering system that allows phone calls to be made as long as sufficient funds or call units reside in the phone. The apparatus of this invention also utilize encryption and employ seed numbers for the addition of funds or call units to the cellular phone."

R. Osmani, and M. Metroka, Disposable Wireless Communication Device Adapted to Prevent Fraud, U.S. Pat. No.

5,815,807 (29 Sep. 1998) disclose "A disposable portable radiotelephone subscriber unit comprises a power supply, a transceiver and a controller. The power supply has stored therein a predetermined measure of power capacity. The transceiver is permitted to operate for a predetermined period of time responsive to the predetermined measure of the power capacity. The controller monitors a rate of depletion of the predetermined measure of the power capacity. The controller permits operation of the transceiver when the power capacity is being depleted at a desirable rate, thereby decreasing the predetermined period of time that the transceiver is permitted to operate. The controller prevents operation of the transceiver when the power capacity is being depleted at an undesirable rate, thereby prolonging the predetermined period of time that the transceiver is permitted to operate. Alternatively, the power supply may be a memory unit and the power capacity may be calling time or a future electronic date". While Osmani et al. disclose a portable radio telephone, phone usage is monitored in terms of battery drainage, and disablement is monitored within the phone."

A. Wise, and T. Rich, Cellular Phone System Wherein the Air time Use is Predetermined, U.S. Pat. No. 5,826,185 (20 Oct. 1998) disclose "A cellular phone system in which a cellular phone user (CPU) has a cellular phone with a predetermined amount of available airtime. The CPU prepays for a particular number of airtime units. When a cell site receives a call from the CPU, the cell site communicates with a mobile telecommunications switching office (MTSO), which recognizes a unique serial number from the cellular phone. The MTSO directs the call to a prepaid airtime transaction tracking interface (PATTI). The PATTI then checks whether the CPU's account has any available airtime units and may indicate the number of units to the CPU. If none, the PATTI does not answer the call; otherwise, the PATTI connects the call and deducts airtime units until the call is disconnected."

V. Hill, Prepaid Long-Distance Telephone Service System with Flexible Operating Parameters, U.S. Pat. No. 5,719,926 (17 Feb. 1998) disclose "A long-distance telephone service system provides for accounting and flexible, customizable control of long-distance telephone usage by customers, especially prepaid long-distance service customers. The system maintains a set of global operating parameters associated with each access number. It further maintains a database of user accounts or card numbers, and a set of card processing parameters associated with each card number. Both the global parameters and the individual card processing parameters are applied in completing a long-distance call to a destination number so as to provide highly flexible control over individual accounts as well as groups of accounts. Establishment of new accounts, and "recharging" the prepaid balance of existing accounts is accomplished automatically from remote locations."

Some telephonic systems have attempted to use voice activated dialing. However, most systems require a high level of internal intelligence and processing power to distinguish even simple voice commands.

G. Engelbeck, and M. Marics, Method of Voice Activated Telephone Dialing, U.S. Pat. No. 5,452,340 (19 Sep. 1995) disclose "a user interface which can add a name and corresponding telephone number to a directory during the process of initiating a telephone call", which "provides the user the opportunity to select which element of a directory listing should be changed, using a single integrated review, erase and change functionality accessible while in a directory mode."

K. Kaneuchi, T. Kawamoto, and T. Nakatani, Voice Activated Dialing Apparatus, U.S. Pat. No. 4,945,557 (31 Jul. 1990) disclose an automatic dialing apparatus for use in a telephone or facsimile machine, which "sends out a dial signal to an external network automatically. A detachable telephone number memory, which stores a telephone number together with an area code, is detachably mounted on a telephone unit which includes a memory storing an area code of the district in which the telephone unit is located. The area code of the telephone number data supplied from the telephone number memory is deleted if that area code agrees with the area code stored in the memory of the telephone unit. An automatic dialing apparatus is preferably constructed to carry out dialing automatically responsive to a voice. In the preferred embodiment of such a voice activated dialing apparatus, a telephone number is input through a keyboard and a corresponding identifier, typically the name of a subscriber, is voiced and its voice signal is stored in association with the telephone number."

M. Sakanishi, H. Yoshida, T. Ishii, H. Sato, and M. Hoshino, Telephone Apparatus with Voice Activated Dialing Function, U.S. Pat. No. 5,042,063 (20 Aug. 1991) disclose a telephone, in which a call "may be made in response to utterances of a user by speech recognition without manually dialing a telephone number. The telephone apparatus includes a storage device for storing a set of parameters corresponding to an expected speech signal, which are used for recognizing the user's subsequent utterance and/or for indicating differences between the utterance and the stored signal. The telephone apparatus further includes a storage device for storing the speech signal so that the stored speech signal can be reproduced. The reproduced speech signal is used to confirm the stored speech signal. The stored speech signal may be reproduced in response to a user's key operation when the telephone apparatus is in a confirmation mode and in response to a user's utterance when the telephone apparatus is in a registration or voice calling mode."

T. Hormann and G. Rozinaj, Start/End Point Detection for Word Recognition, U.S. Pat. No. 5,794,195 (11 Aug. 1998) disclose "detection of start/end points of words". "Use of a feature with noise-resistant properties is shown wherein for a feature vector, a function of the signal energy is formed as the first feature and a function of the quadratic difference of an LPC (Linear-Predictive-Coding) cepstrum coefficient as a second feature. A check quantity or a maximum function of a distribution function is calculated, which detects the start/end points by comparison with a threshold."

B. Bareis, P. Foster, and T. Schalk, Speech Recognition System for Electronic Switches in a Non-Wireline Communications Network, U.S. Pat. No. 5,659,597 (19 Aug. 1997) disclose a telecommunications system which recognizes spoken commands over a cellular telephone, satellite telephone, or personal communications network. In the cellular application, for example, a Speech Recognition System interconnects either internally with or as an external peripheral to a cellular telecommunications switch. The Speech Recognition System includes an administrative subsystem, a call processing subsystem, a speaker-dependent recognition subsystem, a speaker-independent recognition subsystem, and a data storage subsystem."

L. Eting, and Y. Gelfer, Apparatus and Methods for Conveying Telephone Numbers and Other Information via Communication Devices, U.S. Pat. No. 5,651,056 (22 Jul. 1997) disclose an "accessory device for a telephone system, the device including a spoken telephone number recorder serving a local communicant, the recorder including a spoken telephone number recognizer operative to recognize a telephone number spoken in the course of a telephone conversation between a remote communicant and the local communicant, and a telephone number memory operative to store at least one telephone number received from said telephone number recognizer."

Other voice recognition systems have been disclosed for control systems.

B. Bareis, Speech Controlled Vehicle Alarm System, U.S. Pat. No. 5,706,399 (6 Jan. 1998) discloses an electronic vehicle alarm system which "allows control of alarm functions to be accomplished using specific spoken commands. A microphone converts speech into time-variant voltage levels which are amplified and sent to an analog-to-digital converter and digitized. The digitized data is then processed by a speech recognition subsystem. The speech recognition subsystem separates extraneous speech from words and provides corresponding output signals when control words are recognized". "The response indicator provides verbal responses to confirm spoken commands. A speaker verification capability is also included in the speech recognition subsystem to allow for secured operation of the vehicle alarm system."

T. Schalk, Voice-Controlled Account Access Over a Telephone Network, U.S. Pat. No. 5,517,558 (14 May 1996) discloses "a system and method for enabling a caller to obtain access to services via a telephone network by entering a spoken first character string having a plurality of digits. Preferably, the method includes the steps of prompting the caller to speak the first character string beginning with a first digit and ending with a last digit thereof, recognizing each spoken digit of the first character string using a speaker-independent voice recognition algorithm, and then following entry of the last digit of the first string, initially verifying the caller's identity using a voice verification algorithm. After initial verification, the caller is again prompted to enter a second character string, which must also be recognized before access is effected." Schalk therefore discloses a system wherein the caller is required to input voice commands to gain authorized access to the telephone network. The resulting complicated system access is therefore voice and character string dependent, requiring a user learning/experience curve.

A. Hunt and T. Schalk, Simultaneous Voice Recognition and Verification to Allow Access to Telephone Network Services, U.S. Pat. No. 5,499,288 (12 Mar. 1996) disclose "a system and method for enabling a caller to obtain access to services via a telephone network by entering a spoken password having a plurality of digits. Preferably, the method includes the steps of: (1) prompting the caller to speak the password beginning with a first digit and ending with a last digit thereof, recognizing each spoken digit of the password using a speaker-independent voice recognition algorithm, (3) following entry of the last digit of the password, determining whether the password is valid, and (4) if the password is valid, verifying the caller's identity using a voice verification algorithm."

T. Schalk and F. Kaake, Method for Recognizing a Spoken Word in the Presence of Interfering Speech, U.S. Pat. No. 5,475,791 (12 Dec. 1995) disclose "A method for recognizing a spoken word in the presence of interfering speech, such as a system generated voice prompt, begins by echo canceling the voice prompt and any detected speech signal to produce a residual signal. Portions of the residual signal that have been most recently echo-canceled are then continuously stored in a buffer. The energy in the residual signal is also continuously processed to determine onset of the spoken word. Upon detection of word onset, the portion of the residual signal then currently in the buffer is retained, the voice prompt is terminated, and the recognizer begins real-time recognition of subsequent portions of the residual signal. Upon detection of word completion, the method retrieves the portion of the residual signal that was retained in the buffer upon detection of word onset and performs recognition of that portion. The recognized portions of the word are then reconstructed to determine the spoken word."

P. Foster and B. Bareis, Intelligent Call Processing Platform for Home Telephone System, U.S. Pat. No. 5,881,134 (9 Mar. 1999) disclose "an intelligent call processing platform for use with a home telephone system. The system consists of a processing unit interfaced with a variety of memory storage areas, a switching central office providing local telephone service and a plurality of telephone handsets. Using a variety of voice and/or pushbutton commands, a user is able to access a variety of telephone services from any telephone interfaced with the platform. Services provided include identification of incoming callers, automatic speed dialing of user-stored telephone numbers, storage of new numbers to the user-stored list of telephone numbers, and control of peripheral systems interconnected with the intelligent call processing platform." While Foster et al. disclose a call processing platform, system intelligence is associated with a specific station, and is not transportable, either from station to station, or from user to user.

T. Schalk, Method for Reducing Database Requirements for Speech Recognition Systems, U.S. Pat. No. 5,845,246 (1 Dec. 1998) discloses "a method for reducing the database requirements necessary for use in speaker independent recognition systems", which involves "digital processing of a plurality of recorded utterances from a first database of digitally recorded spoken utterances. The previously recorded utterances are digitally processed to create a second database of modified utterances and then the first and second databases are combined to form an expanded database from which recognition vocabulary tables may be generated."

There has also been work on connectable power supplies, and development of activatable, conventional cellular phones.

N. Mischneko, Multiposition Detenting Hinge Apparatus, U.S. Pat. No. 5,185,790 (9 Feb. 1993) discloses "A hinge apparatus for a foldable telephone includes a body portion and a flip element. The flip element is held in a closed and an open position relative to the body portion by an enclosed follower which follows recesses in two hinge shafts integral to the hinge portion of the flip element. The apparatus is assembled along a common axis from a single direction. The flip element is held tight against a keypad of the body portion in its closed position. The flip element is secured in its open position with no excessive play."

S. Beutler, H. Estates, and J. Barber, Multipurpose Hinge Apparatus for Foldable Telephones, U.S. Pat. No. 4,897,873 (30 Jan. 1990) disclose "A multipurpose hinge apparatus for a foldable telephone includes a flip element and a hookswitch. The flip element is held in the closed and open positions by an enclosed cam element which follows recesses in one shaft securing the hinge elements. The hookswitch is activated by another enclosed cam which follows a recess in a second shaft."

M. Metroka, S. Davis, and P. Gargulak, Portable Radio Telephone with Control Switching Disabling, U.S. Pat. No. 4,845,772 (4 Jul. 1989) disclose "A portable radiotelephone with control switch disabling is disclosed. A flip element which contains a microphone and covers a keypad and other control buttons when in a closed position also activates a hookswitch. When the hookswitch and microprocessor indicate that the flip element is in a closed position, the on/off switch cannot be activated to turn the portable radiotelephone on or off and switches which control volume level are deactivated."

G. Kaye, Battery Connector, U.S. Pat. No. 4,186,983 (5 Feb. 1980) discloses "A connector for use in electrically connecting a battery, having substantially planar terminals on a wall thereof, to an electrical device. The connector comprises a housing partially containing conductive means which extend from the housing to contact the battery terminals and the electrical device. The connector further includes resilient gripping means on the housing which cooperatively engages holding means on the battery with a snap on connection."

As described above, the acquisition of conventional cellular phones requires the establishment of a billing system, wherein telephone communication is billed to a registered user.

R. Bishop, D. McClure, and J. Storch, Automated Vending of Cellular Handheld Telephones and Cellular Telephone Services, U.S. Pat. No. 4,951,308 (21 Aug. 1990) disclose the automated vending of conventional cellular phone, wherein "a microprocessor controlled vending machine which inventories a plurality of mobile cellular telephones and selectively delivers one of the phones after reading a credit card number from a customer and obtaining credit card approval. The mobile cellular telephone is dispensed and later returned by the customer. When returned by the customer, the mobile cellular telephone is disposed within a receiving unit which uniquely verifies the mobile cellular telephone through its phone number, reads the usage made by the customer of the mobile telephone, and senses the charged condition of the battery within the mobile telephone. The customer's credit card is again read and the bill for rental of the mobile cellular telephone unit, including all telephone usage charges, is computed and directly billed to the credit card number. The vending unit then produces a printed record of the credit card billing and returns the mobile telephone unit to inventory to be fully recharged and reinitialized for revending." While Bishop et al. disclose a vending machine for cellular phones, the automated vending machine is required to deal with the billing complexities of conventional cellular phones, whereby the vending machine requires the user's credit card to be read twice, and wherein the machine computes the billing for system use. The disclosed system usage and billing is associated with a conventional cellular phone. i.e. having a conventional electronic service number.

The disclosed prior art systems and methodologies thus provide basic portable cellular phone systems, mechanical component design, and basic voice recognition and control technologies, but fail to provide a portable cellular phone system that does not require a long term service contract to be established with the user. As well, conventional systems fail to provide a pre-paid communication system that provides remote voice recognition, as well as high levels of system security from unauthorized use. The development of such a portable phone system would constitute a major technological advance.

SUMMARY OF THE INVENTION

A portable cellular phone system is provided, wherein matched sets of algorithmically generated communication units are generated, each defining an increment of authorized communication. One set is stored on a system server, i.e. a service provider, and the pre-paid set is available for use within a portable cellular phone. The portable cellular phone, which is normally non-activated, automatically contacts the system server upon selective activation by the user, to initiate a call (outgoing or incoming). A voice recognition system allows the user to place calls and/or receive calls. During a call, the portable cellular phone and the system server allow authorized access to communication, while the communication units are decremented at the system server and at the portable cellular phone. The portable cellular phone typically has either an internal energy supply and storage for the pre-paid communication units, or a removable airtime cartridge, typically containing an energy supply and either the ability to store or to generate a set of pre-paid single use airtime communication units.

BRIEF DESCRIPTION OF THE DRAWINGS

FIG. 4 is a block diagram showing the defined time value of a set of pre-paid single use communication units;

FIG. 5 is a block diagram of hardware components for a portable cellular phone;

FIG. 6 is a front view of an activatable keyless portable cellular phone;

FIG. 7 is a side view of an activatable keyless portable cellular phone;

FIG. 8 is a front view of a microphone activatable keyless portable cellular phone having pager circuitry within an airtime cartridge;

FIG. 9 is a upper view of a microphone activatable keyless portable cellular phone;

FIG. 10 is a lower view of a microphone activatable keyless portable cellular phone;

FIG. 11 is a right side view of a microphone activatable keyless portable cellular phone;

FIG. 12 is a left side view of a microphone activatable keyless portable cellular phone;

FIG. 13 is a rear view of a microphone activatable keyless portable cellular phone;

FIG. 14 is a partial front cross-sectional view of the microphone activatable keyless portable cellular phone shown in FIG. 8;

FIG. 15 is a partial left cutaway view of the microphone activatable keyless portable cellular phone shown in FIG. 8;

FIG. 16 is an upper cross-sectional view of the microphone activatable keyless portable cellular phone shown in FIG. 8;

FIG. 17 is a center cross-sectional view of the microphone activatable keyless portable cellular phone shown in FIG. 8;

FIG. 18 is a lower cross-sectional view of the microphone activatable keyless portable cellular phone shown in FIG. 8;

FIG. 32 shows a portable cellular phone having an airtime cartridge which includes a modem, through which a user may establish an Internet connection;

FIG. 33 shows a miniature keyless portable cellular phone having a headset;

FIG. 34 shows a automobile dash-mounted miniature keyless portable cellular phone having a headset;

DETAILED DESCRIPTION OF PREFERRED EMBODIMENTS

Figure 1:
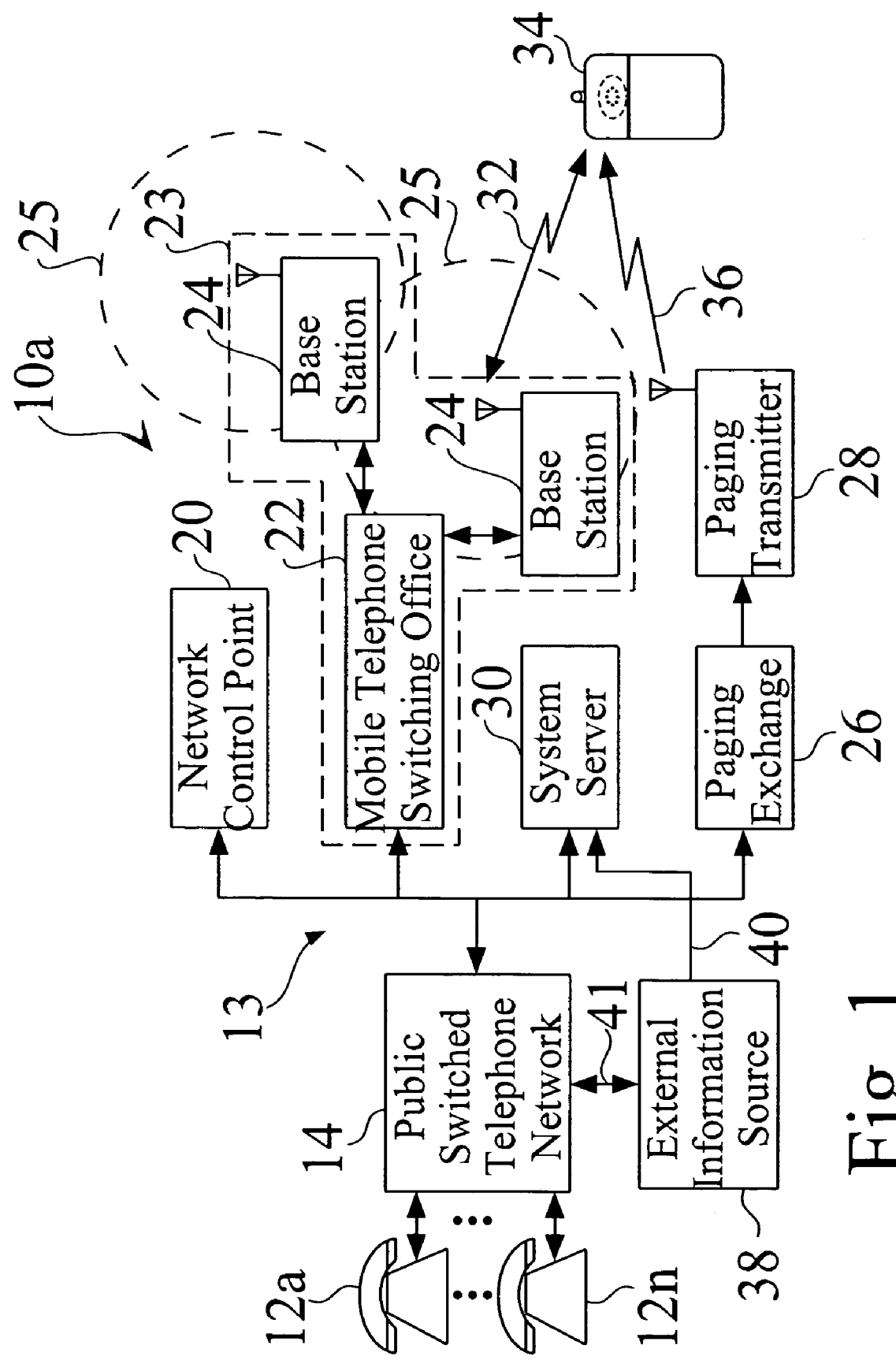
FIG. 1 is a functional block diagram of for a portable cellular phone system with a remote voice recognition operating system.

FIG. 1 is a functional block diagram of for a portable cellular phone system 10a with a voice recognition operating system. Conventional telephones 12a-12n are connected, through a public switched telephone network (PSTN) 14 to a system network 13, which is connected to a network control point (NCP) 20, which provides routing decisions. A mobile phone infrastructure 23 includes a mobile telephone switching office (MTSO) 22, which is connected to network 13, and to one or more base stations 24. A paging exchange 26 is also preferably connected to network 13, and is connected to one or more paging transmitters 28.

A portable cellular phone system server 30 is also connected to the system network 13. A portable cellular phone 34, which is preferably keyless, when activated, is in communication with the system server 30, through a base station 24, the mobile telephone switching office 22, and the system network 13, i.e. the mobile telephone, switching office 22 and one or more base stations 24 are located between the system server 30 and the portable cellular phone 34. Therefore, communication between the system server 30 and the portable cellular phone 34 goes through the mobile telephone switching office 22, and the closest base station 24 to the remote portable cellular phone 34.

While the system server 30 is shown as a discrete component in communication with the mobile telephone switching office 22, the system server 30 can alternately be a module within a mobile telephone switching office 22.

In a preferred embodiment, one or more external information sources 38 are able to send information to the system server 30, either directly 40, or indirectly 41, such as through the public switched telephone network 14 or an internet connection.

The cellular telephone system 10a provides communication between the portable cellular phone 34 and other devices in the system 10a, such as with conventional telephones 12-12n, conventional cell phones, conventional pagers, or other portable cellular phones 34.

In a preferred embodiment, wherein the portable cellular phone 34 includes paging circuitry 107 (FIG. 11), the portable cellular phone 34 receives incoming calls, by receiving a paging signal 36 from the system server 30, paging exchange 26 and a paging transmitter 28. By selective activation of the phone 34, the user is routed through the system server 30 to the incoming phone call.

Figure 2:
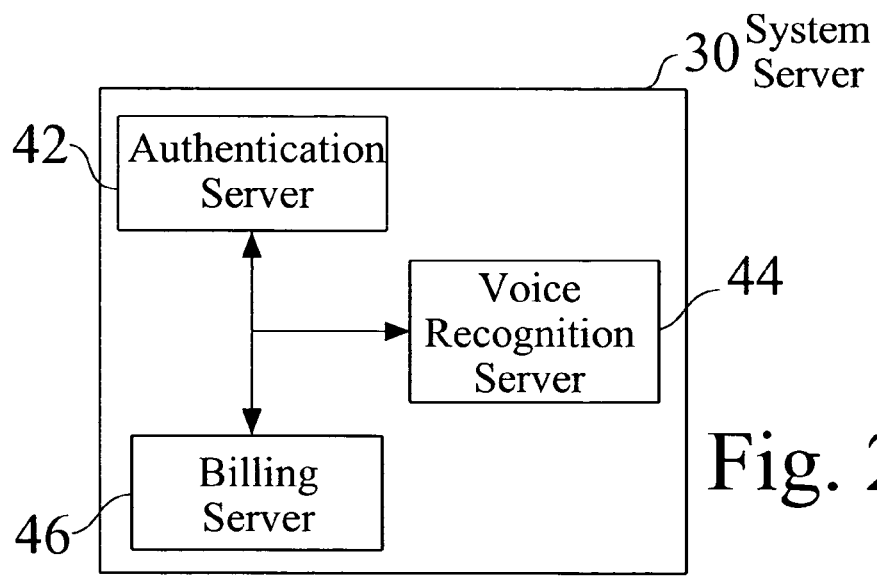
FIG. 2 is a functional block diagram of a system server for a portable cellular phone system with a remote voice recognition operating system.
Figure 3:
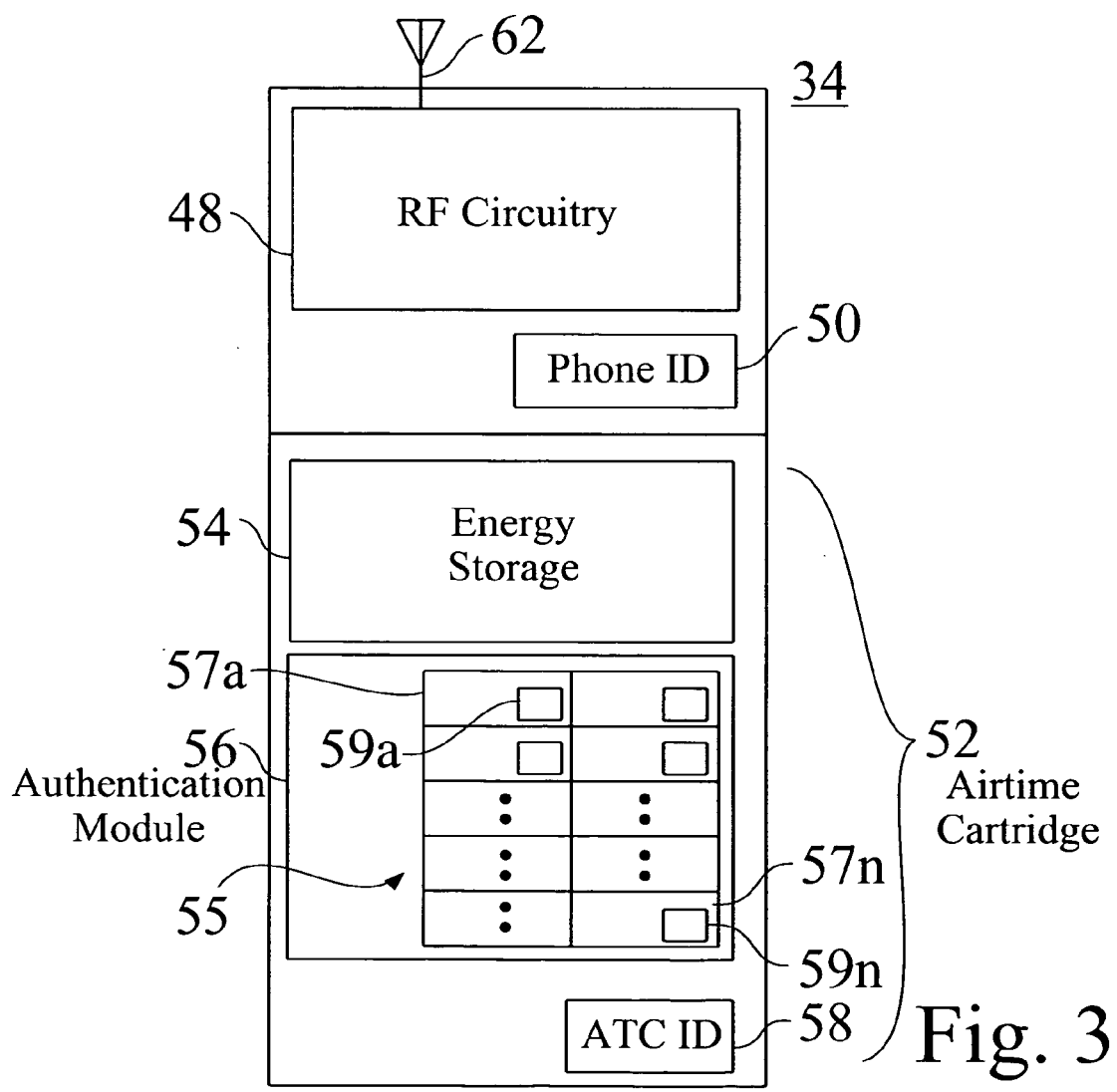
FIG. 3 is a block diagram of a portable cellular phone having an airtime cartridge.

FIG. 2 is a functional block diagram of a portable cellular phone system server 30, which includes an authentication server 42, a voice recognition server 44, and a billing server 46. The authentication server 42 authorizes the system connection for a portable cellular phone 34, and controls communication for the portable cellular phone 34, based on the receipt of authorized airtime communication units 57, i.e. pre-paid tokens, as shown in FIG. 3. The voice recognition system 44 allows a user to operate a portable cellular phone 34, whereby voice commands which are entered by a user into the portable cellular phone 34 are remotely interpreted by the voice recognition system 44, such as to dial out to a phone 12, or to access remote information. The voice recognition system 44 also typically provides voice prompts to the user, such as through the recall and transmission of stored system messages, or the transmission of synthesized voice signals. The billing server 46 decrements received authorized pre-paid airtime communication units 57 from the portable cellular phone 34.

Since the system server 30 includes the functionality of an authentication server 42, a voice recognition server 44, and a billing server 46, most of the intelligence for the system 10a is located externally from the portable cellular phone 34. The distributed intelligence offered by the system server 30 allows the portable cellular phone 34 to operate with a minimal amount of processing power or stored intelligence, and without a keypad.

The voice recognition server 44 interactively communicates with the remote user. For example, the remote user, upon being prompted by the voice recognition server 44, may input a local phone number "415-555-1234". The voice recognition server 44, upon confirmation that of the user's choice for an outgoing call, typically notifies the user that a connection will now be made, such as with a message, e.g. "415-555-1234 confirmed. Making connection.", and allows the system server 30 to direct the call from the portable cellular phone 34 to the destination phone 12.

While the voice recognition server 44 is shown within system server 30, the voice recognition server 44 may be located at one or more locations throughout the network 18.

FIG. 3 is a block diagram for a portable cellular phone 34 with a voice recognition operating system. The portable cellular phone 34 houses RF circuitry 48, and in a preferred embodiment, there is a unique communicatable phone ID 50 associated with the portable cellular phone 34.

The portable cellular phone 34 also includes an airtime cartridge 52. The airtime cartridge 52 comprises energy storage 54, an airtime cartridge identifier (ATC ID) 58, and an authentication module 56 having a set 55 of single use communication units 57a-57n, wherein each of the communication units has a separate, unique associated ID 59a-59n. For example, in FIG. 3, communication unit 57a includes a unique identifier 59a. The use of unique identifiers 59 provides unique encryption, as well as secure transmission for each communication unit 57 that is transmitted from the portable cellular phone 34 to the system server 30.

Figure 20:
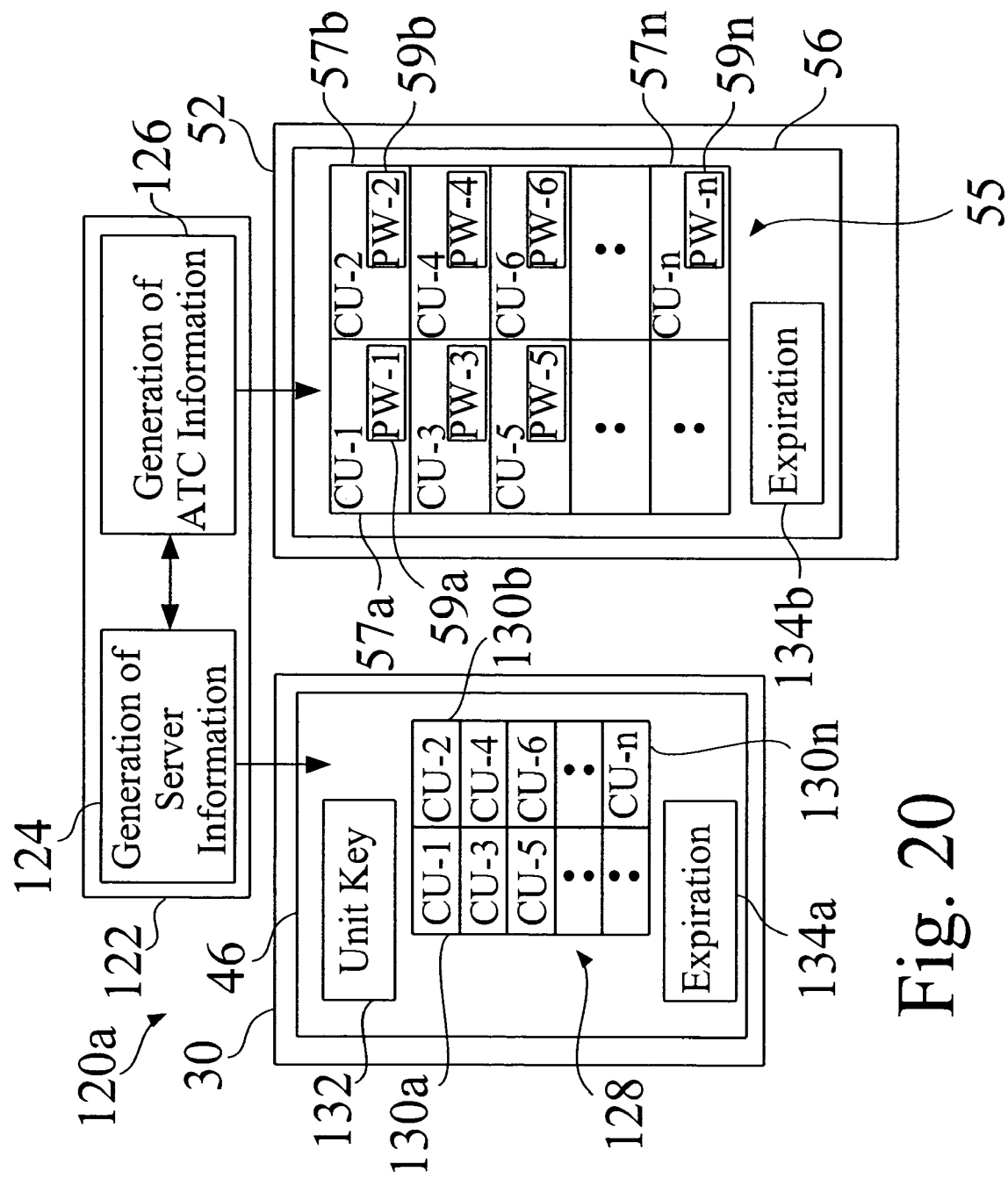
FIG. 20 is a functional block diagram of algorithmic generation of server information and airtime cartridge information.
Figure 21:
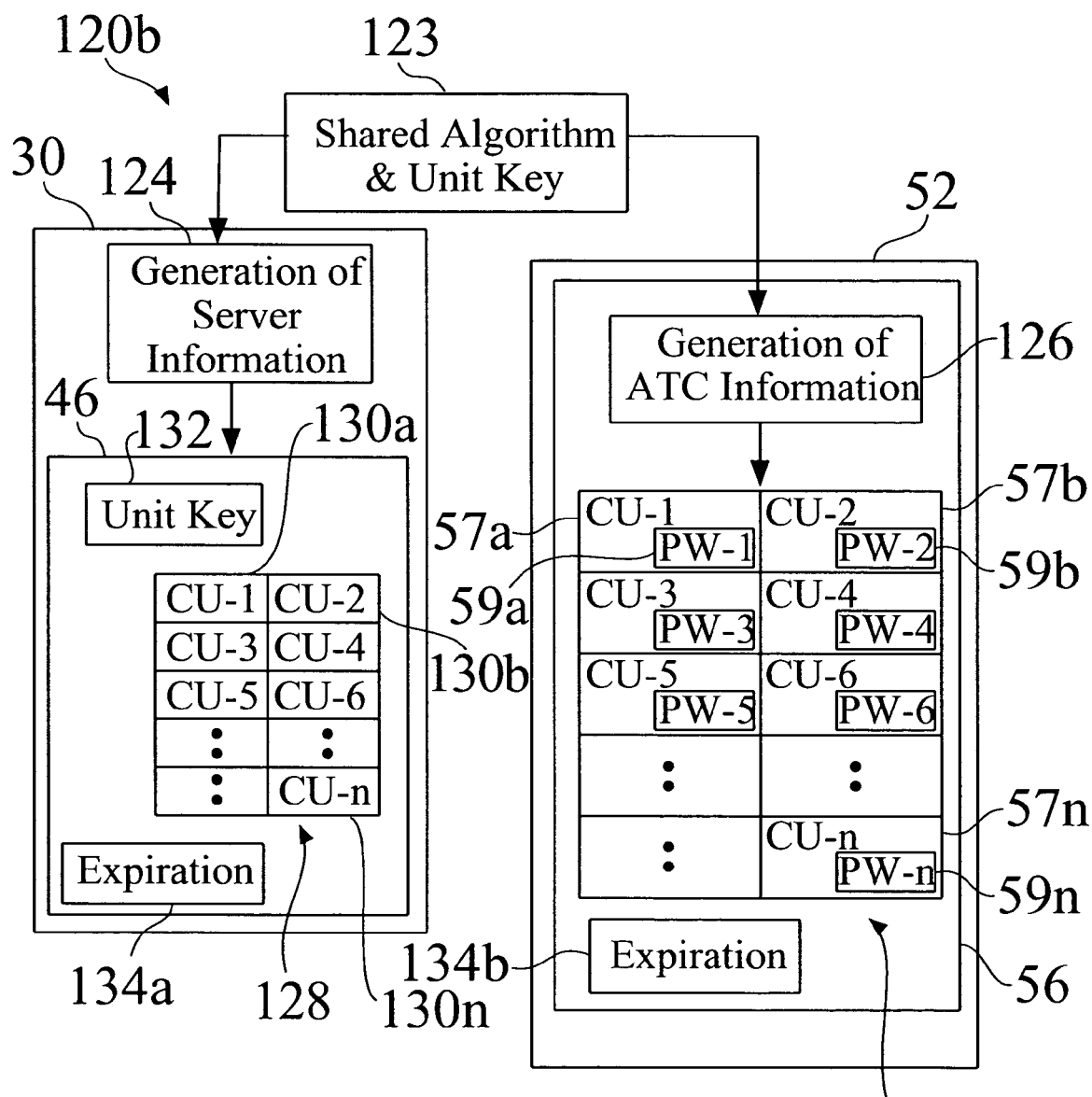
FIG. 21 is a functional block diagram of an alternate embodiment of algorithmic generation of server information and airtime cartridge information.

The portable cellular phone 34 typically uses either an internal airtime cartridge 52, or a replaceable airtime cartridge 52. Airtime cartridges 52 are typically preloaded (FIG. 20) with a stored set 55 of single use airtime communication units 57a-57n. In alternate embodiments, airtime cartridges 52 contain a stored algorithm 123 and a unique unit key 132 (FIG. 21), by which a set 55 of pre-paid single use airtime communication units 57a-57n is produced within the airtime cartridge 52 (FIG. 21).

In contrast to a conventional cell phone, there is no requirement for a unique drop number for locating the portable cellular phone 34, or for attributing service to a registered user for billing purposes. For basic calling services within the system, such as for an outgoing local call, the system 10 is prepaid, and the billing server 46 allows communication, based upon the ongoing receipt of valid communication units 57 having valid unique identifiers 59, at the system server 30.

FIG. 4 is a block diagram showing the defined time value 65 of a set 55 of pre-paid single use communication units 57a-57n. Each of the pre-paid single use communication units 57a-57n has a time value increment 63, which can be used to acquire services from the system server 30 for a time equal to the time value increment 63. Therefore, the entire defined time value 65 for a set 55 of pre-paid single use communication units 57a-57n is equal to the number of pre-paid single use communication units 57a-57n, times the time value increment 63 of each pre-paid single use communication unit 57. Timed usage of the portable phone 34 is credited against the remaining credit value within an airtime cartridge 52, until the credit value 65 is entirely depleted.

System use is limited to the total value 65 of prepaid communication units 57a-57n within the authentication module 56 of the airtime cartridge 52, i.e. the maximum duration of service is equivalent to the prepaid airtime, which is the sum of all the prepaid communication units 57a-57n.

In contrast to conventional cellular phones, where service is sold separately, the pre-paid airtime cartridge 52 provides the user with increments of system access, and does not require a separate personal subscription contract with a telephone communication entity. The user therefore may gain further system access by simply purchasing another airtime cartridge 52, not by purchasing another portable phone 34, nor by establishing a personal subscription contract.

While a basic portable cellular phone 34 does not require a unique phone ID 50, either to route communication to the remote portable cellular phone 34, or for billing purposes, preferred embodiments include a unique phone ID 50 and a secret authentication key, typically for accessing preferred services. However, payment for such preferred services is still associated with the transmission of pre-paid single use airtime communication units 57 from the portable cellular phone 34 to the system server 30.

FIG. 5 is a block diagram 60 of hardware components and circuitry 48 for a portable cellular phone 34. The components include a microprocessor 66 capable of receiving 64 an incoming RF signal 32a, and transmitting 82 an output RF signal 32b. The received signals 32a arriving at the antenna 62 are demodulated and processed by the microprocessor 66. The received, processed signals 68 and are then converted to audio signals 72 by a digital to analog (D/A) converter 70, and are then emitted through a speaker earphone 74.

For transmission, the user's voice is input into a microphone 76 to produce an input audio signal 78, which is then converted 80, processed 66, and transmitted 82 from he antenna 62 as an outgoing RF signal 32b. The portable cellular phone 34 contains internal logic 84, preferably with a preprogrammed unique phone identifier 50, as well as additional required information, such as service provider information. Memory 86 is preferably used to store pre-recorded messages 87a-87n, such as "No Service" 158 (FIG. 25), "No Credit Remaining" 168 (FIG. 25), or "Low Battery". The system is powered from energy source 54 within the airtime cartridge 52.

The portable cellular phone 34 is operated by a voice recognition system 44 located at the system server 30, and by internal operating logic 84 and memory 86, which is automatically activated when the portable cellular phone 34 is powered on. Since the portable cellular phone 34 is controlled and operated by the user's voice, the portable cellular phone 34 is not required to have key pad, as on a conventional wired or cellular phone.

Figure 23:
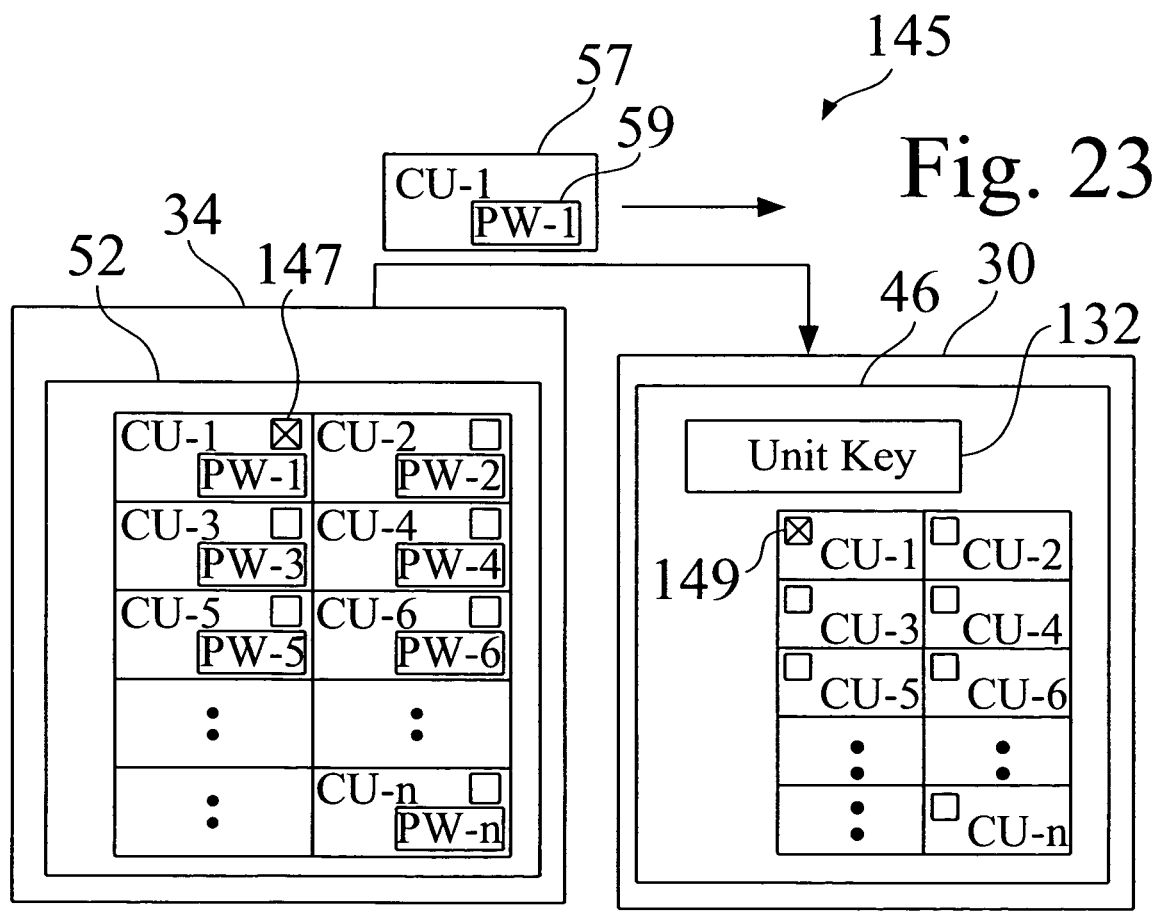
FIG. 23 is a schematic diagram showing the sequential transmission and debiting of encrypted airtime communication units.

In a basic embodiment of the portable cellular phone 34, the phone logic 84 includes a simple time counter, with which the portable cellular phone 34 tracks the usage of prepaid airtime communication units 57 while the phone is activated and talking with the system server 30, and decrements the remaining communication units 57 as "used" or exhausted 149 (FIG. 23).

The portable cellular phone 34 preferably contains a small amount of stored information 87a-87n, such as simple acoustic messages, e.g. beeps, rings, or recorded voice messages. Simple beeps can be used to indicate many system functions. For example, since the portable cellular phone 34 counts how much pre-paid time remains, corresponding to the number of remaining airtime communication units 57, the portable cellular phone 34 may provide a series of audible beeps that is a function of remaining pre-paid time, e.g. five beeps for five minutes of pre-paid service remaining. While simple audio signals may offer only rudimentary information, a portable cellular phone 34 having less stored intelligence and processing power provides adequate and affordable system access for many users.

The portable cellular phone 34 may alternately provide the recall of simple stored voice messages 87, such as "Five minutes remain". In preferred system embodiments, more extensive messages 87 are stored on the portable cellular phone 34, more detailed messages are provided by the system server 30, or more extensive virtual assistance is provided by the voice recognition server 44. Detailed stored messages may notify the user of operating conditions, e.g. "No service in the area". Portable cellular phones 34 offering a wide range of services and ease of use are often preferred by sophisticated users, such as business travelers. While such preferred embodiments of the portable cellular phone 34 may require more memory and/or processing power, the increased functionality and ease of use is advantageous for many users. As well, no airtime is used, i.e. spent, to transmit these voice messages to the user.

FIG. 6 is a front view of a keyless portable cellular phone 34*a*. FIG. 7 is a side view of a keyless portable cellular phone 34*a* shown in FIG. 6. The phone body 90 is comprised of a first lower housing 92*a* and a second upper housing 92*b*, connected by a hinge mechanism 94. The first lower housing 92*a* includes a microphone 76, while the second housing includes an earphone 74, and an antenna 62.

The keyless portable cellular phone 34*a* shown in FIG. 6 and FIG. 7 is foldable, whereby the first lower housing 92*a* and the second upper housing 92*b* are controllably moved about the hinge 94, between a first, closed unactivated storage position 96*a* and a second, open activated position 96*b*. In contrast to conventional cell phones, the keyless voice recognition phone 34 is unactivated, i.e. powered off in its natural state. In an alternate embodiment of the keyless portable cellular phone 34, an on/off activation switch is used for selective activation. In other alternate embodiments of the keyless portable cellular phone 34, a slidable or rotatable microphone boom is used for selective activation. As a mobile user travels throughout the day, an unactivated phone 34 does not relay any information to base stations 24.

In FIG. 6 and FIG. 7, the rotatable antenna 62 is movable from a first closed antenna position 98*a* to a second open antenna position 98*b*. While a rotatable antenna 62 is shown, several varieties of antennas 62 may be used, such as short flexible stationary antennas, telescoping antennas, or imbedded internal antennas 62.

In the embodiment shown in FIG. 6 and FIG. 7, the keyless portable cellular phone 34*a* comprises a simple, small, foldable unit, having a width 97 of 1.29 inches, and an open height 95 of 3.2 inches. The keyless portable phone 34*a* shown in FIG. 6 and FIG. 7 is a sealed limited service time unit, and does not provide access to internal components for service. The airtime cartridge 52 and energy storage 54 are located within the phone body 90.

Since the portable cellular phone 34 is not required to have a keypad, some embodiments of the portable phone 34 may be extremely small, e.g. a lapel phone. The sizes of different current portable cellular phones 34 are currently limited by the size of energy storage 56. For example, a portable cellular phone 34 designed for short duration may be very small, while a portable cellular phone 34 having a larger energy capacity 56 typically requires a larger enclosure 90.

Figure 19:
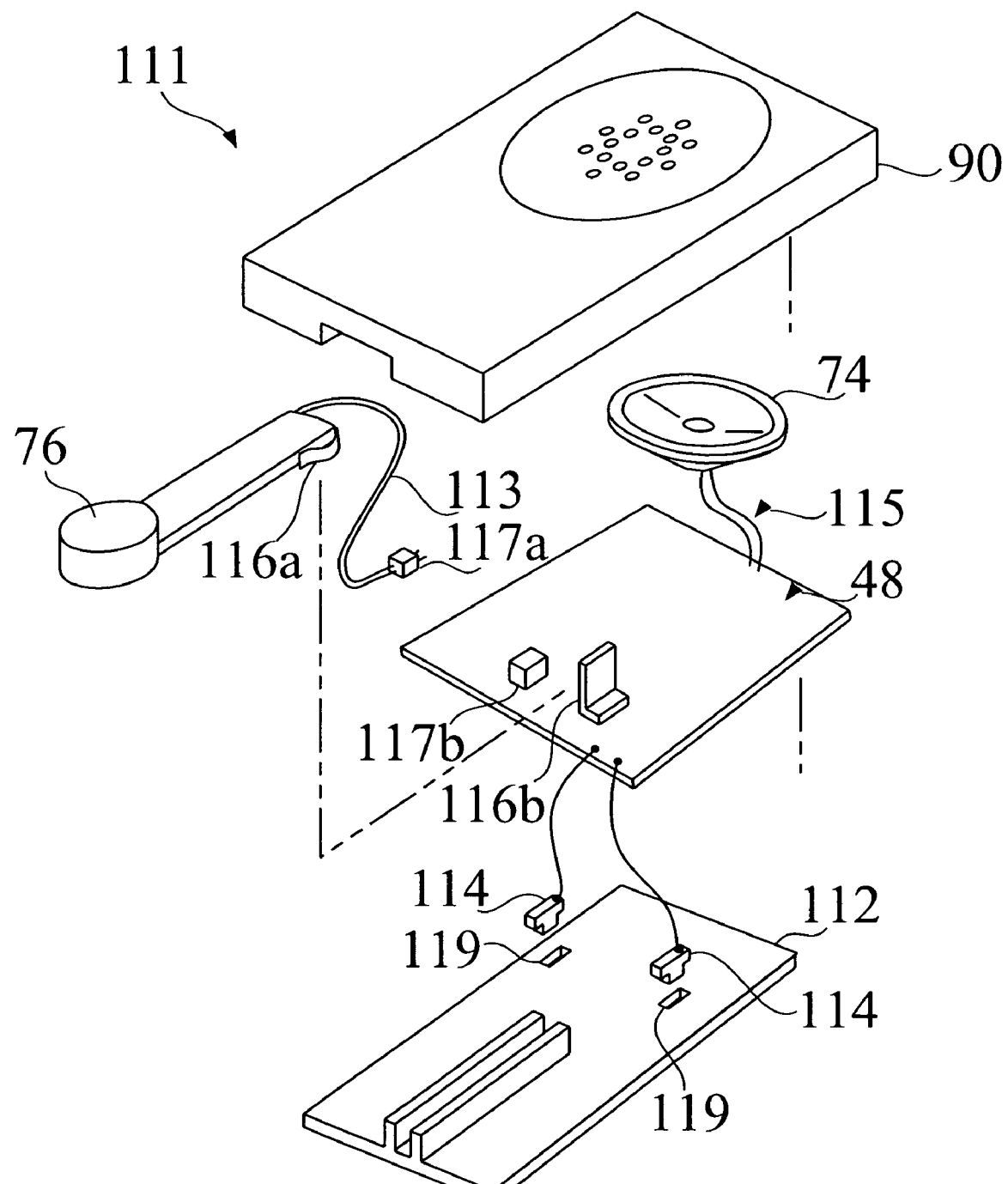
FIG. 19 is a partial expanded assembly view of an alternate embodiment of a microphone activatable keyless portable cellular phone.

Portable cellular phones 34 are typically powered on by first opening the phone to the open position 96*b* (FIGS. 6,7), by pulling out or rotating a microphone 76 (FIGS. 11-19), or by manually toggling an on/off button, which triggers a switch 116 (FIG. 19). When a portable cellular phone 34 is powered on, the internal logic 86 is activated, and attempts to establish an authorized connection with the system server 30. The portable phone 34 then preferably indicates the number of minutes of service airtime which remain, such as by an audio message 172 (FIG. 25), and then requires voice operated dialing to place an outgoing call. Therefore, the portable cellular phone 34 is automatically activated, when the user opens the device to a calling position 18*b*.

The portable cellular phone 34 can either be unidirectional (dial-out only) or can be multidirectional (dial in as well as dial out). A basic unidirectional dial-out portable cellular phone 34 is automatically powered down when not in active use, to conserve the active life of the battery 54.

The keyless portable cellular phone 34*a* shown in FIG. 6 and FIG. 7 is activated by means of opening the phone, i.e. flipping or pulling open, and is deactivated by closing the phone at the end of the communication period. The opening of a portable cellular phone 34 typically includes the simultaneous transmission of an identification code and connection to the service provider or system server 30 of a telephone company, which enables authorized prepaid access to a PSTN line.

As described above, a conventional cell phone operates as a single entity, having a transmitted ID, i.e. the drop number, by which services are provided to the user, and by which the registered user is billed for services received. In contrast, the portable cellular phone 34 preferably has two identities, the phone ID 50, which is used to access preferred services, and the ATC ID 58, which is used to make payments to the system server 30, by transmitting discrete pre-paid airtime communication units 57*a*-57*n* for increments of service.

For example, in a preferred embodiment, a user may download external information 38 (FIGS. 1, 29) to the system server 30, such as a personal electronic address book database, e.g. such as created using OUTLOOK™ software, from MicroSoft, Inc., of Redmond, Wash., and may preferably link database records, i.e. such as commonly called phone numbers to speed-dial numbers within the system server 30. In this example, it is preferred that the established address book and speed-dial codes be linked with the portable cellular phone 34, having a phone ID 50, so that the user may retrieve the address book information, or use the programmed speed-dial numbers, while using the portable cellular phone 34, even when a new pre-paid airtime cartridge 52 is installed.

Preferred Phone Embodiments. FIG. 8 is a front view of a preferred microphone activatable keyless portable cellular phone 34*b*, which includes a removable airtime cartridge 52, which forms part of the external body 90. The microphone activatable keyless portable cellular phone 34*b* comprises three main subassemblies, which include the main phone body 90, the removable airtime cartridge 52, and the microphone boom 101 (FIG. 13). The main phone body includes the phone electronic circuitry 48 (FIG. 3, FIG. 5) including an internal antenna 62, power contacts 114 (FIG. 19), earphone 74, and an activation on/off switch 116 (FIG. 19) defined between the phone body 90 and the moveable microphone boom 101. The earphone 74 is located in the upper region of the front of the phone body 90.

The airtime cartridge 52 includes pager circuitry 107 and a pager ID 109. In one embodiment, internal energy storage 54 comprises four size "AAA" cell batteries. Means for attaching 108 (FIG. 10) the airtime cartridge 52 to the phone body 90 are also included, such as integral tabs, snaps, or other suitable fasteners, which allow the airtime cartridge 52 to be easily attached and detached from the phone body 90. The removable airtime cartridge 52, with integral energy storage 54, preferably fits within the design form of the phone body itself, such that when in place, the phone body 90 fits securely and comfortably in the hand of a user.

FIG. 9 is an upper view of a microphone activatable keyless portable cellular phone 34b, which shows a microphone movement switch 100. FIG. 10 is a lower view of a microphone activatable keyless portable cellular phone 34b, showing the microphone 76, as well as airtime cartridge release latch 108. FIG. 11 and FIG. 12 provide respective right and left side views of a microphone activatable keyless portable cellular phone 34b, which show the relative thickness of the airtime cartridge 52, based on the use of standard "AAA" cell batteries. In alternate embodiments of the airtime cartridge 52, using different energy storage 34, the relative thickness of the airtime cartridge 52 may be different. The phone body also preferably includes an attachment loop 110, whereby a user can attach the phone to a strap or keychain (not shown). FIG. 13 is a rear view of a microphone activatable keyless portable cellular phone 34b. The microphone movement switch tab 100 on the microphone boom 101 is movable from a first closed position 104a, wherein the microphone 76 is in a closed position 106a, to a second open position 104b, wherein the microphone 76 is in an open position 106b within a switch channel 102. When the microphone is in the closed position 106a, the keyless portable cellular phone 34b is unactivated, and when the microphone is in the open position 106b, the keyless portable cellular phone 34b is activated, and establishes contact, or maintains contact, with the system server 30.

The microphone 76 is preferably assembled in a thermoplastic elastomeric boom 101, that is soft to the touch, and flexible, but sufficiently rigid to allow the boom to be extended, i.e. telescoped, from the phone body 90, to project closer to the mouth of the user, when the phone is in use.

When the keyless portable cellular phone 34b is off (not in use), the microphone boom 101 is deployed within the phone body 90. To use the keyless portable cellular phone 34b, to make an outgoing call, or to receive a call, the microphone boom 101 is extended, either by pushing the microphone movement switch tab 100 located on the top of a spine ridge 103, or by pulling on the end of the microphone boom 101. As the microphone boom 101 is extended to open position 106b, the internal activation switch 116 is closed, activating the keyless portable cellular phone 34b. To end a call, the microphone boom 101 is slid back into the phone body 90. The microphone 76 is electrically connected to the electronic circuitry 48 by a flexible microphone lead 113 (FIG. 19), which ensures that electrical contact between the microphone 76 and the electronic circuitry 48 is maintained, whether the microphone boom 101 is deployed 106b or recessed 106a.

FIG. 14 is a partial front cross-sectional view of a microphone activatable keyless portable cellular phone 34b. FIG. 15 is a partial left cutaway view of a microphone activatable keyless portable cellular phone 34b. FIG. 16 is an upper cross-sectional view of a microphone activatable keyless portable cellular phone 34b. FIG. 17 is a center cross-sectional view of a microphone activatable keyless portable cellular phone 34b. FIG. 18 is a lower cross-sectional view of a microphone activatable keyless portable cellular phone 34b.

FIG. 19 is a partial expanded assembly view of an alternate embodiment of a microphone activatable keyless portable cellular phone 34c. The microphone activatable keyless portable cellular phone 34c includes a slidable activation switch 116, comprising switch contact 116a and swipe contact 116b. When the microphone 76 is moved from a first closed position 106a to a second open position 106b, switch contact 116a and swipe contact 116b come into electrical contact with each other, to activate the portable cellular phone 34c. The microphone activatable keyless portable cellular phone 34c also includes a top closure panel 112 which connects to phone body 90. The RF circuitry includes battery contacts 114, which extend through contact holes 119 define through the top closure panel 112, to make contact with stored energy 54 within a connected airtime cartridge 52. The earphone 74 is electrically attached to the RF circuitry 48 by speaker leads 115, and the microphone 76 is attached to the RF circuitry 48 by a flexible microphone lead 113 and microphone interconnects 117a, 117b.

Matched Algorithmic Generation and Storage of Information. FIG. 20 is a functional block diagram 120a showing matched algorithmic generation 122 of server communication unit information 124 and airtime cartridge communication unit information 126. In FIG. 20, the algorithmically generated server communication unit information 124 includes a set 128 of single use server communication units 130a-130n with an associated unit key 132. Also in FIG. 20, the algorithmically generated airtime cartridge communication unit information 126 includes a set 55 of single use airtime communication units 57a-57n, wherein each of the single-use communication units has a separate, unique associated ID 59a-59n. Furthermore, the algorithmically generated unique identifiers 59a-59n, for the set 55 of single use airtime communication units 57a-57n, is also matched to the unit key 132 within the system server, such that each transmitted encrypted unique ID 59 may be decrypted correctly by the unit key 132 within the system server 30, allowing a match between corresponding airtime communication units 57 and server communication units 130.

Through matched algorithmic generation 122, the algorithmically generated set 128 of single use server communication units 130a-130n matches the algorithmically generated set 55 of single use airtime communication units 57a-57n. Therefore, each algorithmically generated single use communication unit 130 corresponds to a matching algorithmically generated single use airtime communication unit 57. For example, single use communication unit 130a matches single use airtime communication unit 57a, i.e. CU-1 equals CU-1, and single use communication unit 130b matches single use airtime communication unit 57b, i.e. CU-2 equals CU-2.

As well, the total number of single use server communication units 130a-130n within server set 128 matches the total number of single use airtime communication units 57a-57n in the ATC set 22. Also, the defined time interval of service 63 (FIG. 4), e.g. one minute of local communication, is the same for each generated single use server communication unit 130 and single use airtime communication units 57.

Different airtime cartridges 52 can vary in the defined pre-paid time allotment 65 (FIG. 4) for the set 55 of single use airtime communication units 57a-57n. For example, one set 55 may provide 30 minutes total service of local calls, while another set 55 provides 60 minutes total service of long distance calls.

The matched algorithmic generation 122 of server communication unit information 124 and airtime cartridge communication unit information 126 can be performed at several locations, such as at the point of manufacture of the airtime cartridges 52. Alternatively, airtime cartridges 52 may be loaded with sets 55 of communication units 57a-57n at a remote location, such as at a point of purchase of the airtime cartridge 52. In a preferred embodiment, new sets 55 of communication units 57a-57n may be installed in an airtime cartridge 52.

FIG. 21 is a functional block diagram of an alternate embodiment 120b for matched algorithmic generation of server communication unit information 124 and airtime cartridge communication unit information 126. In FIG. 21, a shared algorithm 123, such as a unit key 132, is supplied to both the system server 30 and the airtime cartridge 52. Using the supplied algorithm 123, the algorithmic generation of server communication unit information 124 is performed within the system server 30, and the algorithmic generation of airtime cartridge communication unit information 126 is performed within the airtime cartridge 52. Sets 128 of single use server communication units 130a-130n may be established all at once, and then stored within the system server 30, or may alternately be produced, as needed by the system server 30. As well, sets 55 of single use airtime communication units 57a-57n may be established all at once by a processor within the airtime cartridge 52, and then stored to memory, or may alternately be produced, as needed, by the airtime cartridge 52.

For a simple shared authentication algorithm 123, the processing required for algorithmic generation of server communication unit information 124 or airtime cartridge communication unit information 126 may not be significant, as compared to the cost of memory within the system server 30 or airtime cartridge 52, such that internally generated information 120b may be feasible for either or both units. In alternate embodiments, the use of challenge/response systems may be used to establish matched server communication unit information 124 and airtime cartridge communication unit information 126.

Activation and Shelf Life of Airtime Cartridges. As described above, airtime cartridges include energy storage 54, such as a battery supply 54. For airtime cartridges 52 that include a single use energy storage 54, each airtime cartridge 52 inherently has an energy shelf life, due to inherent loss of stored energy from the batteries 54. An energy shelf life expiration date 232 (FIG. 28) is therefore preferably included for airtime cartridges 52 having single use energy storage 54, such that vendors may rotate airtime cartridges 52 to be sold and used while there is sufficient stored energy 54, and such that unsold airtime cartridges which have potentially lost adequate energy are not distributed, i.e. sold, to portable phone users.

In addition, as shown in FIG. 20 and FIG. 21, the generated server communication unit information 124 preferably includes the establishment of an expiration date designator 134a for the set 128 of server communication units 130a-130n, while the generated airtime cartridge communication unit information 126 preferably includes the establishment of an expiration date designator 134b for the set 55 of single-use airtime communication units 57.

The first time an airtime cartridge 52 is activated, the phone 34 transmits the first single use airtime communication unit 57a, having a unique associated ID 59a, for a set 55 of single use airtime communication units 57a-57n. When the authentication server 42 receives the first single use airtime communication unit 57a, having a unique associated ID 59a, and matches the first single use airtime communication unit 57a to the first single use server communication units 130a with an associated unit key 132, the authentication server 42 activates the matching set 128 of single use server communication units 130a. In addition, the phone 34 activates the set 55 of single-use airtime communication units 57.

As well, in a preferred embodiment, an expiration date is then applied to each set 55, 128 of communication units, typically corresponding to a time span, i.e. the shelf life 134a, 134b for which the airtime cartridge 52 is expected to be used, e.g. from thirty from sixty days from the date of first use, and beginning when the airtime cartridge 52 is first used, i.e. when the sets 55, 128 are activated. For example, if an airtime cartridge 52, having a designated ATC expiration 134a, 134b of 30 days was first activated on Jun. 1, 1998, the authentication server 42 allows the pre-paid airtime communication units 57 for that airtime cartridge 52 to be used within 30 days, e.g. an expiration date corresponding to Jul. 1, 1998 is established, both at the system server 30, and at the phone 34.

The established expiration date 134a, 134b of an airtime cartridge 52 is independent of the energy shelf life expiration date 232. For example, an airtime cartridge 52 manufactured on Jan. 1, 1998, with a two year energy shelf life expiration date 232, is expected to provide sufficient stored energy 34 until Jan. 1, 2000. However, if the airtime cartridge 52 includes an established expiration date 134a, 134b of sixty days from first use, and the airtime cartridge 52 is first used on Jun. 1, 1999, the airtime cartridge 52 therefore expires on Aug. 1, 1999, or even before, though usage of all the pre-paid single use airtime communication units 57a-57n.

Figure 22:
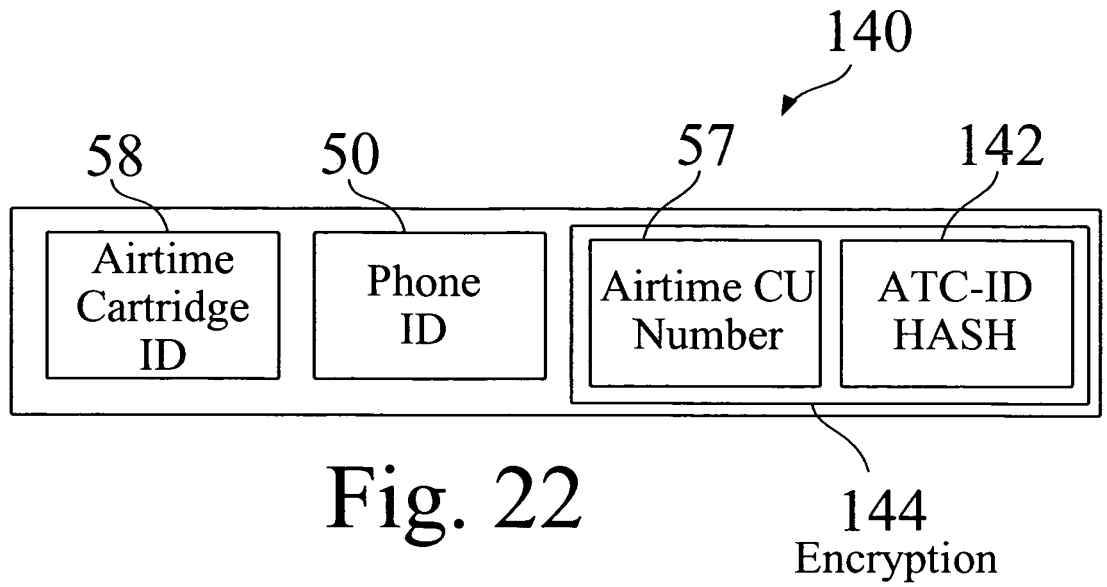
FIG. 22 is a block diagram of an authentication information packet.

System Security. FIG. 22 shows an authentication information packet 140, which is transmitted from a portable cellular phone 34, and is received by the system server 30, to be authenticated by the authentication server 42. An authentication information packet 140 typically contains the airtime cartridge ID 58 for an installed airtime cartridge 52 within the portable cellular phone 34. In a preferred embodiment, wherein the portable cellular phone 34 includes a phone ID 50, the phone ID 50 is also typically included within the authentication information packet 140. The authentication information packet 140 also includes the transmitted pre-paid airtime communication unit 57, and an ATC-ID Hash 142. While the ATC ID 58 and the phone ID 50 are typically transmitted as dear text, i.e. unencrypted, within the packet 140, the transmitted pre-paid airtime communication unit 57, and the ATC-ID Hash 142 are preferably sent with encryption 144. In one embodiment, the encryption 144 is 3DES (Data Encryption Standard) or similar encryption. The encryption of each transmitted pre-paid airtime communication unit 57 provides protection against malicious attacks to the system 10 by unauthorized users or entities.

In some embodiments, the authentication information packet 140 is transmitted from the portable cellular phone 34 at the start of any call, while subsequent transmission of unique encrypted identifiers 59a-59n is used during an ongoing call (FIG. 23). In alternate embodiments, the authentication information packet 140 is repeatedly transmitted from the portable cellular phone 34 during a call. Repeated transmission of authentication information packets 140 protects the system 10 from "bait and switch" attacks by unauthorized users.

The stronger the encryption 144 used for a transmitted authentication information packet 140, the longer the authentication server 42 typically takes to authenticate a user. For extremely strong encryptions 144, there may be a slight delay between the initial activation of a portable cellular phone 34 by a user, and the beginning of voice-activated operation from the voice recognition server 44 within the system server 30.

In an alternate embodiment, authentication information packets 140 are repeatedly transmitted from the portable cellular phone 34 during a call, whereby sequential airtime communication units 57 are sent in sequential authentication information packets 140. In such an embodiment, each communication unit 57 includes unique encryption, as created by an associated unit key 132, which can be performed at the time of transmission (thus avoiding the cost of storing encrypted unique identifiers 59.

In addition, there is no requirement to pre-compute server communication units 130, such as within the system server 30. For every ATC ID 58, the authentication server 42 reserves a matching associated unit key 132, e.g. such as a 168-bit 3DES key. When the authentication server 42 receives each authentication packet 140, the authentication server 42 reads the ATC ID 58 within the authentication information packet 140, and uses the unit key 132 associated with the ATC ID 58 to decrypt the single-use airtime communication unit 57. The decrypted single-use airtime communication unit 57 is then decremented from the remaining time value 65 for the airtime cartridge 52 (FIG. 23).

The encryption 144 is different for each authentication information packet 140, while a single ATC ID 58, matched to a single unit key 132, is associated with the airtime cartridge 52. Therefore, what is transmitted is a discrete authorization for a single communication unit 57, which is time dependent. If an unauthorized user manages to receive a transmitted communication unit 57, the unauthorized user cannot reuse the communication unit 57 to gain communication service, since the transmitted communication unit 57 is marked at the system server 30 as "Used" 149 (FIG. 23), and cannot be reused.

If an unauthorized user breaks the encoding mechanism, i.e. the unit key 132, for a single airtime cartridge 52, the unauthorized user only gains a limited access to the remaining communication units 57 for that single airtime cartridge 52, typically a small portion of communication. Since each airtime cartridge 52 has a unique unit key 132, an unauthorized user must break the encoding mechanism, i.e. the unit key 132, for each single airtime cartridge 52.

In this manner, fraudulent use of the system 10 by unauthorized users is impractical. Since services are pre-paid through the use of pre-paid airtime cartridges 52, unauthorized users cannot gain access to a billing account for a user. Hence, for individual authorized users, the potential financial loss is limited to the cost of remaining communication units 57 within a single airtime cartridge 52.

For the system 10, wide based fraud is prevented, since unauthorized users cannot gain open access to the system network 10. If an unauthorized user listens to the transmitted communication units 57, i.e. intercepts and duplicates a transmitted communication unit 57, they cannot emulate a portable phone 34, because whenever a communication unit 57 is transmitted, it expires. Even if an unauthorized user breaks the unit key 132 for an airtime cartridge 52, they only gain access to the remaining communication units 57 for a particular airtime cartridge 52.

As well, blank airtime cartridges 52 cannot be used to provide unauthorized communication, since blank airtime cartridges 52 are not matched to a set 128 of server communication units 130. Therefore, even if an unauthorized user steals blank airtime cartridges 52, they cannot use the airtime cartridges 52 to gain access to the system server 30. Even if an unauthorized user manages to program an airtime cartridge with a set 55 of airtime communication units 57a-57n, there is no corresponding set 128 of server communication units 130a-130n located at a system server 30 with which the user can be authorized to receive communication.

Transmittal and Authentication of Single Use Communication Units. FIG. 23 is a schematic diagram 145 showing the sequential transmission of encrypted airtime communication units 57, which are each authenticated at a system server 30 and debited against corresponding stored communication units 130, such as within the billing server 46 (FIG. 2).

As a call progresses, the billing server 46 consumes server communication units 130, as airtime communication units 57 are transmitted to the system server 30 from the portable cellular phone 34. The billing server 46 marks the corresponding server communication units 130 on the billing server 46 as used 149, thus debiting the discrete units of service. As well, the portable cellular phone 34 marks the transmitted airtime communication units 57 as used 147, thus also debiting the discrete units of service.

If the transmitted, received, and matched server communication units 130 are entirely depleted 147,149 during the call, i.e. the ATC 52 expires, the billing server 46 typically disconnects the phone communication. In an alternate embodiment, the system server 30 preferably places the call on hold for a period of time, e.g. thirty seconds, such as within a conference server 210 (FIG. 26), while the user replaces the expired airtime cartridge 52 on the fly, with a new or valid airtime cartridge 52. If the call is terminated while there are still server communication units 130 available, the billing server 46 retains the remaining stored communication units 130 within the server database, such that the mobile user can use the phone for subsequent calls.

While in the process of an ongoing phone conversation, the phone 34 repeatedly transmits a unique identifier 59 corresponding to a sequential communication unit 57 within a set 55 of airtime communication units 57, to the system server 30. For example, in a system wherein each communication unit 57,130 allows connected phone service for one minute, the portable phone 34 transmits a unique identifier 59 for each airtime communication unit 57, in a sequential fashion, for each minute of service. The unique identifiers 59 are typically transmitted in an embedded fashion within output signal 32b (FIG. 5) during the communication session, i.e. during the phone call. For instance, during a particular phone conversation, the portable cellular phone 34 transmits a unique identifier 59 for the ninth of a series 55 of twenty sequential communication units 57a-57n. The authentication server 42 checks the ninth unique identifier 57i for authenticity, by matching the ninth unique identifier 59i in the transmitted series 55 to the stored series 128 of server communication units 130. If the authentication server 42 determines that the received communication unit identifier 59 is valid, the system marks the matching server communication unit, e.g. 130i, as used 149, and allows the user of the portable cellular phone 34 another time increment 63 (FIG. 4) of service.

At the end of another minute, the phone 34 transmits the next unique identifier 59j, corresponding to the tenth of a series 55 of twenty sequential communication units 57a-57n, which the authentication server 42 checks for authenticity against the stored tenth server communication unit 130j in the stored set 128 of server communication units 130a-130n.

If the portable cellular phone caller terminates the communication session before the remaining communication units 57 are sent, the remaining communication units 57 can be used for subsequent communication. However, if all the communication units 57 are used before the end of the communication session, the system, i.e. both the system server 30 and the portable phone 34, typically terminates the session, while preferably warning the user, such as with an audio signal or message 192 (FIG. 25), before time expires.

Therefore, each airtime communication unit 57, having a unique identifier 59, is sent only once, and is debited against a matching stored identifier at the authentication server 42. Once a communication unit 57 is sent and matched, such as to pay for a time increment 63 of phone service, the unique identifier 59 is useless for further communication. Within a set 55 of communication units 57a-57n, each unique identifier 59 corresponds to a subsequent time increment 63 of service, such that the portable phone 34 repeatedly sends different unique identifiers 59 for subsequent time periods 63.

Since authentication identifiers 59 are only transmitted once, even if they are captured, they cannot be used again to receive communication services. Therefore, the system 10 provides efficient communication services, which are paid upon the receipt of services, and the system 10 is secure against unauthorized use.

In most embodiments of the system, each communication unit 57,130 corresponds to an allotted time increment 63 of service. In alternate embodiments, one or more communication units (CU) 57,130 may be required to initiate a communication session, or to initiate the first determined time period of a conversation, e.g. five CUs for the first three minutes, and one CU per minute thereafter. In other alternate embodiments, the billing server 46, and the portable cellular phone 34, may debit communication units 57,130 based upon different services, such as local calling, long distance calling, roaming charges, or other service provider charges.

Debiting of Communication Units at Both Phone and Server. As a call proceeds, the series of communication units are sequentially spent, and are counted as used by both the phone 34, and the billing server 46. Debiting of airtime communication units 57 is performed by the portable cellular phone 34, since as a call progresses, the portable cellular phone 34 needs to know which airtime communication units 57 are depleted, and which airtime communication units 57 to send next. In addition, debiting of matching server communication units 130 is performed by the system server 30, since as a call progresses, the system server 30 controls authorized communication, and sequentially debits matching server communication units 130, providing appropriate information to the user, e.g. such as providing a message that the ATC 52 is about to be depleted.

If a transmitted airtime communication unit identifier 59 is properly sent from a portable cellular phone 34, but is not accepted by the system server 30, such as from a single communication unit identifier 59 that is sent and accepted first from an unauthorized user, the portable cellular phone 34 preferably attempts to send the next sequential unused airtime communication unit identifier 59. For example, if a second airtime communication unit identifier 59b is not accepted, it may mean that the second airtime communication unit identifier 59b has already arrived at the system server 30, such as from an unauthorized source. Therefore, the portable cellular phone 34 preferably sends the next airtime communication unit identifier 59c.

Figure 24:
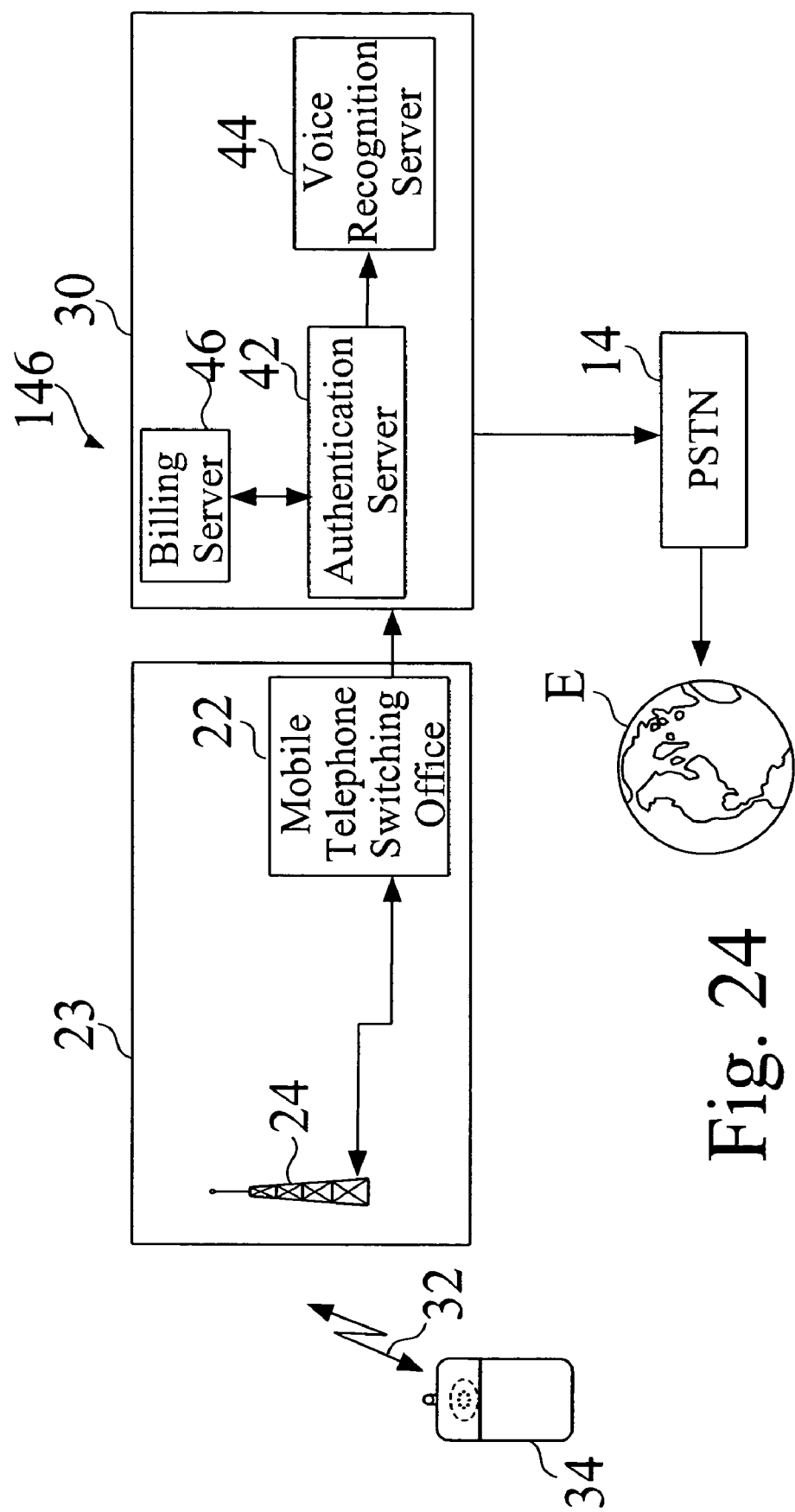
FIG. 24 is a functional block diagram showing communication between a portable cell phone and the system server having remote voice recognition during the establishment of a call.

Establishment of a Call. When a portable cellular phone 34 is authenticated, i.e. authorized, by the authentication server 42 (FIG. 2), the authentication server 42 allows a voice communication link to be established between the portable cellular phone 34 and the voice recognition server 44. FIG. 24 is a functional block diagram 146 for the establishment of a call, between a portable cellular phone 34, the system server 30, and a connected device, e.g. a conventional phone 12 connected to PSTN 14. Once activated by a user, the portable cellular phone 34 establishes contact 32b with the system server 30 utilizing mobile communication equipment 23, such as through mobile exchange base station 24 and mobile telephone switching office 22. Upon reception of the transmitted unique identifier 59 at the authentication server 42, typically located at either a private branch exchange (PBX), or on the premises of a PSTN operator, the authentication server 42 confirms validity of the portable cellular phone 34. Once the signal 32b is validated, the billing server 46 checks the remaining stored credit allotment 128,130 for the airtime cartridge 52 of the portable cellular phone 34.

A call initiated at the portable cellular phone 34 is then connected to the destination receiver, via the system server 30, which typically completes the call, such as through the public switched telephone network (PSTN)14 to the specified location, e.g. a destination telephone 12, anywhere on Earth E.

Outgoing Calls. For an outgoing call, a user first activates the portable cellular phone 34, e.g. such as by opening phone 34a or sliding microphone 76 in phone 34b. The portable cellular phone 34 makes a connection to the system server 30, and waits for authorization. Once authorization is achieved, the voice recognition server 44 (FIG. 2), preferably automated, prompts the user for the phone number to be dialed, or alternately connects the caller to a 411 look up service. If the call is long distance, e.g. outside the coverage area, the call is either debited against the airtime cartridge 52, if the airtime cartridge 52 allows log distance service, or is alternately billed, as communicated by the user to the voice recognition server 44. Billing is typically accomplished as a collect call to the recipient, or as a debit to a credit card or pre-paid phone card.

For an outgoing call, the voice recognition server 44 prompts the user to input the desired destination identification, such as the phone number of a phone 12 (FIG. 1). For example, a user may input the desired destination phone number "I want to talk to 212-555-1212". The voice recognition server 44 then preferably confirms the number that the user wishes to dial. Upon confirmation, the system server 30 forwards of the call to the designated land line, such as through the land-based network PSTN 14.

Figure 25:
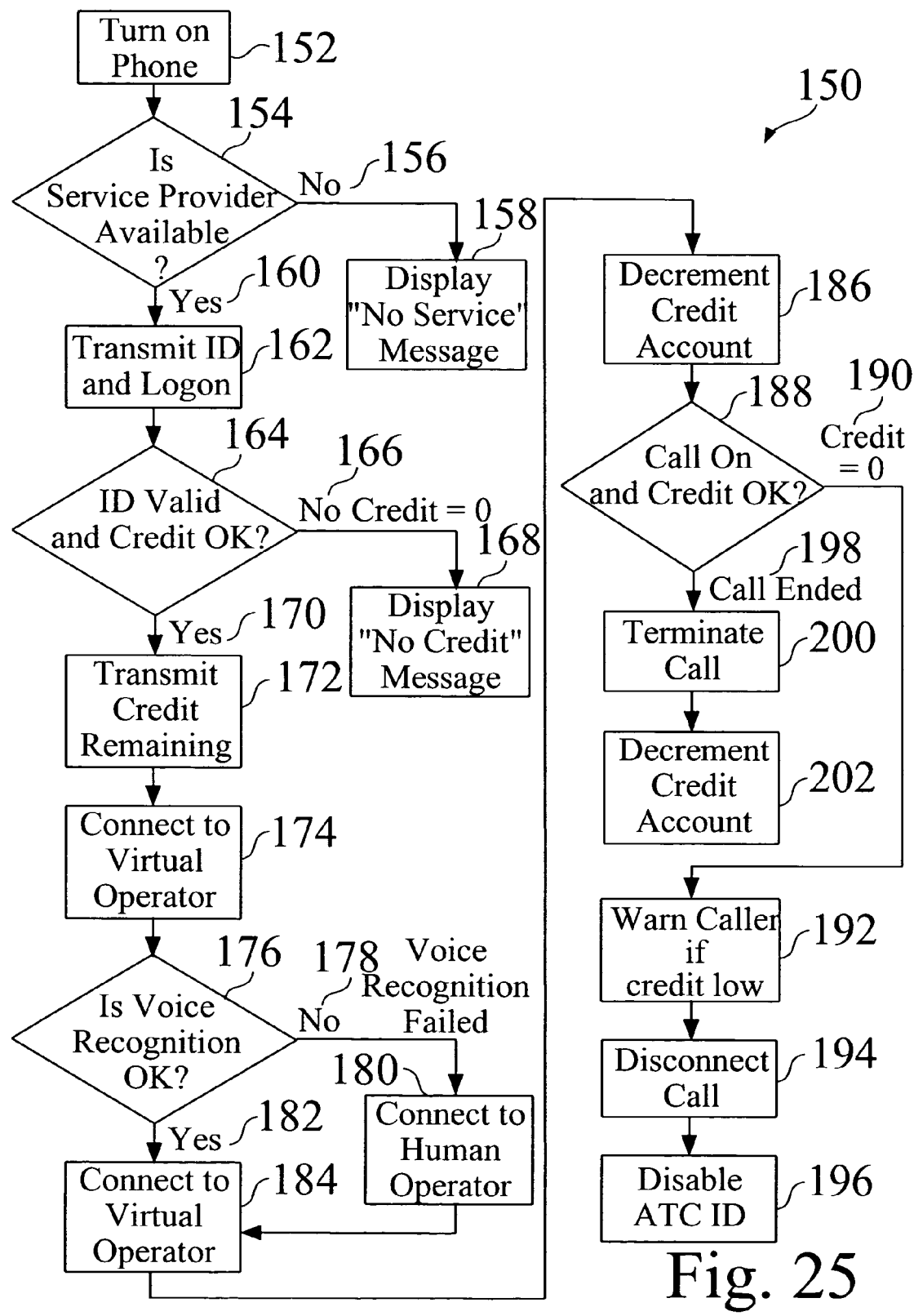
FIG. 25 is a flow chart for call placement of an outgoing call using a cellular service having voice recognition and virtual operators.

FIG. 25 provides a flow chart 150 for an outgoing call using a cellular service with voice recognition and virtual operators. Upon activation 152, e.g. such as sliding a microphone 76 of a keyless portable phone 34b to an activated position 106b, the portable cellular phone 34 is engaged, and automatically attempts to contact a designated service provider 30. If no service provider 30 is currently available 156, such as if the user is currently located out of range, or if the system server 30 is not currently functioning, i.e. down, a pre-programmed "No Service" message is played 158, thus communicating the fact to the user. If service is available 160, the connection is made 162. The ATC ID 58 is checked 164, both for validity, and for credit 57 available. If no credit 57 remains 166, a "No Credit" message code 168 is transmitted back to the user. If the credit (debit units) counter shows a positive balance 170, a remaining credit message 172 relays the number of units available to the user.

Connection is then passed 174 to the voice recognition server 44, i.e. a virtual operator. Voice recognition is attempted 176 with user confirmation before the call is processed. If the user confirmation is denied 178, the user is preferably directed to a human operator 180. Once a user connection is confirmed, either through voice recognition 182 or by the human operator 180, a connection 184 is attempted via the public switched telephone network (PSTN) 14 (FIG. 1). Regular PSTN error messages apply, such as a busy signal, a wrong number, or an invalid number dialed. Certain debit charges may also be made 186 for the connection attempt, such as for the airtime used, or applicable services, such as operator assistance.

If the call is successfully completed, the credit allocation is monitored 188 for the duration of the call. Should the credit allocation expire 190 before the end of the call, the call is interrupted 194, and an appropriate message 192 is typically sent to the user. The ATC ID 58 is then invalidated 196, disabling further calls from a portable cellular phone 34 using the depleted airtime cartridge 52. The billing record is expunged, thus invalidating further use of the depleted airtime cartridge 52. As discussed above, in a preferred system embodiment, the system server 30 does not immediately disconnect calls when an airtime cartridge 52 expires, thus allowing the user to change out a depleted airtime cartridge 52 on the fly, while the incoming call is placed on hold. For calls terminated 198 by the user, the system debits the credit allocation 200, upon termination 202.

Incoming Calls. While FIG. 25 describes the use of a portable phone 34 for the transmission of outgoing calls, a basic portable cellular phone 34 can also be used to receive calls. For a portable cellular phone 34 used to receive incoming calls, the user gives, i.e. communicates, the pager ID 109 (FIG. 26) to calling parties which is associated with the portable cellular phone 34 to calling parties, which allows calling parties to reach to user, through the system 10.

A caller wishing to call a user of a basic portable phone 34 first dials an access number 208 (FIG. 26), which connects the caller to the system server 30. Upon entry of a number identifier pager ID 109, e.g. typically four to six digits long, for the destination portable cellular phone 34, the system server 30 routes the caller to the desired portable phone 34. A basic portable cellular phone 34 indicates incoming calls, such as by an audio signal, e.g. a beep or ring, or by a visual signal, such as a flashing light emitting diode, visible through the phone body 30. Upon turning on the portable cellular phone 34, a communication connection is then made.

While a basic portable cellular phone 34, having only RF circuitry 48, may be used for the receipt of incoming calls, a basic portable cellular phone 34 is normally in an unpowered state. When in an activated state, the RF circuitry is powered, and the portable cellular phone 34 establishes and maintains contact with a system server 30, typically requiring the ongoing transmission and usage of prepaid single use airtime communication units.

Figure 26:
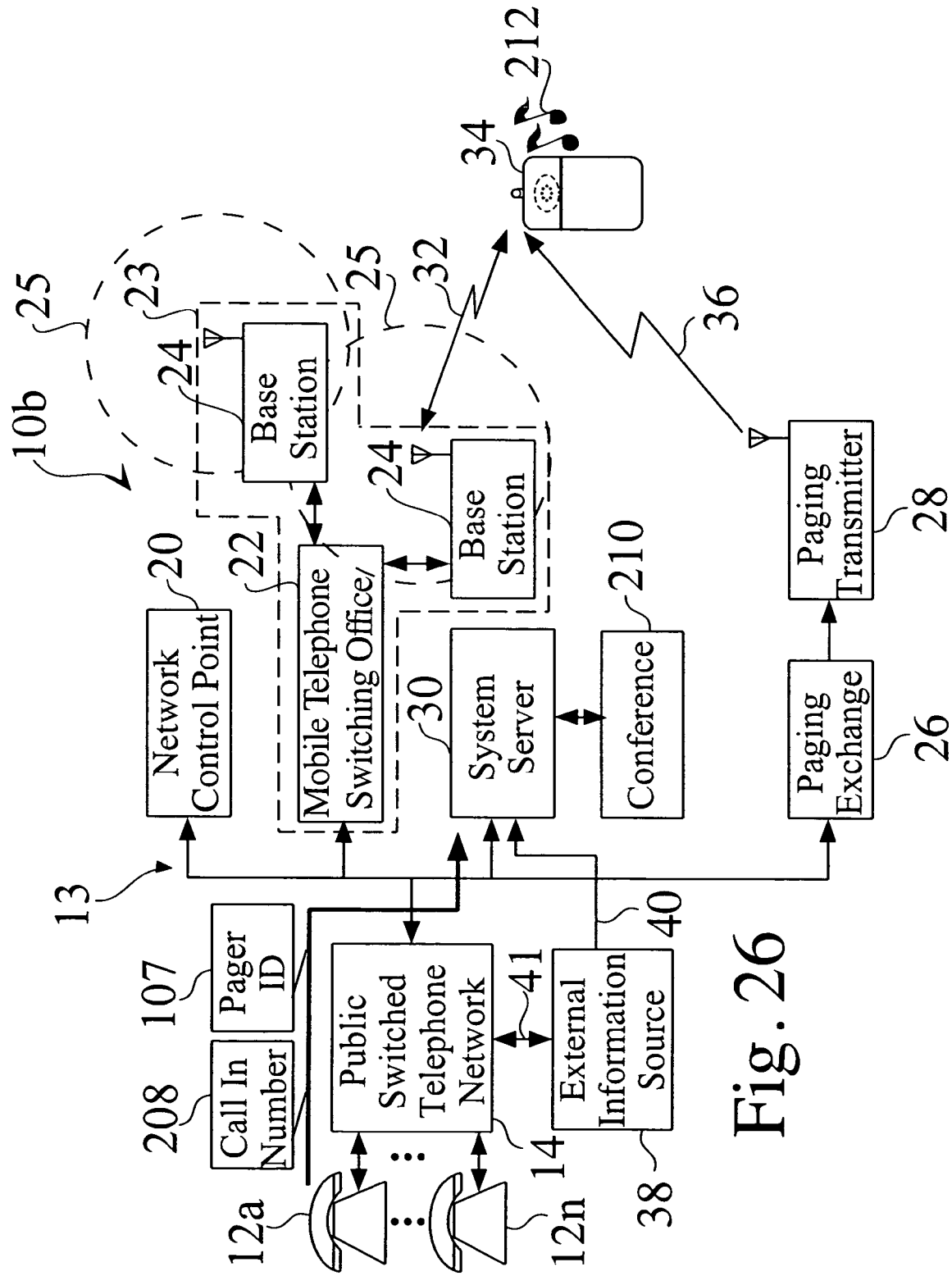
FIG. 26 is a block diagram for an incoming call in a preferred portable cellular phone system, in which the portable cellular phone includes pager circuitry.

Incoming Calls for Portable Cellular Phone Having Pager Circuitry. FIG. 26 is a block diagram for a preferred portable cellular phone system 10b, in which the portable cellular phone 34 includes pager circuitry 107 (FIGS. 8, 11), such as within an airtime cartridge 52. For a portable cellular phone 34 having pager circuitry 107, the internal pager circuitry 107 is typically always on, upon initial activation of the portable phone 34. The paging circuitry 107 typically uses a small amount of power, and can be run for a extended time period. When a paging signal 36 is received, the power draw is selectably transferred from the pager circuitry 107 to the phone RF circuitry 48, thus drawing more power, while enabling the call 32.

The pager circuitry 107 is associated with a pager identification 109 (FIG. 11). Since the portable cellular phone 34 typically has replaceable airtime cartridges 52, which are used to identify and locate the portable cellular phone 34, as well as to allow access to the system server 30, throughout the life of a portable cellular phone 34, there are typically many airtime cartridges 52 associated with a portable cellular phone 34.

The pager circuitry 107 therefore is associated with a unique pager identification 109, so that the system server 30 can locate the remote portable cellular phone 34, and correctly route calls to the portable cellular phone 34. An airtime cartridge 52 having pager circuitry 107 therefore includes either an identification label 111 (FIG. 10) that lists the pager identification 109, or includes other means for notifying the user of the pager identification 109, such as an accessible stored voice-synthesized message 87 which communicates the identification 109 to the user, or remotely, such as through the system server 30 to a connected calling party, upon prompt by the remote user, e.g. "This ATC number is 6472".

Pager identifications 109 are typically temporary, and are only good for the either life of the energy storage 54, or the installed credit 55 of the airtime cartridge 52, e.g. 60 days or 60 minutes of use, whichever runs out first. Therefore, pager identifications 109, or ATC connection numbers for a basic airtime cartridge, may be reused for a plurality of airtime cartridges 52 over time. The pager identification 109 for an airtime cartridge 52 is preferably selected from a pool of pager identifications 109 allotted for the system server 30. Reuse of pager identifications 109 minimizes crowding of the phone network 13.

In one embodiment, the pager number 109 would typically be associated with a call in number 208 for a system server 30, i.e. similar to an extension number. The pager number 109 may be dialed, along with the server call-in number 208, or may be entered by voice, after dialing the call-in number 208, such as to the voice recognition server 44, e.g. "Please connect me to pager "5555"".

In another embodiment, the user is able to associate a pager ID number 109 and a phone ID number 50, such as through secure password protected web access. The user may then reuse a previously established contact database and/or a previously used pager ID number 109. This is advantageous, particularly for lost or misplaced handsets 34, whereby a user may reuse previously established and stored information, such as an electronic address book database 38a.

The ATC pager identification 109 is not necessarily a phone number, but simply a routing number to the remote user of the airtime cartridge 52, through the system server 30, e.g. "6472". The system call in number 208 associated with the pager number 107 is typically a local or national connection. As well, the call in number 208 is not necessarily a phone number. For example, the system may preferably reserve a phone prefix, e.g. XXX, within an area code, e.g. 415, whereby a calling party may simply call the area code, the prefix, followed by the pager identification 109, e.g. for a pager identification 109 "6472", the dialed number is "1-415-XXX-6472".

The system call in number 208 associated with the pager number 109 may alternately be an Internet connection. For an Internet connection, a calling party may preferably send in a text-based message, which can be stored within the system server 30, and read to the user, through a voice synthesis module.

The user of the portable cellular phone 34 typically selectably provides the pager identification 109 to other people, so that the user may be called. For example, a user may call out, and leave the pager identification 109 as part of a voice mail on an answering machine, e.g. "Call me back by paging 6472".

When an incoming caller, such as from a conventional phone 12, relays the pager number 109 to the system server 30, the server sends the calling session to conference storage 210. While conference storage 210 may be a connected server, it may alternately be located within the system server 30. The system server 30 then sends a paging signal 36 to the portable cellular phone 34*b*, through a paging exchange 26 and paging transmitter 28, while the calling party sits on hold within conference storage 210.

The paging circuitry 107, upon receiving a page signal 36, provides a paging signal 212, e.g. a ring, beep, chime, indicator light, or vibration. As the user of the portable phone 34 has probably distributed the pager identifier 109 to a limited number of people, the portable phone user knows that the incoming call is probably from a desired caller, and is expecting the incoming call.

To connect to an incoming call, the portable user selectably activates the portable cellular phone 34*b*, such as by pulling the microphone 76 down to an activated position 106*b*. While the paging circuitry 107 notifies the user, such as with a beep or a ring 212, the phone circuitry 48 remains unactivated, until selectively activated by the user. Incoming calls are held at the system server 30, until the user activates the portable cellular phone 34*b*.

Because the phone circuitry 48 remains unactivated, the user has a choice to activate the portable cellular phone 34*b* or not. Because connection time is "charged" against pre-paid airtime communication units 57*a*-57*n* within the airtime cartridge 52, the user may choose not to activate the phone 34*b*, particularly if no call is expected, or if the caller is busy. If the portable cellular phone 34*b* is not activated, the caller may preferably leave a verbal voice mail message at the server 30. The user may then, at a later time, retrieve the stored voice mail from the system server 30.

If the portable cellular phone user activates the portable cellular phone 34, the phone 34 automatically connects to the system server 30, as described above, and the authentication server 42 authenticates the user, in a similar manner to an outgoing call placed from the portable cellular phone 34. Once the user is authenticated, the system server 30, identifies the ATC ID 58, and knows that there is a pending call associated to that ATC ID 58 on hold within conference server 210. The system server 30 thus routes the user to the pending call, and the calling parties are connected.

While the conference server 210 typically holds an active caller in a hold cue, the conference server 210 can also store information, such as voice-mail, or text-based mail. In preferred embodiments, when a mobile user calls in, the system server 30 notifies the user of one or more messages, which the user can selectably choose to listen or retrieve. For voice mail, the system server 30 retrieves the stored voice mail message, and plays the message back to the mobile user. The user may repeat the playback of the message, save the message for later retrieval, or delete the message. For voice mail that includes a callback number, the voice recognition server 44 may preferably detect and store the number, such that the remote caller may call the stored number, such as with a voice command "Call back".

In alternate embodiments, a calling party can leave a voice-mail message within the system server 30 or conference server 210, such as for a user who does not activate the portable cellular phone 34 to receive the incoming call. Alternatively, a calling party, upon calling in to the system server 30, may be provided with choices, such as a phone connection to the portable cellular phone user, or to leave a voice-mail message, e.g. if they know the portable cellular phone user is in a meeting.

Figure 27:
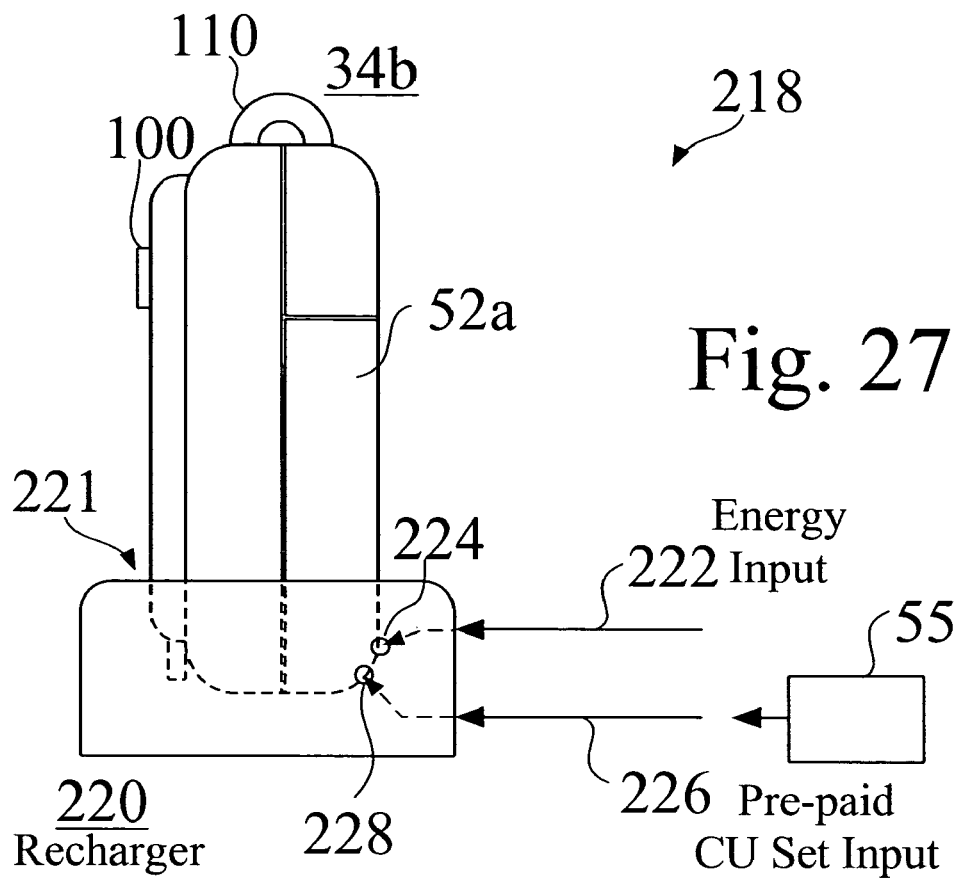
FIG. 27 shows a portable cellular phone having a rechargeable airtime cartridge, being recharged for both stored energy and acquired pre-paid airtime communication units.

Rechargeable Airtime Cartridges. FIG. 27 is a side view 218 of a keyless portable cellular phone 34*b* having a rechargeable airtime cartridge 52*a*, being recharged for both stored energy 54 and an acquired set 55 of pre-paid airtime communication units 57*a*-57*n*. While airtime cartridges 52 are often single use cartridges, i.e. non-rechargeable, in some preferred embodiments the stored energy 54 is rechargeable. In other preferred embodiments, new sets 55 of communication units 57*a*-57*n* may be installed within the airtime cartridge 52, such as through an acquisition connection 226, e.g. an authorized Internet connection at work or at home, or at another remote location, such as at a vending machine.

FIG. 27 shows an airtime cartridge recharging unit 220, which includes an airtime cartridge port 221. The airtime cartridge port 221 accepts a rechargeable airtime cartridge 52*a*, which has battery contacts 224, and authentication module contacts 228. When a user installs a depleted rechargeable airtime cartridge 52*a* in the airtime cartridge port 221, battery contacts 224 come into contact with energy input connection 222, and authentication module contacts 228 come into contact with pre-paid acquisition connection 226.

For a home based acquisition Internet connection 226, the user may be required to establish a secure authorized connection, e.g. a secure socket layer SSL, such as to system server 30, while providing payment, e.g. billing to a credit card, for a new acquired set 55 of airtime communication units 57*a*-57*n*.

For a vending machine based acquisition connection 226, the user may only be required to slide or swipe a credit card to provide payment for a new acquired set 55 of airtime communication units 57*a*-57*n*. The user may also be required to provide a PIN number associated with the card, such as for an ATM card.

As described above, when new algorithmically generated sets 55 of airtime communication units 57*a*-57*n* are sold to a user, thereby providing generation of ATC information 126 (FIG. 20, FIG. 21) to a recharger 220, the selling party must also provide matching generation of server information 124 (FIG. 20, FIG. 21) to system server 30.

In an alternate embodiment of the airtime cartridge 52, the energy storage is removable, i.e. replaceable batteries, while the set 55 of pre-paid single use airtime communication units 57*a*-57*n* is rechargeable.

Figure 28:
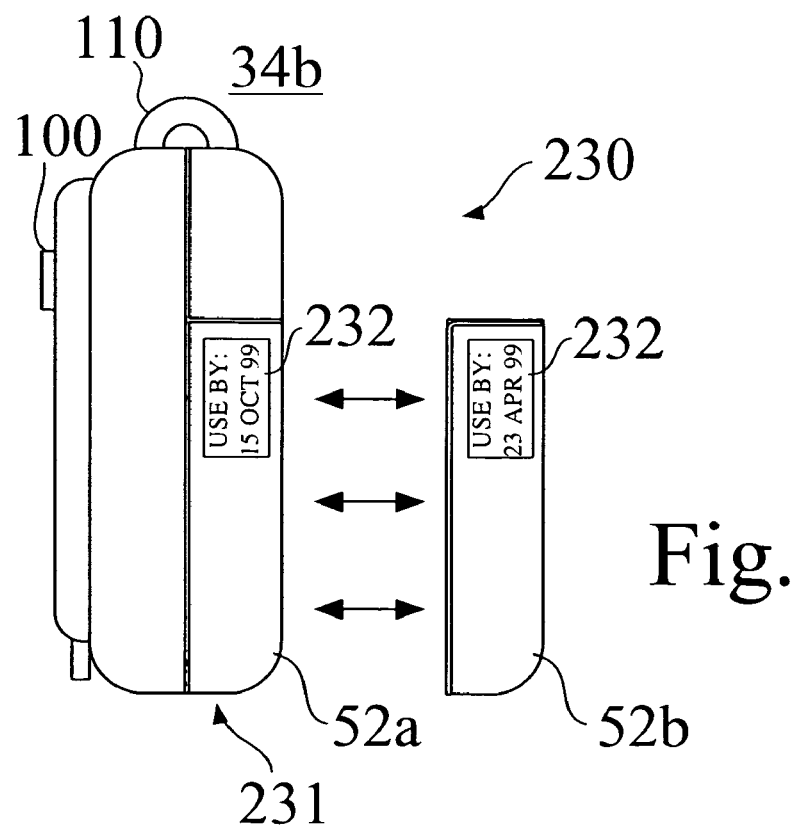
FIG. 28 shows a portable cellular phone having a plurality of replaceable airtime cartridges.

Replaceable Airtime Cartridges. FIG. 28 is a keyless portable cellular phone 34*b* having a plurality of removable and replaceable airtime cartridges 52*a*,52*b*. The airtime cartridges 52*a*,52*b* also preferably include an energy expiration storage label 232, such as for airtime cartridges 52*a*,52*b* which have a single use energy source, e.g. non-rechargeable batteries. In this embodiment, the phone body 90 is reusable, and includes a receptacle 231 for receiving removable and replaceable airtime cartridges 52*a*,52*b*. As the prepaid airtime credit 55 is depleted from a first airtime cartridge 52*a*, the user may remove the first airtime cartridge 52*a*, and install a second airtime cartridge 52*a*, thus reactivating the keyless portable cellular phone 34*b*.

Replaceable airtime cartridges 52 can be distributed or sold in a wide variety of ways, since the provided service is internally supplied with each airtime cartridges 52, i.e. there is no activation required from a specialty store. For example, portable cellular phones 34, or replaceable airtime cartridges 52, may be purchased from a wide variety of vending machines or commercial locations.

In preferred embodiments, airtime cartridges 52 may be used for promotional advertising, whereby airtime cartridges 52 are distributed or sold, and may include supplementary information, such as advertising text or logos.

Different service providers 30 preferably sell different replaceable airtime cartridges 52, selectively providing different levels of service, such as for national coverage, local coverage, or overseas service, depending on the operator, copolicy, and target market. As long as the RF circuitry 48 for a portable cellular phone 34 matches different regional system servers 30, the consumer can optionally use different carriers 30 with different services to match their current communication needs. For example, a business user, while traveling, may use an airtime cartridge 52 offering regional use on the west coast, while located in California. Upon traveling to New York, the business traveler may quickly replace the first airtime cartridge 52 with a second airtime cartridge 52, offering regional service for the east coast.

Figure 29:
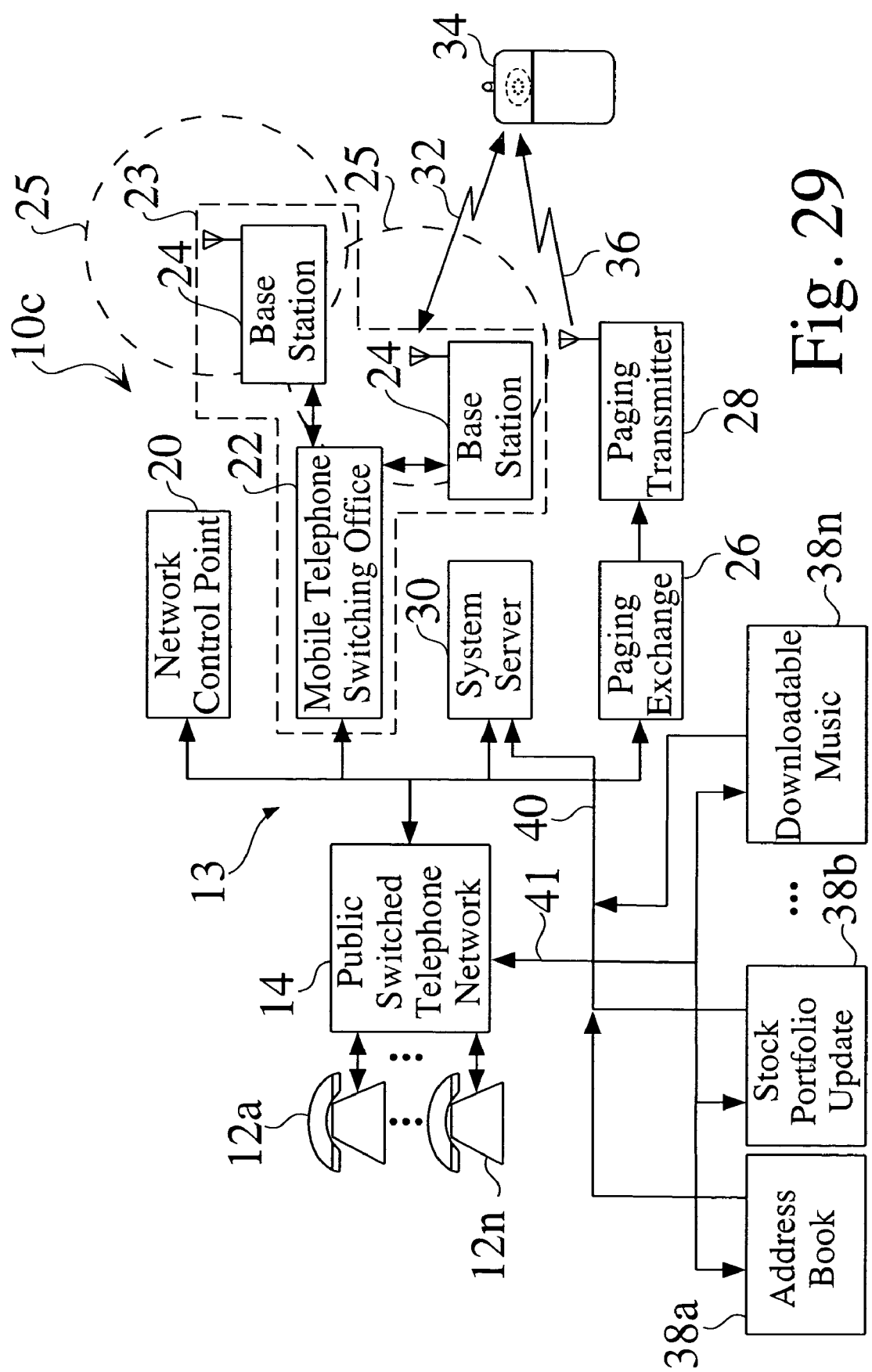
FIG. 29 is a functional block diagram for a portable cellular phone system with a voice recognition operating system, wherein information is available from a plurality of external sources.

Information Input from External Sources. FIG. 29 is a functional block diagram for a portable cellular phone system 10c with a voice recognition 33 operating system, wherein information is preferably transferred to the system server 30, either directly 40, or indirectly 41, from a plurality of external information sources 38a-38n. The transferred information is then typically stored within the system server 30, and is then preferably accessible to one or more portable cellular phones 34.

Transferred information is available from a variety of external information sources 38a-38n, such as downloaded data from an external computer, a personal digital assistant, e.g. such as a PalmPilot™, manufactured by 3Com Corporation, of Sunnyvale, Calif., a regular phone, e.g. by keying in commonly dialed numbers and associating them with speed dial numbers, by voice through voice recognition system 44, or by an internet connection, or through premium external services, such as stock information sources 38b or music channels 38n.

For stored, text-based messages, the voice recognition system 46 preferably includes a voice synthesis module, which reads the stored text, and provides a synthesized play back for the mobile user. In this manner, peripheral devices, such as computers, can be used to send messages to a remote user, such as by e-mail to the system server 30, whereby the remote user may readily have access to text-based messages.

For example, as described above, a user may download a personal electronic address book database 38a to the system server 30, and may preferably link the database records, i.e. commonly called people and phone numbers, to speed-dial numbers within the system server 30. In this example, it is preferred that the established address book and speed-dial codes be linked with the portable cellular phone 34, having a phone ID 50, so that the user may retrieve the address book information, or use the programmed speed-dial numbers, while using the portable cellular phone 34, even when a new pre-paid airtime cartridge 52 is installed. The use of speed-dial numbers from a portable cellular phone 34, e.g. such as from a keyless portable cellular phone 34b, is preferred, since a user may quickly provide a simple speed-dial code to the voice recognition server 44 to place a call, which is more accurately detected by the voice recognition software, and confirmed by the virtual operator. The user database is preferably password protected and secured, such that only the authorized user may access the data.

In FIG. 29, an alternate external information source 38b provides a download of updated information regarding a stock portfolio for a user. For example, a user may track a portfolio from an external computer, and have updated information sent to the system server 30, to be updated. Alternately, a user may define a portfolio of stocks at the system server 30, or through another external source, and the system server 30 may retrieve updated information from an external source, so that the user has access to updated information from the portable cellular phone 34.

Therefore, a user of a portable cellular phone 34 preferably has available information from a number of sources. In the examples above, a user may reserve speed dial numbers One through Ten for phone numbers, which the voice recognition server 44 can use to make calls, and speed dial numbers Eleven through Twenty for Stock Portfolio information, which the system server 30 may download and cite to the user, such as through voice synthesis software.

External downloadable music source 38n is also shown in FIG. 29. Downloadable music may be available to a portable cellular phone 34, such as accessed through a preferred replaceable airtime cartridge 52. Downloadable music, such as transferred in MPS format, may be played through the system server 30, or may be downloaded to a preferred airtime cartridge 52 having an internal MP3 player, which plays the music signal as it receives the signal, or preferably stores it to internal airtime cartridge memory, such as for later playback.

For example, a user may activate the portable cellular phone 34 for a limited time, to download music 38n, and may store the music internally to a preferred airtime cartridge 52, allowing the user to play back the music one or more times, such as when the portable cellular phone 34 is not activated, and unconnected to the system server 30, thus avoiding the cost of debited airtime communication units 57 while listening to the stored music.

While external information source 38n is described as music, the transferred data 38 may include numerous other acoustic information, such as news reports, conferences, or audio books, which the user may access, either on the fly, or on a store and play basis.

Different services, such as local, regional or foreign calling services, or the receipt of external information 38a-38n, is typically available to the user, such as through the use of different replaceable airtime cartridges 52. As described above, some external information 38, such as a user's address book 38a or stock portfolio information 38b, is linked to a phone ID 50. Such stored intelligence is typically related to a unique phone ID 50, so that a user can have continuing access to stored information, even when airtime cartridges 52 are changed. Such stored information within the server 30 is not typically associated with an airtime cartridge ID 58 for a removable single-use airtime cartridge 52, because such an airtime cartridge 52 is inherently used for a limited period.

However, the pre-paid access to the different services is typically available to different preferred airtime cartridges 52. Therefore, while the phone ID 50 can be linked to some preferred services, the ATC ID 58 is used to allow pre-paid access to preferred services. The user of a particular portable cellular phone 34 will have pre-paid access to the preferred services, depending on the paid capabilities of the airtime cartridge 52, e.g. a premium for having access to stock quotes 38b. Therefore, an airtime cartridge 52 providing premium services may be priced differently from a basic airtime cartridge 52. A user may have a plurality of airtime cartridges 52, therefore, to provide pre-paid access to different calling services or preferred services.

Figure 30:
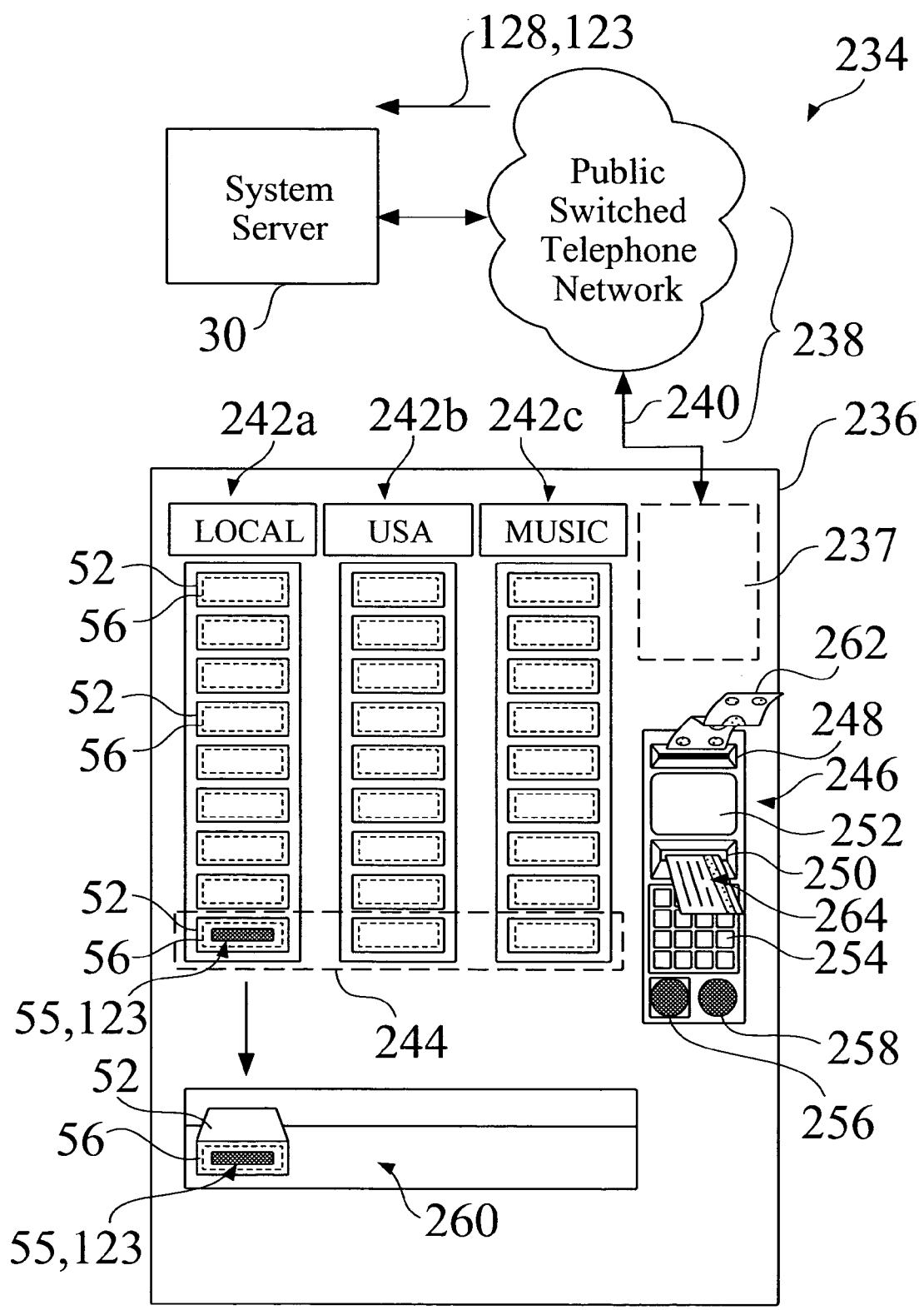
FIG. 30 is an airtime cartridge vending machine in communication with a system server, which remotely establishes sets of pre-paid single use airtime communication units in one or more airtime cartridges at the time of sale.

Vending of Airtime Cartridges. FIG. 30 is a schematic block diagram 234 of an airtime cartridge vending machine 236. The airtime cartridge vending machine 236 typically includes a network connection 238 to a system server 30, such as by a connection 240 through the public switched telephone network 14. The airtime cartridge vending machine 236 includes a processor 237, and one or more airtime cartridge vending stacks 242a-242n for holding and dispensing one or more airtime cartridges 52. A plurality of stacks 242a-242n are preferably used, such as to sell and dispense airtime cartridges 52 having different included hardware, e.g. paging circuitry 107, or having different services, e.g. local calling, long distance, address books, music downloading, or pre-paid service access, e.g. such as thirty minutes of call time, 30 day ATC shelf life.

There are three main modes of operation for alternate embodiments of the airtime cartridge vending machine 236, wherein:

i) pre-burned (pre-programmed) (and enabled) airtime cartridges 52 are stocked within the vending machine 236;

ii) pre-burned (pre-programmed) airtime cartridges 52 are stocked within the vending machine 236, while the vending machine 236 communicates the sale of airtime cartridges 52, such that network access is enabled at the point of sale; or iii) blank airtime cartridges 52 are stocked within the vending machine 236, and are burned-in (programmed) on the fly, in conjunction to the transmission of data between the vending machine 236 and the system server 30, to enable service access.

In the preferred vending machine embodiment 234 shown, the stored airtime cartridges 52 are initially produced with storage capacity, i.e. a blank authentication module 56 (FIG. 3) to receive a set 55 of communication units 57a-57n, but are distributed as blanks, whereby a set 55 of single-use pre-paid airtime communication units 57a-57n are controllably established, or burned in, by a burn-in device 244, within the vending machine 236.

The vending machine also includes a payment and control interface 246, typically including a cash input 248, a credit/ATM card input 250, an interface screen 252, a keypad 254, a speaker 256, and a microphone 258.

Either before burn-in 244, or as a set 55 of single-use pre-paid airtime communication units 57a-57n is established, the processor 237 within the ATC vending machine 236 communicates with the system server 30 through connection 238,240, such that a matching set 128 of server communication units 130 is established, whereby a user may use the new airtime within a portable cellular phone 134, and wherein corresponding communication unit pairs 57,130 may be matched and marked as used 147, 149 (FIG. 23), between the portable cellular phone 134 and the system server 30. In this embodiment of the ATC vending machine 236, wherein blank airtime cartridges are programmed in-situ, the ATC vending machine 236 is secured by password/dongle, for authorization of authorized use. As well, the ATC vending machine 236 is required to log and communicate all unit sales of airtime cartridges 52. At the time of sale, the ATC vending machine 236 may preferably print a sales receipt, preferably containing a user password, by which the user may later configure the purchased airtime cartridge, e.g. such as through web configuration.

Since a user may commonly install and use a new airtime cartridge 52 in a portable cellular phone 34 soon after purchasing the airtime cartridge 52, it is important that the corresponding set 128 of server communication units 130 is established promptly, otherwise, the portable cellular phone 34 is not able to make an authorized connection to system server 30, for communication services. In a preferred embodiment, the established expiration date 134a, 134b, e.g. sixty days, is set at the point of purchase.

An airtime cartridge vending machine 236 preferably contacts the system server 30, before the point of sale of airtime cartridges 52, whereby matched algorithmic generation 122 (FIGS. 20,21) of server communication unit information 124 and airtime cartridge communication unit information 126, or a plurality of shared algorithms 123 (FIG. 21) are used to establish a plurality of matched sets 55, 128, i.e. an inventory of pre-paid airtime between the system server 30 and the vending machine 236.

To purchase an airtime cartridge 52, a user inserts money 262 into cash input 248, or a credit card or ATM bank card 264 into credit/ATM card input 250. The payment and control interface 246 preferably guides the user through the airtime cartridge selection and payment process, such as by visual prompts through interface screen 252, or audio prompts through speaker 256. The user enters information, such as airtime cartridge selection, payment type, or credit card PIN codes, such as through keypad 254, or by voice commands into microphone 258.

In a preferred embodiment, the ATC vending machine 236 provides access to the voice recognition server 44 at the system server 30 during the airtime cartridge procurement process 234. The voice recognition server 44 guides the user through the process, such as through playback of audio prompts, as well as through voice recognition of the user's voice commands.

When the user provides payment for the desired prepaid airtime cartridge, i.e. the point of sale, the burn in device 244 installs either a set 55 of pre-paid single use airtime communication units 57, or a shared algorithm 123, which allows a processor within the airtime cartridge 52 to produce the equivalent set 55 of pre-paid single use airtime communication units 57, within the authentication module 56 of the purchased airtime cartridge 52. The user-selected airtime cartridge vending stack 242 then dispenses the purchased and loaded airtime cartridge through dispensing access 260.

Reusability and Recycling of System Hardware. A significant advantage of portable cellular phones 34 and airtime cartridges 52 is the ease by which a person may establish portable pre-paid communication, wherever they may be located.

As described above, conventional cellular phone hardware requires the establishment of complicated service provider agreements, as well as the establishment of an electronic serial number, i.e. a drop number, for billing purposes. For conventional cellular phones, such services require that a person visit a specialty store, typically having trained personnel to perform phone registration functions.

In contrast to conventional cellular phones, the purchase of a portable cellular phone 34 does not require registration for the user, nor is there any requirement to visit a specialty store, or any requirement for the user to submit private information, such as a social security number and/or credit history information. Instead, the portable cellular phone system 10 provides discrete time units 63 of communication, through the paid acquisition and secure transmission of sets 55 of pre-paid single use airtime communication units 57.

As described above, the portable cellular phone 34 can either have a fixed internally loaded pre-paid airtime cartridge 52, such as a disposable portable cellular phone 34, or can have rechargeable or replaceable pre-paid airtime cartridges 52. Even for rechargeable airtime cartridges 52, the establishment of new sets 55 of pre-paid single use airtime communication units 57 does not require a visit to a specialty store.

While airtime cartridges 52 have an ATC ID 58, and while preferred portable cellular phones 34 have a phone ID 50, neither ATC ID's 58 nor portable cellular phones 34 are linked to a user for billing purposes. Therefore, a user may readily dispose of a portable cellular phone 34 or airtime cartridge 52, without fear of great financial risk, such as the financial risk of unrestricted access by unauthorized users for a conventional cellular phone. Even if a portable cellular phone 34 is lost or stolen, the financial loss is limited, at most, to the cost of hardware and residual pre-paid single use airtime communication units 57.

Also, as described above, portable cellular phones 34 inherently have very few internal components, such as complicated internal intelligence, nor are they required to have key pads. Most system processing intelligence, e.g. such as authentication and voice recognition is located within a remote system server 30. Furthermore, most system memory, e.g. such as preferred speed-dial and address book information, is located within a remote system server 30.

Figure 31:
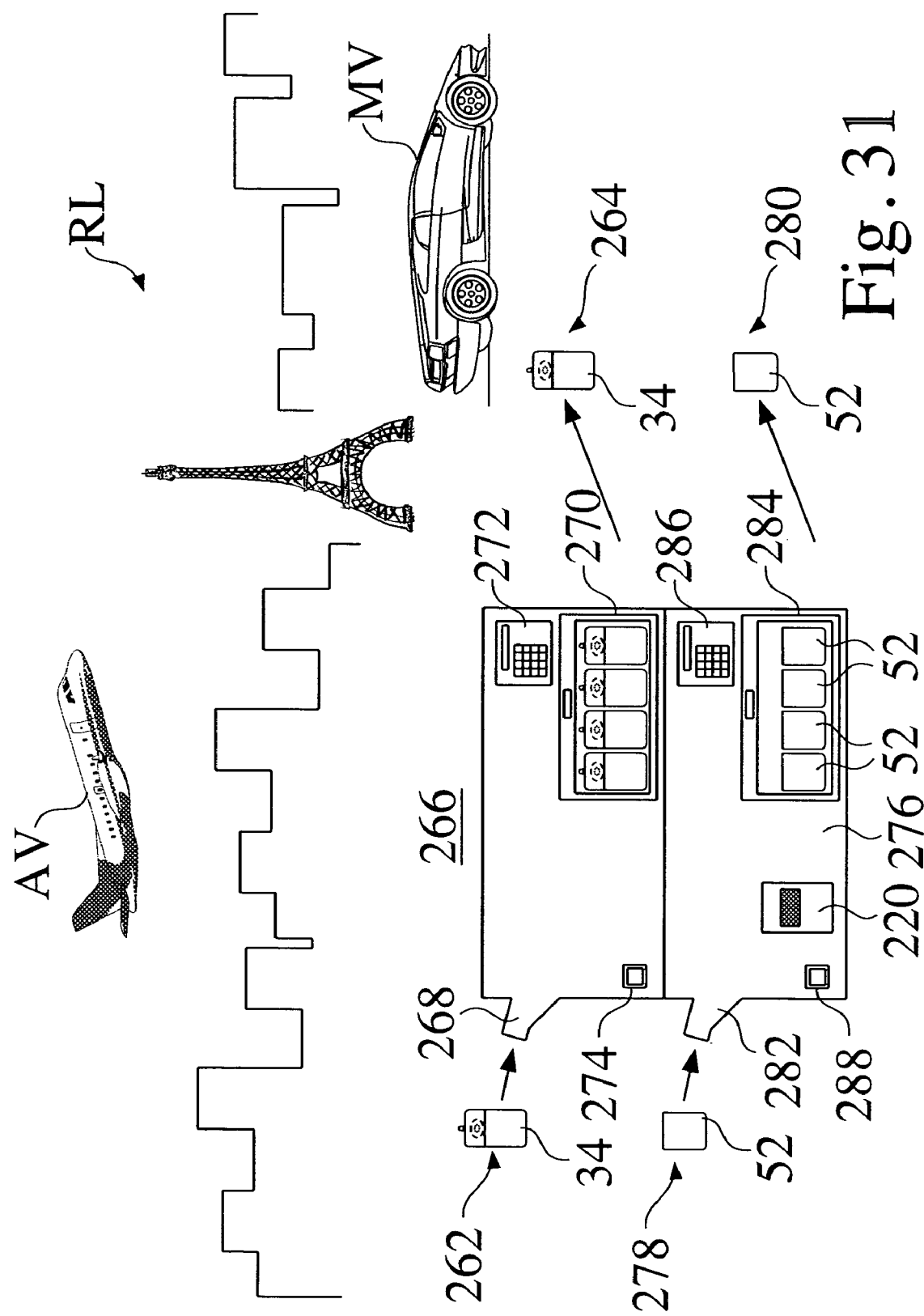
FIG. 31 shows recycling and reuse of portable cellular phones and airtime cartridges at a remote location.

As portable cellular phones 34 provide limited financial risk to the user, are inherently simple to manufacture, and do not require user billing registration at a point of sale, they may be readily disposed, recycled and reused between multiple users. FIG. 31 shows disposal 262,278 and reuse 264,280 of portable cellular phones 34 and airtime cartridges 52 at a remote location RL.

A user, arriving at a remote location RL, such as by plane AV, may readily purchase a portable cellular phone 34, either having an internal airtime cartridge 52, or one or more replaceable airtime cartridges 52. The user is not required to establish a billing contract with a service provider, and can use the portable cellular phone 34 immediately for portable communication as they go about their local business travel MV.

Even if the user, upon arriving in a remote location RL, has no idea how the local phone system operates, the user may readily purchase a set 55 of single use airtime communication units 57 for a portable cellular phone 34 or for an airtime cartridge 52, for local communication in the remote location RL, and may readily make calls.

In FIG. 31, the portable cellular phone reuse center 266 includes a phone drop off bin 268, and a phone dispensing bin 270. In a preferred embodiment, the portable cellular phone reuse center 266 includes a vending interface 272, by which a user may purchase, or even borrow, a portable cellular phone 34, having either no loaded communication units 57, or residual airtime communication units 57 from a prior user, or may purchase a portable cellular phone 34 preloaded, or reloaded, with a set 55 of pre-paid single use airtime communication units 57.

At the end of an extended stay, a user may readily dispose 268 the portable cellular phone 34 at any convenient phone reuse center 266. In a preferred embodiment, the reuse center 266 may include a deposit fee return 274, as compensation for return of a portable cellular phone 34.

In a similar manner, the user may readily purchase one or more replaceable airtime cartridges 52. Just as for the portable cellular phone 34, the user is not required to establish a billing contract with a service provider, and can use the pre-paid airtime cartridge 52 with a compatibly housed portable cellular phone 34 immediately for communication.

In FIG. 31, the portable cellular phone reuse center 266 also includes an ATC reuse module 276, which includes an airtime cartridge drop off bin 282, and an airtime cartridge dispensing bin 284. In a preferred embodiment, the ATC reuse module 276 includes an ATC reuse vending interface 286, by which a user may purchase or borrow a blank airtime cartridge 54, to be charged, having no loaded, or residual airtime communication units 57 from a prior user, or may purchase an airtime cartridge 52 preloaded with a set 55 of pre-paid single use airtime communication units 57. In a preferred embodiment, the ATC reuse module 276 may include an ATC deposit return 288, as compensation for return of an airtime cartridge 52.

At the end of an extended stay, therefore, a user may readily dispose of and recycle the airtime cartridge 52. For airtime cartridges 52 which can be recharged, such as for a rechargeable energy supply 54 and a set of pre-paid single use airtime communication units 57, the reuse center 266 preferably includes a recharger 220.

As shown in FIG. 31, therefore, portable cellular phones 34 may readily be dropped off at the end of use, and recycled to provide instant pre-paid communication for a number of users.

In a preferred embodiment, as described above, information from an external source 38 is preferably stored on a system server 30, and is then preferably accessible to a user, even in a remote location RL. For example, for a business user who spends an extended period of time, e.g. two months, in a remote location, e.g. France, the user may prefer to establish or retrieve a personal electronic address book 38a, and link it to the portable cellular phone 34, i.e. the phone ID 50, for the duration of the stay.

For external information 38 that has been linked to a portable cellular phone 34, i.e. linked to a phone ID 50, such as a personal electronic address book 38a (FIG. 29), a user wishing to recycle the portable cellular phone 34, such as at the end of a business trip, may want to avoid access to the linked information 38 by a future user of the portable cellular phone 34.

In one preferred embodiment, therefore, a user may readily contact the system server 30, and direct the system server 30 to either unlink remote information 38, or erase stored information 38 that is linked to the phone ID 50.

In an alternate embodiment, the user may establish an expiration date for the linked information 38, such as to coincide with the user's business itinerary, e.g. if the user is returning home the remote location by a certain date.

In another alternate embodiment, the airtime cartridge 52 includes an internal memory, such as within the authentication module 56, which allows the downloading and short term storage of information, e.g. address books, speed-dial numbers, which the phone logic 84 (FIG. 5) may access. At the end of the memory expiration date, or by the airtime cartridge expiration date 134, the memory expires.

Voice-Activated Tokenized Portable Phone with Modem. While typical embodiments of the portable cellular phone 34 and system server 30 communicate voice-based signals 32, i.e. acoustic data, the preferred embodiments of the system 10 can be modified to communicate other data as well. For example, FIG. 32 shows a preferred system data application 290, wherein the airtime cartridge 52 within the portable cellular phone 34 includes a modem 292, through which a user may establish an Internet connection 32. The preferred airtime cartridge 52 includes a modem attachment 294, e.g. such as a serial port connector, which can be connected to a computer 296, such as a portable laptop computer 296, having an Internet browser application 298. The preferred airtime cartridge 52 includes a set of pre-paid single use communication units, i.e. tokens 57, with which the user may initiate a dial-in login and receive time increments of connection to the Internet, e.g. a pre-paid hour of worldwide web surfing from an Internet service provider (ISP).

The voice-activated portable cellular phone 34 and system 10 provides affordable and convenient communication for a wide variety of users. Even for short term use, such as for work or for vacation, a user may quickly acquire and use a voice-activated portable phone 34, without a long-term capital commitment for a conventional cellular phone, and without establishing complicated activation or service contracts. Payment for communication is made in advance of the user's outgoing or incoming calls, allowing use of the voice-activated portable cellular phone 34 upon purchase, at any given time, anyplace in the world E.

The voice-activated portable cellular phone 34 guarantees a fixed up-front fee for communication based upon a given amount of prepaid airtime communication units 57 for a limited time of use, e.g. shelf life 134. Such a cellular phone 34 may be discarded without hesitation, or may optionally be recycled, upon end of use, without the need of paying further fees. The voice-activated portable cellular phone 34 requires no dial pad and no function keys, since the functionality depends upon the system server 30, rather than the mechanical capabilities of the voice-activated portable phone 34.

As well, alternate embodiments of the voice-activated portable phone 34 can be extremely small. FIG. 33 is a preferred hands-free application 300, wherein a wearable keyless voice-activated portable cellular phone 34 is attached to an artide of clothing. The wearable keyless voice-activated portable cellular phone 34 includes a connected microphone activatable headset 302, by which the user may simply pull on the microphone 76 to activate the phone 34, and use the voice recognition server 44 to control the operation of the phone 34.

FIG. 34 shows a mobile hands-free application 304, wherein an miniature keyless voice-activated portable cellular phone 34d is removably mounted to the dashboard DB of an automobile MV. The miniature keyless voice-activated portable cellular phone 34d includes a directable speaker 74, to direct the speaker 74 toward the user. The voice-activated cellular phone 34d also includes an activatable directional input microphone 76, by which the user may simply pull on the microphone 76 to activate the phone 34, and use the voice recognition server 44 to control the operation of the phone 34 in a hands-free fashion, such as when driving the automobile MV.

The voice-activated portable cellular phone 34 may easily be modified for other small applications, or integrated into other devices, such as within a watch or a portable radio. As well, a voice-activated portable phone may alternately house a plurality of pre-paid airtime cartridges 52, such as to provide access for different services, or for midflight transfer of a pre-paid call from a first installed airtime cartridge 52 to a second installed airtime cartridge 52.

Figure 35:
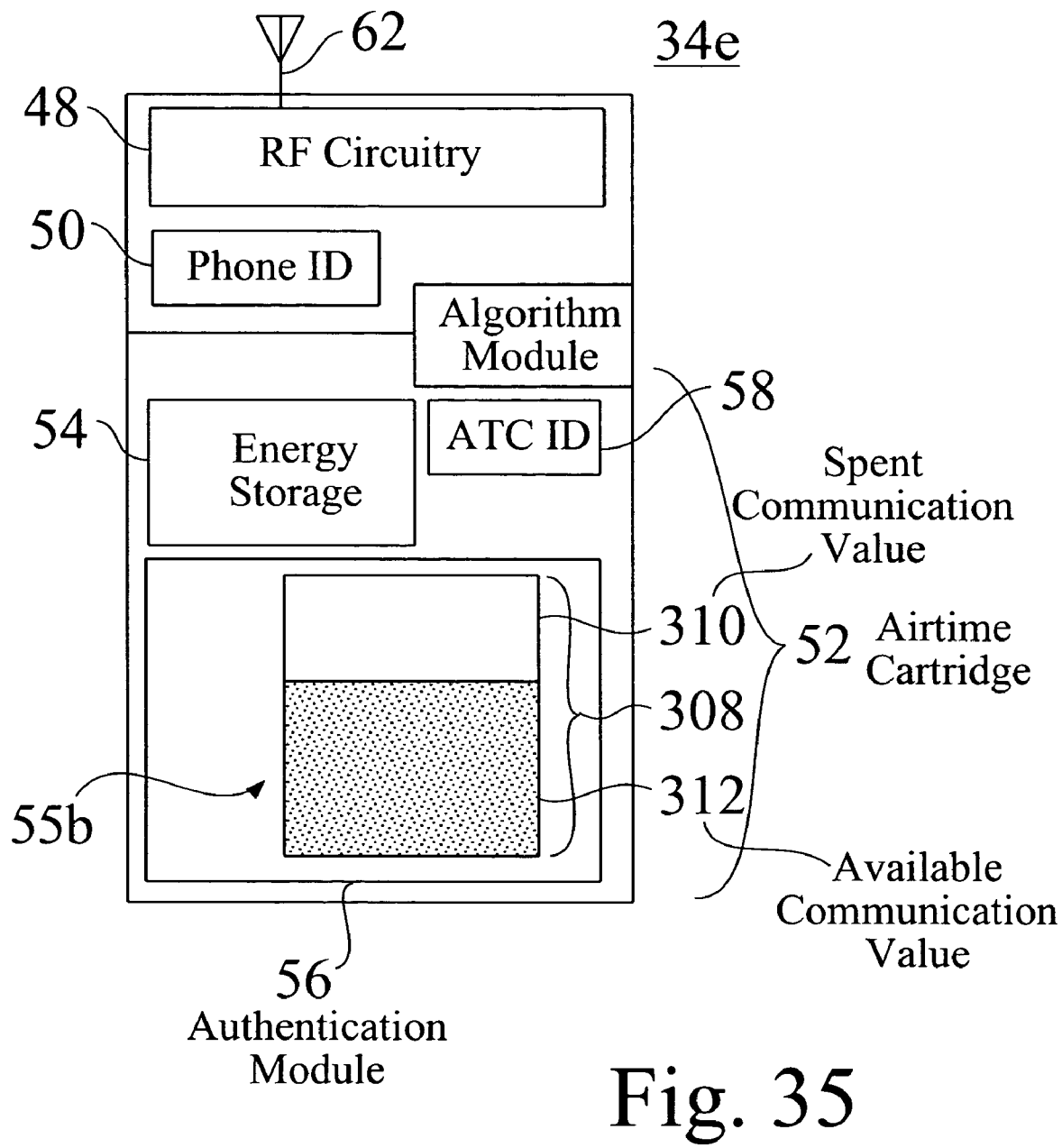
FIG. 35 shows an alternate embodiment of a portable cellular phone having an airtime cartridge which provides authorization to communication services.

Alternate Embodiments for Access to Communication Services. Alternate embodiments of the portable telephone system 10 provide a variety of methods by which a portable cellular phone 34 may gain access to communication services. FIG. 35 shows an alternate embodiment of a portable cellular phone 34e having an airtime cartridge 52b. The unit key 132 within the airtime cartridge 52b provides authorization to communication services, based upon an amount of authorized communication, which is determined by the specified communication set 55b. The specified communication set 55b has a total communication value 308, initially comprising an equivalent available communication value 312. As the portable cellular phone 34 is activated and used, a portion 310 of the total communication value 312 is spent, until the available communication value 312 is depleted.

In contrast to a set 55 of discrete communication units 57a-57n within an airtime cartridge 52a, such as seen in FIG. 3, wherein each of the communication units 57a-57n represents a portion of authorized communication, the specified communication value set 55b shown in FIG. 35 preferably provides a continuous stream of authorized communication, i.e. similar to a gas tank having a volume of gasoline in an automobile, wherein communication is periodically authorized, using the unit key 132 in conjunction with an algorithm module 306, during one or more calls, until the total communication value 308 of the specified communication set 55b is reached.

Figure 36:
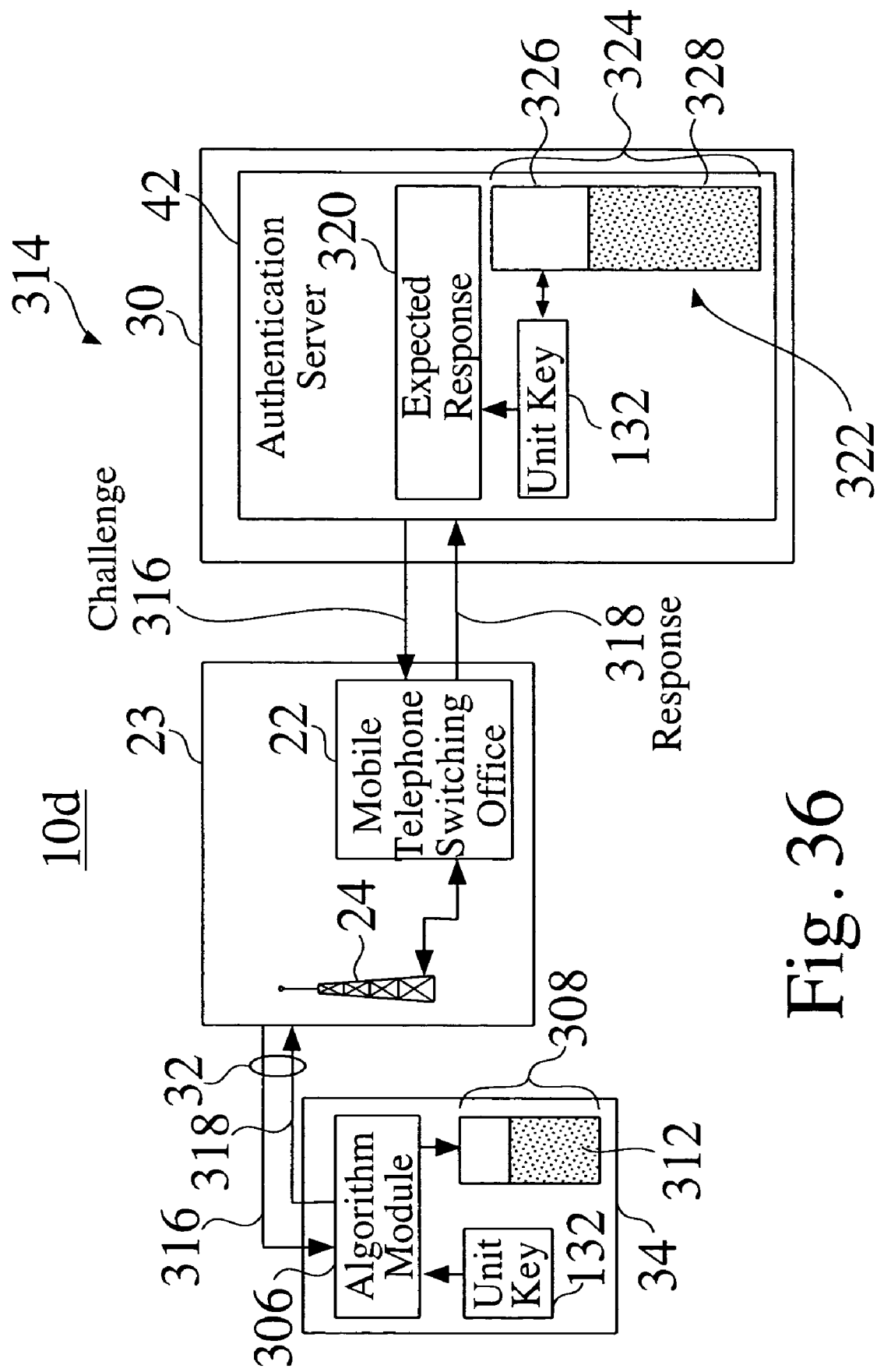
FIG. 36 is a schematic block diagram of a challenge/response operation for a portable cellular system, which enables authorized communication for the portable cellular phone within a phone network.

FIG. 36 is a schematic block diagram 314 of a challenge/response operation for a portable cellular system 10d, which enables authorized communication between the portable cellular phone 34 and the system 10. For each determined period of communication, e.g. such as for each minute, the authorization server 42 sends a challenge 316 to the portable cellular phone 34. Based upon the challenge 316, an appropriate response 318 is determined, such as by the algorithm module 306, which is located within the phone 34 or within the airtime cartridge 52. The response 318 is typically based upon both the challenge 316 and the unit key 132, and is sent from the portable cellular phone 34 to the authorization server 42 within the system server 30.

The authorization server 42 then matches the returned response 318 with an expected response 320 for the sent challenge 316 and the unit key 132 and/or algorithm module 306, and allows communication for the portable cellular phone 34, based upon a matching, i.e. correct sent response 318. The authorization server 42 preferably includes a server communication value set 322, which typically comprises a total server communication value 324, which is preferably matched to the total communication value 308 for the portable cellular phone 34 or the airtime cartridge 52. The total server communication value 324 initially comprises an equivalent available server communication value 328. As the portable cellular phone 34 is activated and used, a portion 326 of the total server communication value 324 is spent, until the available communication value 328 is depleted.

During an ongoing phone call, any or all of the specified communication set 55 may be used. Any remaining pre-paid communication may be used for subsequent communication services.

Since each challenge 316 and appropriate response 318 are preferably unique, unauthorized communication is prevented. Even if an unauthorized user intercepts, i.e. reads, a transmitted challenge 316 and/or a response 318, neither the challenge 316 nor the response 318 contain the associated unit key 132 or the algorithm 306. Therefore, an unauthorized user or phone is incapable of determining and transmitting an appropriate response 318 to a challenge 316, such that communication without an appropriate response 318 to a challenge 316 is not authorized by the authorization server 42.

As well, the level of pre-paid communication which exists within a specified communication value set 55b may be used for one or more calling services, e.g. such as local, long distance, and/or international calling, with the rate of depletion of the value set 55b dependent on the type of service. For example, a specified communication value set 55b might be used to receive 1000 minutes of local service, 100 minutes of international communication, or a combination of 500 minutes of local service and 50 minutes of international service.

Integration of Pre-paid Portable Cellular Phone System with Existing Mobile Phone Systems. The pre-paid portable cellular phone system 10 may operate within and/or through existing mobile phone systems 23, such as for initial authorization of a portable cellular phone 34 and airtime cartridge 52, as well as for ongoing communication, such as for the transmission of outgoing or the receipt of incoming calls.

Figure 37:
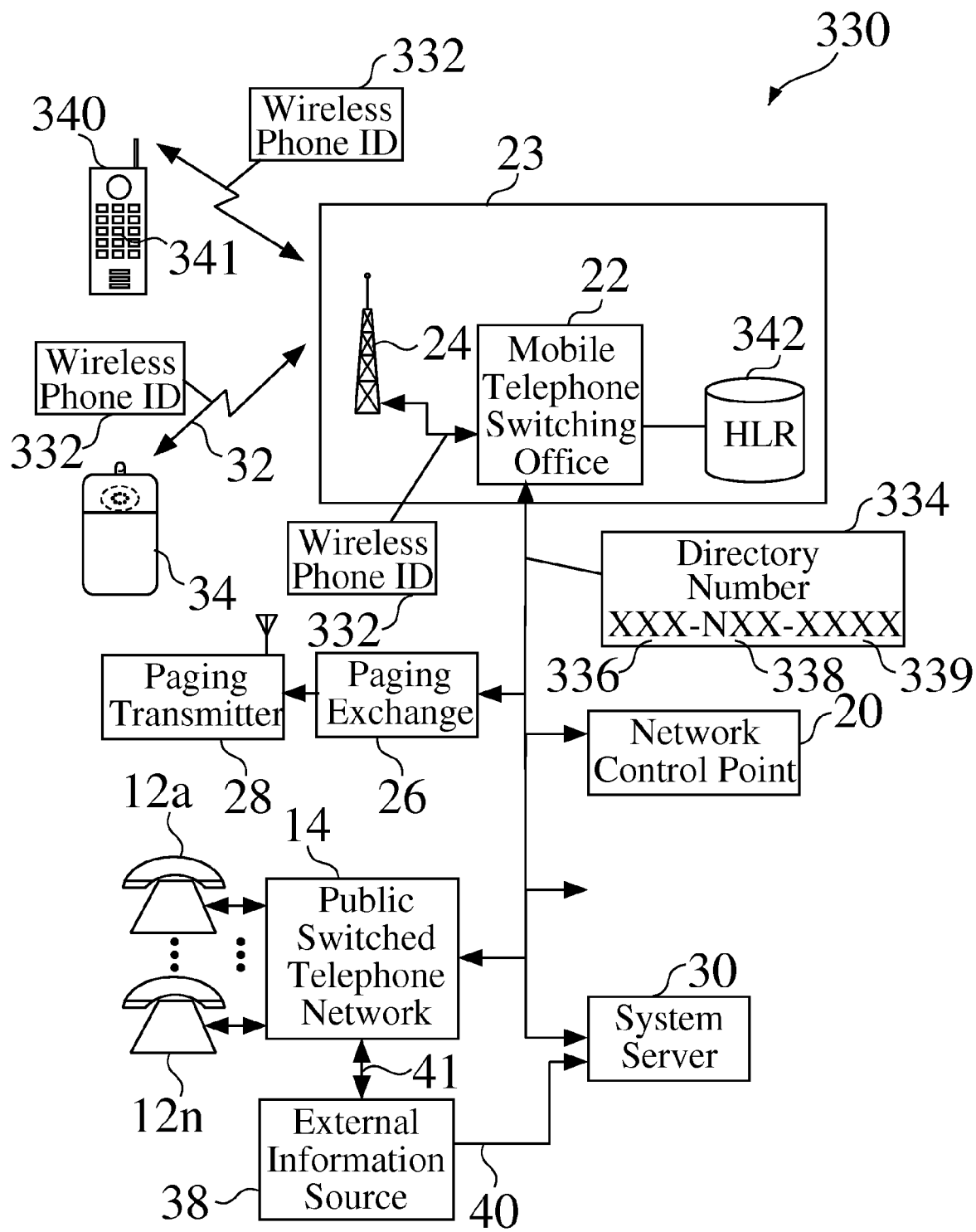
FIG. 37 is a block diagram which shows communication between a conventional wireless phone and/or a portable cellular phone and a system server, through an existing mobile network.

FIG. 37 is a block diagram 330 which shows communication between a conventional wireless phone 340 and/or a portable cellular phone 34 and a system server 30, through an existing mobile network 23. Conventional mobile networks 23 within an expanded region typically operate within protocol guidelines, e.g. such as IS-41 or GSM. Wireless phones 340 and pre-paid portable cellular phones 34 typically include an IMSI-based wireless phone identifier 332, e.g. such as an IMSI-based number, whereby outgoing or incoming calls are correctly routed to or from the correct wireless phone 340 or portable cellular phone 34, between the mobile telephone switching office 22 and the appropriate base station 24, and between the base station 24 and the wireless phone 340 or portable cellular phone 34.

While connections between the MTSO 22 and the wireless phone 340 or portable cellular phone 34 are typically required to operate with a wireless phone identifier 332, connections between the MTSO and the wire-based telephone networks 13 typically operate within a second protocol, are commonly associated with a wire-based directory number identifier 334, e.g. such as a MIN-based MSISDN wire-based number 334, wherein a wireless phone 340 or a portable cellular phone 34 is typically associated with a directory number 334 within the second protocol. A directory number 334 typically comprises a ten digit identifier, comprising a three digit area code 336, a three digit-prefix number 338, and a four digit identifier 339 within a prefix 338. The MTSO 22 typically uses a home location registry (HLR) 342, by which each wireless phone identifier 332 is uniquely associated with the directory number 334.

An existing problem in communications is that the demand for directory numbers 334 often exceeds their availability, particularly in urban areas or in regions experiencing rapid growth. Therefore, wireless communication providers are typically allotted a limited supply of directory numbers 334 with which to provide to customers. It is therefore often beneficial for a wireless communication provider to associate a directory number 334 with a wireless phone 340 or a pre-paid portable cellular phone 34 which is actively being used for communication. Conversely, it is often detrimental for a wireless service provider to associate a directory number 334 with a wireless phone 34 or a pre-paid portable cellular phone 34 which is inactive, or which is rarely used for communication, such that there is a loss of revenue associated with a directory number 334 which could alternately be actively used.

During initial activation of a portable cellular phone 34, having an internal or attached airtime cartridge 52, the only unique identification for the portable cellular phone 34 is typically the airtime cartridge identifier 58, and in some embodiments, a phone ID 50 (FIG. 3) and/or a pager access number 109. While some embodiments of the portable cellular phone 34 may include a wireless phone identifier 332 and associated directory number identifier 334 before initial activation, such that the portable cellular phone 34 may be used immediately upon procurement, preferred embodiments of the portable cellular phone system 10 provide automated initial activation, and automatic assignment of wireless phone identifiers 332 and associated directory numbers 334, such that the portable cellular phone 34 may be used immediately upon procurement, without the need to link the portable cellular phone 34 with a wireless phone identifier 332 and associated directory number 334 before initial activation.

Figure 38:
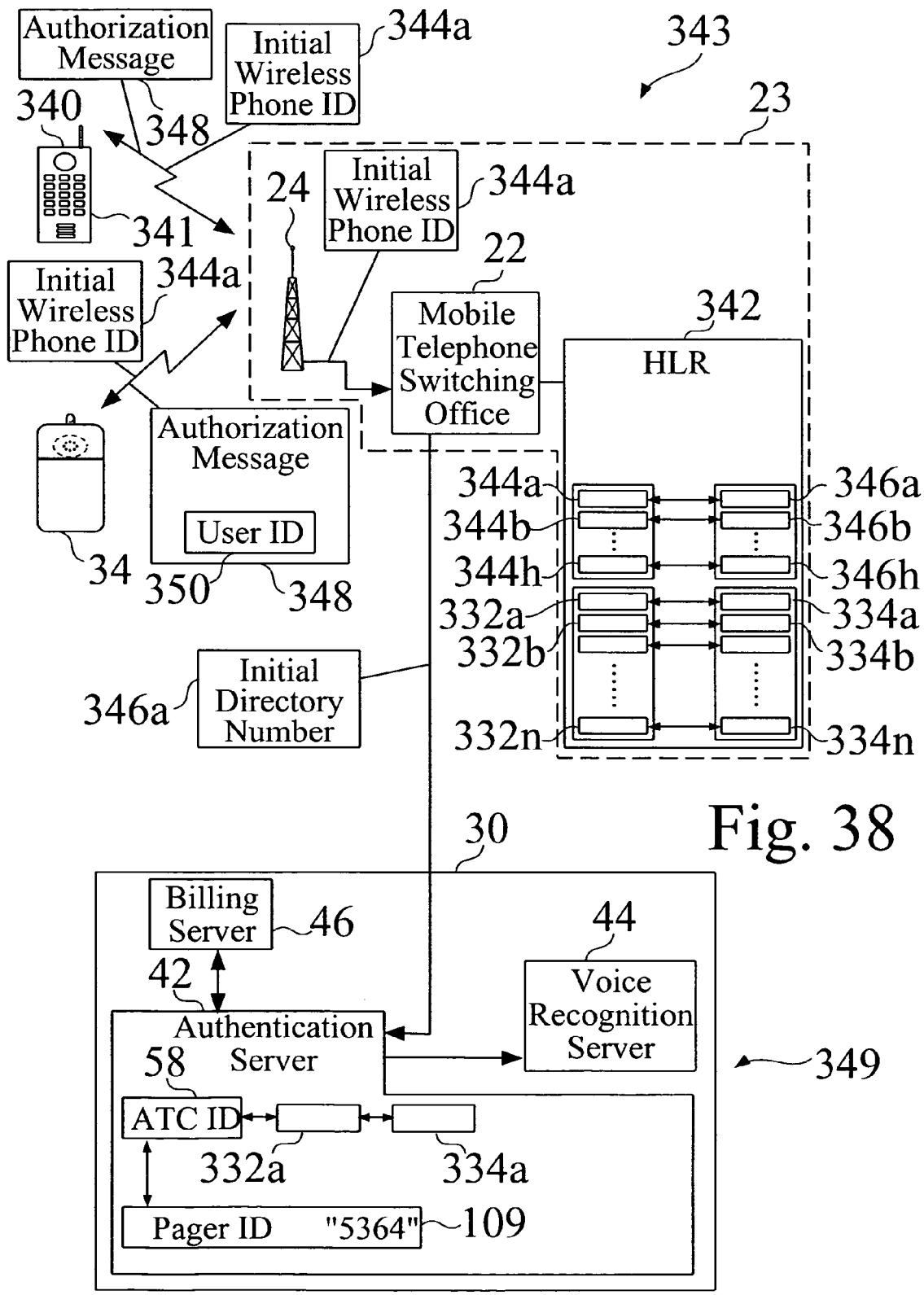
FIG. 38 is a schematic block diagram which shows the automated assignment of wireless phone identifiers and associated wire-based identifiers for a pre-paid portable cellular phone and for a conventional wireless phone.

FIG. 38 is a schematic block diagram 343 which shows one embodiment of automated assignment of a wireless phone identifier 332 and an associated directory number 334 for a pre-paid portable cellular phone 34, or alternately for a conventional wireless phone 340. Upon initial activation, a pre-paid portable cellular phone 34 transmits an output signal 32*b*, which contains an initial wireless phone identifier 344, e.g. such as 344*a*. The initial wireless phone identifier 344 is recognizable by the wireless phone system 23 as a valid wireless phone identifier 332, i.e. it matches the wireless protocol and may be found within the HLR 342. However, the initial wireless phone identifier 344 allows a portable cellular phone 34 to receive an assigned wireless phone identifier 332, and is typically not used for ongoing communication. The initial wireless phone identifier 344 is associated with an initial directory number identifier 346, within the HLR 342, just as a wireless phone identifier 332 is matched to an associated directory number 334. The initial wireless phone identifier 344 is matched to the wireless protocol, and the initial directory number 346 is matched to the wire-based protocol.

Within the HLR, one or more initial wireless phone identifiers 344*a*-344*h*, as well as one or more initial directory number identifiers 346*a*-346*h* are stored, to provide temporary communication channels for activation of wireless phones 340 and/or pre-paid cellular phones 34. As well, a plurality of wireless phone identifiers 332*a*-332*n* and associated directory numbers 334*a*-334*n*, which are either in use or are available, i.e. not currently assigned, are stored within the HLR, and are typically reserved for a service provider SP, such as to a pre-paid cellular phone system 10.

The use of the initial wireless phone identifier 344 and the initial directory number identifier 346 allows a new portable cellular phone 34, or an existing portable phone having a new or recharged ATC 52, to send and receive information, through the MTSO 22, to and from the system server 30. During initial activation, an authorization message 348, such as the ATC ID 58, is typically transferred to the system server 30, such that the airtime cartridge 52 is activated. Upon receipt of an appropriate authorization message 348, the system server 42 authorizes the assignment of an available wireless phone identifier 332, e.g. such as 332*a*, and associated directory number 334, e.g. such as 334*a*. The assigned wireless phone identifier 332 is then typically sent to and is stored by the portable cellular phone 34, whereby the portable cellular phone 34 transmits the assigned wireless phone identifier 332 for further communication.

The portable cellular phone system 10 therefore preferably provides efficient use and reuse, i.e. recycling, of wireless phone identifiers 332*a*-332*n* and directory number identifiers 334*a*-334*n*. A portable cellular phone 34 and an airtime cartridge 52 are preferably associated with a particular wireless phone identifier 332 and associated directory number identifier 334 for the active service life of the airtime cartridge 52, which is dependent on either the depletion of the pre-paid communication set 55, or the airtime cartridge expiration 134*a*, 134*b* (FIG. 20, FIG. 21). Once an airtime cartridge is fully depleted or expires, the assigned wireless phone identifier 332 and associated directory number 334 may be redesignated as available, and may be reassigned.

Therefore, until a portable cellular phone 34 and airtime cartridge 52 is initially activated, there is preferably no assigned wireless phone identifier 332 and associated directory number 334.

Over time, while one or more assigned wireless phone identifiers 332 and associated directory numbers 334 may be used by a mobile service network 23 to communicate with a portable cellular phone 34, the cellular phone may retain a uniform access number, such as the pager ID 109, by which the portable cellular phone system 10 routes calls and information to the portable cellular phone 34. For example, for a portable cellular phone having a pager ID 109 of "5364", the system server 30 preferably matches the pager ID 109 of "5364" to the portable cellular phone 34, independently of the current assigned wireless phone identifier 332a and associated directory number 334a. While the mobile phone system 23 typically associates the portable cellular phone 34 with the assigned wireless phone identifier 332 and matching directory number 334, the system server 30 matches the present directory number 334 to the pager ID 109 of "5364". Therefore, even when a user installs a new airtime cartridge 52, having a new ATC ID 58, the authorization message 348 preferably includes a means for associating the portable cellular phone 34 with an established phone ID 50 or with a user. The authorization may therefore preferably include a user identification 350, such as the submission of encoded user identification, e.g. such as a phone ID 50, or as voice entered information, e.g. such as the user's social security number, or PIN number to the voice recognition server 44.

Automatic Initialization for Conventional Wireless Phone. As described above, a pre-paid portable cellular phone 34 may be automatically activated, and may be automatically assigned an available wireless phone identifier 332 and matching directory number 334.

It should be understood that automated initialization may be readily implemented within a wide variety of wireless systems, and preferably using existing protocols. In a similar manner, other wireless phones, e.g. such as a conventional wireless phone 340, may be activated and assigned an available wireless phone identifier 332 and matching directory number 334, even within existing communications protocols, e.g. such as GSM or IS-41. The use of one or more initial wireless phone identifiers 344a-344h, as well as one or more initial directory numbers 346a-346h, are similarly reserved for activation purposes, such that a wireless phone 340, upon initial activation, is controllably powered by a user, whereby an actvation/initialization call is made to a service provider, through a mobile phone system 23. An authorization message 348 is then sent from the wireless phone 340, as a request for the assignment of an available wireless phone identifier 332 and matching directory number 334. The authorization message 348 may preferably further comprise the ATC ID 58 and/or the phone, I.e. hardware, ID 50. User based identification, e.g. such as user ID, credit card information, and/or numeric information (e.g. such as but not limited to Social Security information, street address information, zip code information, home phone number information, and/or area code information) may preferably be entered as well, such as through a keypad 341, through verbal entry of similar information to an operator, or to a voice recognition server 44 linked to a wireless service provider. Upon the assignment of the wireless phone identifier 332 and matching directory number 334, the wireless phone identifier 332 is typically transmitted and stored within the wireless phone 340, whereby upon subsequent activation, e.g. for normal outgoing or incoming calls, the wireless phone 340 provides the wireless phone identifier 332 to the mobile service provider 23. As well, the directory number 334, e.g. such as a ten digit MSISDN number, is typically transmitted to and is preferably stored within the wireless phone 340, such that the user has access to the directory number 334, typically to communicate the number to friends, family, and business associates.

Preferred Embodiments of Initialization for Conventional or Pre-Paid Wireless Phones. As described above, during the automated initial activation of a conventional cellular phone 340 or a pre-paid portable cellular phone 34 having an internal or attached airtime cartridge 52, an authorization message 348, such as the ATC ID 58, is typically transferred to the system server 30, such that the airtime cartridge 52 or portable phone 34,340 may be activated.

In preferred embodiments, the system server 30 sends an initial authentication challenge 316 to the portable phone 34,340, at which point the portable phone 34,340 sends an appropriate authentication response 316 to the system server 30. The portable phone 34,340 and/or airtime cartridge 52 must therefore preferably pass an authentication, e.g. challenge/response, sequence, before a new wire-based directory number 334 is assigned to it, thereby preventing user fraud.

As well, in preferred embodiments of automated activation, the portable phone 34,340 authenticates the base station or system server 30, through a similar challenge response process, to ensure that the network is legitimate.

Although the voice-activated portable telephone system and its methods of use are described herein in connection with cellular telephone systems, the apparatus and techniques can be implemented for other communication devices, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A communication system, comprising:
   a system server having a plurality of algorithmically generated sequential single use server communication units, each of the plurality of algorithmically generated single use sequential server communication units defining a discrete increment of authorized communication;
   a plurality of assignable wireless identification numbers and associated directory numbers;
   a plurality of initial wireless identification numbers and associated initial directory numbers;
   a portable wireless phone comprising wireless phone circuitry, and initially identified with one of the initial wireless identification numbers and associated one of the initial directory numbers;
   means for transmitting the initial wireless identification number from the portable wireless phone to the system server upon initial activation of the portable wireless phone; and
   means for assigning one of the wireless identification numbers and associated one of the directory numbers to the portable wireless phone, based upon an appropriate authorization message;
   wherein the portable wireless phone further comprises an energy storage, and an airtime cartridge, the airtime cartridge having an airtime cartridge identifier, and a plurality of algorithmically generated sequential prepaid single use airtime communication units, each of the plurality of algorithmically generated prepaid single use communication units matching each of the corresponding plurality of algorithmically generated sequential server communication units at the system server, each of the plurality of algorithmically generated pre-paid single use airtime communication units defining a discrete increment of authorized communication, each of the plurality of algorithmically generated pre-paid single use communication units having a unique identifier;

whereby sequential transmission of one or more of the algorithmically generated pre-paid single use airtime communication units having unique identifiers from the portable wireless phone during a communication session to the system server is matched to the corresponding algorithmically generated sequential single use server communication units at the system server, in which the system server allocates the defined discrete increment of authorized communication for the portable wireless phone during the communication session, based upon the matching of each of the corresponding algorithmically generated single use server communication units and the algorithmically generated pre-paid single use airtime communication units.

2. A process, comprising the steps of:

establishing a plurality of initial wireless identification numbers and associated initial directory numbers;

establishing a plurality of wireless identification numbers and associated directory numbers;

providing a portable wireless phone comprising wireless phone circuitry, and initially identified with one of the initial wireless identification numbers and associated one of the initial directory numbers;

sending the initial wireless identification number from the portable wireless phone to a system server upon initial activation of the portable wireless phone, wherein the system server has a plurality of algorithmically generated sequential single use server communication units, each of the plurality of algorithmically generated single use sequential server communication units defining a discrete increment of authorized communication, and wherein the portable wireless phone comprises an energy storage and an airtime cartridge, the airtime cartridge having an airtime cartridge identifier, and a plurality of algorithmically generated sequential pre-paid single use airtime communication units, each of the plurality of aigorithmically generated pre-paid single use communication units corresponding to algorithmically generated sequential server communication units at the system server, each of the plurality of algorithmically generated pre-paid single use airtime communication units defining a discrete increment of authorized communication, each of the plurality of algorithmically generated pre-paid single use communication units having a unique identifier;

sending an authorization message to the system server;

assigning a wireless identification number and associated directory number to the portable wireless phone, based upon an appropriate authorization message;

sequentially transmitting one or more of the algorithmically generated pre-paid single use airtime communication units having the unique identifiers from the portable wireless phone during a communication session to the system server; and matching the transmitted algorithmically generated pre-paid single use airtime communication units to corresponding algorithmically generated sequential single use server communication units at the system server, in which the system server allocates the defined discrete increment of authorized communication for the portable wireless phone during the communication session, based upon the matching of each of the corresponding algorithmically generated single use server communication units and the algorithmically generated pre-paid single use airtime communication units.

3. A process, comprising the steps of:

establishing a first set of wireless identification numbers and associated directory numbers, the first set of wireless identification numbers and associated directory numbers reserved for establishment of temporary communication channels for portable wireless phones;

establishing a second set of wireless identification numbers and associated directory numbers;

providing a selected portable wireless phone comprising wireless phone circuitry, and initially comprising a storage stored with one of the wireless identification numbers and associated one of the directory numbers corresponding to the first set;

automatically sending the stored wireless identification number corresponding to the first set from the selected portable wireless phone to a system server upon initial activation of the selected portable wireless phone to establish a temporary communication channel, wherein the system server has a plurality of algorithmically generated sequential single use server communication units, each of the plurality of algorithmically generated single use sequential server communication units defining a discrete increment of authorized communication; and wherein the selected portable wireless phone comprises an energy storage and an airtime cartridge, the airtime cartridge having an airtime cartridge identifier, and a plurality of algorithmically generated sequential pre-paid single use airtime communication units, each of the plurality of algorithmically generated pre-paid single use communication units corresponding to algorithmically generated sequential server communication units at the system server, each of the plurality of algorithmically generated pre-paid single use airtime communication units defining a discrete increment of authorized communication, each of the plurality of algorithmically generated pre-paid single use communication units having a unique identifier;

automatically sending an authorization message from the selected portable wireless phone to the system server over the established temporary communication channel;

assigning a wireless identification number and associated directory number from the second set to the selected portable wireless phone, based upon an appropriate authorization message, wherein the assigned wireless identification number and associated directory number from the second set are associated with the selected portable wireless phone for subsequent communication;

sequentially transmitting one or more of the algorithmically generated pre-paid single use airtime communication units having the unique identifiers from the selected portable wireless phone during a communication session to the system server; and matching the transmitted algorithmically generated pre-paid single use airtime communication units to corresponding algorithmically generated sequential single use server communication units at the system server, in which the system server allocates the defined discrete increment of authorized communication for the selected portable wireless phone during the communication session, based upon the matching of each of the corresponding algorithmically generated single use server communication units and the algorithmically generated pre-paid single use airtime communication units.

4. The process of claim 3, further comprising the steps of:
sending an authentication challenge from the system server to the selected portable wireless phone; and
sending an authentication response from the selected portable wireless phone to the system server, based upon the authentication challenge;
wherein the assignment of the wireless identification number and associated directory number from the second set to the selected portable wireless phone is based upon an authentication response which is appropriate to the sent authentication challenge.

5. The process of claim 3, further comprising the steps of:
sending a network authentication challenge from the selected portable wireless phone to the system server;
sending a network authentication response from the system server to the selected portable wireless phone, based upon the network authentication challenge; and
conditionally authenticating the system server by the selected portable wireless phone, based upon a received network authentication response which is appropriate to the sent network authentication challenge.

6. The process of claim 3, further comprising the step of:
sending the assigned wireless identification number and associated directory number from the second set to the selected portable wireless phone.

7. The process of claim 6, further comprising the step of:
storing the sent assigned wireless identification number and associated directory number from the second set at the selected portable wireless phone.

8. The process of claim 3, wherein the established wireless identification numbers from the first set comprise any of airtime cartridge identifiers, wireless phone identifiers, and pager account numbers.

9. The process of claim 3, wherein the wireless identification numbers from the second set comprise any of directory number identifiers, wireless phone identifiers, and pager account numbers.

10. The process of claim 3, wherein the sent authorization message comprises user based information, comprising any of user identification and credit card information.

11. The process of claim 10, wherein the user identification comprises numeric information.

12. The process of claim 11, wherein the numeric information comprises any of social security information, street address information, zip code information, home phone number information, and area code information.

13. The process of claim 3, further comprising the step of:
entering user based information through the selected portable wireless phone.

14. The process of claim 13, wherein the user based information is entered through the selected portable wireless phone by any of keypad entry and verbal entry.

15. The process of claim 3, wherein the selected portable wireless phone comprises an active service life of communication, the process further comprising the steps of:
reusing the assigned wireless identification number and associated directory number from the second set at the end of the active service life of communication.

16. A communication system, comprising:
a system server having a plurality of algorithmically generated sequential single use server communication units, each of the plurality of algorithmically generated single use sequential server communication units defining a discrete increment of authorized communication;
a first set of wireless identification numbers and associated directory numbers, the first set of wireless identification numbers and associated directory numbers reserved for establishment of temporary communication channels for portable wireless phones;
a second set of assignable wireless identification numbers and associated directory numbers;
a selected portable wireless phone comprising wireless phone circuitry, and initially comprising a storage stored with one of the wireless identification numbers and associated one of the directory numbers corresponding to the first set;
means for automatically transmitting the stored wireless identification number corresponding to the first set from the selected portable wireless phone to the system server upon initial activation of the selected portable wireless phone to establish a temporary communication channel;
means for automatically sending an authorization message from the selected portable wireless phone to the system server over the established temporary communication channel; and
means for assigning a wireless identification number and associated directory number from the second set to the selected portable wireless phone, based upon an appropriate authorization message, wherein the assigned wireless identification number and associated directory number from the second set are associated with the selected portable wireless phone for subsequent communication;
wherein the selected portable wireless phone further comprises an energy storage, and an airtime cartridge, the airtime cartridge having an airtime cartridge identifier, and a plurality of algorithmically generated sequential pre-paid single use airtime communication units, each of the plurality of algorithmically generated pre-paid single use communication units matching each of the corresponding plurality of algorithmically generated sequential server communication units at the system server, each of the plurality of algorithmically generated pre-paid single use airtime communication units defining a discrete increment of authorized communication, each of the plurality of algorithmically generated pre-paid single use communication units having a unique identifier;
whereby sequential transmission of one or more of the algorithmically generated pre-paid single use airtime communication units having unique identifiers from the selected portable wireless phone during a communication session to the system server is matched to the corresponding algorithmically generated sequential single use server communication units at the system server, in which the system server allocates the defined discrete increment of authorized communication for the selected portable wireless phone during the communication session, based upon the matching of each of the corresponding algorithmically generated single use server communication units and the algorithmically generated pre-paid single use airtime communication units.

17. The communication system of claim 16, further comprising:
   means for sending the assigned wireless identification number and associated directory number from the second set to the selected portable wireless phone.

18. The communication system of claim 17, wherein the assigned wireless identification number and associated directory number from the second set are stored at the selected portable wireless phone.

19. The communication system of claim 16, wherein the selected portable wireless phone comprises an active service life of communication, the system further comprising:
   means for reusing the assigned wireless identification number and associated directory number from the second set at the end of the active service life of communication.

20. The communication system of claim 19, wherein the reusing means of the assigned wireless identification number and the associated directory number from the second set comprises:
   a designation as available for the assigned wireless identification number and for the associated directory number from the second set at the end of the active service life of communication; and
   a reassignment of the wireless identification number and associated directory number from the second set.

21. The communication system of claim 19, wherein the selected portable wireless phone further comprises any of a number and an identifier associated therewith over a plurality of active service lives.

22. The communication system of claim 16, wherein the authorization message comprises user based information, comprising any of user, identification and credit card information.

23. The communication system of claim 22, wherein the user identification comprises numeric information.

24. The communication system of claim 23, wherein the numeric information comprises any of social security information, street address information, zip code information, home phone number information, and area code information.

* * * * *